(12) United States Patent
Kumar et al.

(10) Patent No.: US 8,971,846 B2
(45) Date of Patent: Mar. 3, 2015

(54) METHOD AND APPARATUS FOR TRANSLATION AND AUTHENTICATION FOR A VIRTUAL OPERATOR OF A COMMUNICATION SYSTEM

(75) Inventors: G. V. Kumar, Hyderabad (IN); S. Mohan Kumar, Hyderabad (IN); Radhakrishnan Subhashree, Hyderabad (IN)

(73) Assignee: Megasoft Limited, Hyderabad (IN)

( * ) Notice: Subject to any disclaimer, the term of this patent is extended or adjusted under 35 U.S.C. 154(b) by 1067 days.

(21) Appl. No.: 11/669,140

(22) Filed: Jan. 30, 2007

(65) Prior Publication Data
US 2007/0203880 A1 Aug. 30, 2007

Related U.S. Application Data

(60) Provisional application No. 60/762,879, filed on Jan. 30, 2006.

(51) Int. Cl.
| H04M 1/66 | (2006.01) |
| H04W 12/08 | (2009.01) |
| H04L 12/14 | (2006.01) |
| H04L 29/12 | (2006.01) |
| H04L 29/06 | (2006.01) |
| H04W 8/26 | (2009.01) |
| H04W 76/02 | (2009.01) |

(52) U.S. Cl.
CPC .............. *H04W 12/08* (2013.01); *H04L 12/14* (2013.01); *H04L 12/1403* (2013.01); *H04L 12/145* (2013.01); *H04L 29/12905* (2013.01); *H04L 61/106* (2013.01); *H04L 61/6054* (2013.01); *H04L 63/08* (2013.01); *H04W 8/26* (2013.01); *H04W 76/02* (2013.01); *H04L 69/08* (2013.01)

USPC ..... 455/410; 455/411; 455/414.4; 455/432.1; 455/432.2; 455/435.1; 455/436; 455/466

(58) Field of Classification Search
None
See application file for complete search history.

(56) References Cited

U.S. PATENT DOCUMENTS

| 5,870,460 | A | 2/1999 | Litzenberger |
| 6,349,205 | B1 | 2/2002 | Fang et al. |
| 6,680,923 | B1 | 1/2004 | Leon |
| 7,289,805 | B2 * | 10/2007 | Tom et al. .................. 455/432.1 |
| 7,664,495 | B1 * | 2/2010 | Bonner et al. ............... 455/433 |
| 2002/0176377 | A1 | 11/2002 | Hamilton |
| 2003/0134614 | A1 | 7/2003 | Dye |
| 2004/0148343 | A1 | 7/2004 | Mottes |
| 2004/0162058 | A1 * | 8/2004 | Mottes ......................... 455/411 |
| 2005/0079855 | A1 | 4/2005 | Jethi et al. |
| 2005/0080875 | A1 | 4/2005 | Jethi et al. |
| 2006/0030315 | A1 | 2/2006 | Smith et al. |

* cited by examiner

*Primary Examiner* — Willie J Daniel, Jr.
(74) *Attorney, Agent, or Firm* — IPCL Group PLC; Anthony Tacconi, Esq.

(57) ABSTRACT

A virtual operator and method for performing authentication and service translation. The virtual operator assigns first and second identifiers to subscribers. The virtual operator updates the second identifier when the service provider corresponding to the second identifier changes. When the virtual operator receives a request for authentication, the virtual operator forwards the authentication request to a serving network for authentication. When the virtual operator receives a service request, the virtual operator selects, using network optimization criteria, a network to provide the requested service. The virtual operator translates network protocols when the network forwarding authentication or service request uses a network protocol different from the network performing authentication or the requested service.

26 Claims, 59 Drawing Sheets

| Serving Networks (SNWs) | Price Offered per Subscriber | Subscriber Identifier for the technology of the SNW | Number of Subscribers | Network Address | Type of Network |
|---|---|---|---|---|---|
| SNW1 | P1 | IMSI #0-10 | 10K | GT:101 | GSM |
| SNW2 | P2 | IMSI #31-60 | 20K | GT:102 | GSM |
| SNW3 | P3 | MIN #31-60 | 30K | GT:103 | CDMA |
| SNW4 | P4 | Userid/password | 20K | IP:10.10.10.1 | IP |
| SNW5 | P5 | MIN #7-31 | 24K | GT:104 | CDMA |

Table 1

Figure 6

| Subscriber | Subscriber Key identifier | Virtual Key identifier | Current SNW serving |
|---|---|---|---|
| SB1 | IMSI#1 | IMSI#1 | SNW1 |
| SB2 | IMSI#20 | IMSI#20 | SNW2 |
| SB3 | MIN#33 | MIN#33 | SNW3 |
| SB4 | Userid1@password | Userid1@password | SNW4 |
| SB5 | Userid2@password | Userid2@password | SNW4 |
| SB6 | MIN#7 | MIN#7 | SNW5 |

Table 2

Figure 7

| Subscriber | Subscriber Key Identifier | Type of service access equipment |
|---|---|---|
| SB1 | IMSI#1 | GSM |
| SB2 | IMSI#20 | GSM |
| SB3 | MIN#33 | CDMA |
| SB4 | MIN#7 | CDMA |
| SB5 | Userid1@password | IP |
| SB6 | Userid2@password | IP |

Table 3

Figure 8

| Subscriber | SNW attached |
|---|---|
| SB1 | SNW1 |
| SB2 | SNW2 |
| SB3 | SNW3 |
| SB4 | SNW5 |
| SB5 | SNW4 |
| SB6 | SNW4 |

Table 4

Figure 9

| Subscriber | Rate Plan | Technology Requirements | Services Desired |
|---|---|---|---|
| SB3 | Fixed Rate | CDMA | S3, S4 |

Table 5

Figure 10

| SNW providing service | Price of service | Type of service |
|---|---|---|
| SNW1 | PS11, PS12 | S1, S2 |
| SNW2 | PS21 | S2 |
| SNW3 | PS31 | S3 |
| SNW4 | PS41, PS42 | S3, S4 |
| SNW5 | PS51 | S5 |

Table 6

Figure 13

| Service Availed | Service Desired | Current SNW providing service |
|---|---|---|
| S1 | S1 | SNW1 |
| S2 | S2 | SNW1 |
| S2 | S2 | SNW2 |
| S3 | S3 | SNW3 |
| S3 | S3 | SNW4 |
| S4 | S4 | SNW4 |

Table 7

Figure 14

| Subscriber | Service Desired | SNW providing service |
|---|---|---|
| SB1 | S1 | SNW1 |
| SB2 | S2 | SNW2 |
| SB3 | S3, S4 | SNW3, SNW4 |
| SB4 | S4 | SNW4 |
| SB5 | S2 | SNW1* |
| SB6 | S3 | SNW4* |

Table 8

Figure 15

| Subscriber | Service Desired | SNW for subscriber service | Subscriber | SNW attached | Subscriber Key identifier |
|---|---|---|---|---|---|
| SB1 | S1 | SNW1 | SB1 | SNW1 | IMSI#1 |
| SB2 | S2 | SNW2 | SB2 | SNW2 | IMSI#20 |
| SB3 | S3, S4 | SNW3, SNW4 | SB3 | SNW3 | MIN#33 |
| SB4 | S4 | SNW4 | SB4 | SNW5 | MIN#7 |
| SB5 | S2 | SNW1* | SB5 | SNW4 | User2@password |
| SB6 | S3 | SNW4* | SB6 | SNW4 | User1@password |

Table 9

Figure 16

| Serving Network | Services Offered |
|---|---|
| SNW1 | S1, S2 |
| SNW2 | S2 |
| SNW3 | S3 |
| SNW4 | S3, S4 |
| SNW5 | S5 |

Table 10

Figure 17

| Source Network | | Destination Network | | |
|---|---|---|---|---|
| Technology Type | Technology Key Identifier | Technology Type | Technology Key Identifier | SNW offering the technology |
| GSM | IMSI | GSM | IMSI | SNW1 |
| GSM | IMSI | GSM | IMSI | SNW2 |
| GSM | IMSI | CDMA (WIN) | MIN | SNW3 |
| GSM | IMSI | CDMA (WIN2) | MIN | SNW3 |
| GSM | IMSI | IP | Userid, password | SNW4 |
| CDMA | MIN | IP | Userid, password | SNW4 |
| CDMA | MIN | CDMA | MIN | SNW5 |
| IP | Userid, password | IP | Userid, password | SNW4 |

Table 11

Figure 20

| Subscriber | Origination SNW type | Home SNW types | Translation Required | SNW which provides the service |
|---|---|---|---|---|
| SB3 | GSM+IMSI | CDMA+MIN | Y(GSM to CDMA) | SNW3 |

Table 12

Figure 21

| Protocol Discriminator | Skip Indicator |
|---|---|
| Message Type ||
| Information Elements ||
| Data ||

Table 13

Figure 22A

| Version | IHL | Type-of-service | Total Length |
|---|---|---|---|
| Identification | | Flags | Fragments offest |
| Time-to-live | | Protocol | Header checksum |
| Source Address | | | |
| Destination Address | | | |
| Options | | | |
| Data | | | |

Table14

Figure 22B

| Message Type | Information Element Header | Information Element Length | Information Element Value | Data |
|---|---|---|---|---|
| | | | | |

Table15

Figure 22C

| Subscriber | Subscriber Key identifier | Virtual Key identifier | SNW serving |
|---|---|---|---|
| SB1 | IMSI#1 | IMSI#1 | SNW1 |
| SB2 | IMSI#20 | IMSI#20 | SNW2 |
| SB3 | MIN#33 | IMSI#5 | SNW1 |
| SB4 | MIN#7 | MIN#7 | SNW4 |
| SB5 | User1@password | User1@password | SNW4 |
| SB6 | User2@password | User3@password | SNW5 |

Table 16

Figure 23

| Subscriber | Old SNW | New SNW |
|---|---|---|
| SB3 | SNW3 | SNW1 |
| SB6 | SNW5 | SNW5 |

Table 17

Figure 24

| Subscriber | SNW attached | Subscriber Key identifier |
|---|---|---|
| SB1 | SNW1 | IMSI#1 |
| SB2 | SNW2 | IMSI#20 |
| SB3 | SNW1 | MIN#33 |

Table 18

Figure 25

| Service Center Number | Service Type | Subscriber ID | Subscriber Data |
|---|---|---|---|

Table 19A

Figure 26A

| SNW | Service Center Number |
|---|---|
| SNW1 | GT:101 |
| SNW2 | GT:102 |
| SNW3 | GT:103 |
| SNW4 | IP10.10.10.1 |
| SNW5 | GT:104 |

Table 19B

Figure 26B

| Service | Service Type |
|---|---|
| Authentication | 00 |
| Text Messaging | 01 |
| Email | 10 |
| Voice Mail | 11 |

Table 19C

Figure 26C

| Service Center Number | Service Type | Subscriber ID | Subscriber Data |
|---|---|---|---|
| GT:103 | 00=Authentication | MIN#33 | Not Applicable |

Table 20A

Figure 27A

| Translated Service Center Number | Service Type | Subscriber ID | Subscriber Data |
|---|---|---|---|
| GT:101 | 00=Authentication | ISMI#5 | Not Applicable |

Table 20B

Figure 27B

| Service Center Number | Service Result |
|---|---|
| GT:103 | Subscriber Authenticated |

Table 20C

Figure 27C

| Service Center Number | Service Code | Subscriber ID | Subscriber Data |
|---|---|---|---|
| GT:101 | 01=Text Messaging | IMSI #20 | "Hello" |

Table 21A

Figure 28A

| Translated Service Center Number | Service Code | Subscriber ID | Subscriber Data |
|---|---|---|---|
| GT:103 | 01=Text Messaging | IMSI #20 | "Hello" |

Table 21B

Figure 28B

| Service Center Number | Service Result |
|---|---|
| GT:101 | Message received |

Table 21C

Figure 28C

| SNW providing service | Settlement file type | Type of services |
|---|---|---|
| SNW1 | TAP1 | S1 |
| SNW1 | TAP2 | S1 |
| SNW1 | TAP3 | S2 |
| SNW2 | CIBER | S2 |
| SNW3 | NRTRDE | S3 |
| SNW4 | IPDR | S3 |
| SNW4 | TAP2 | S4 |

Table 22

Figure 35

| Subscriber | Serving Network | Service being used | SNW element location | Bandwidth Usage |
|---|---|---|---|---|
| SB1 | SNW1 | S1 | 192.155.132.100 | 1000 Kb/s |

Table 23

Figure 36

| SNW providing service | Bandwidth Allotment |
|---|---|
| SNW1 | 100 Mb/s |
| SNW2 | 300 Mb/s |
| SNW3 | 100 Mb/s |
| SNW4 | 200 Mb/s |
| SNW5 | 400 Mb/s |

Table 24

Figure 38

| Interconnect | Utilization | Rate |
|---|---|---|
| SNW1 | 0 to .25 | $.20/min |
| | .25 to .5 | $.30/min |
| | .5 to .75 | $.80/min |
| | .75 to 1.00 | $1.00/min |
| | >1.00 | $2.00/min |

Table 25

Figure 39

| SNW | Current Bandwidth Usage | Current Utilization | Current Rate of Interconnect |
|---|---|---|---|
| SNW1 | 10Mb/s | .1 | $.20 /min |
| SNW2 | 100Mb/s | .33 | $.50 /min |
| SNW3 | 150Mb/s | 1.5 | $2.00 /min |
| SNW4 | 50Mb/s | .25 | $.30 /min |
| SNW5 | 300Mb/s | .75 | $.85 /min |

Table 26

Figure 40

| Subscriber | Service Used | Start Time | End Time | SNW providing the service | Bandwidth Usage | Charge for Interconnect | Rate Plan | Sub-CDR location |
|---|---|---|---|---|---|---|---|---|
| SB1 | S1 | 1:00 p.m. | 2:00 p.m. | SNW1 | 1000 Kb/s | $10 | Non-Fixed | Database Address |
|  | S4 | 2:30 p.m. | 3:30 p.m. | SNW4 | 7000 Kb/s | $20 | Fixed | Database Address |

Table 27

Figure 41

| SNW providing service | Price of service | Type of services |
|---|---|---|
| SNW1 | PS11 | S1 |
| SNW1 | PS12 | S2 |
| SNW2 | PS21 | S2 |
| SNW3 | PS31 | S3 |
| SNW4 | PS41 | S3 |
| SNW4 | PS42 | S4 |

Table 28

Figure 43

| SNW | Utilization | Current Interconnect Rate | Current Network Throughput | Services Provided | Contracted Price for Service |
|---|---|---|---|---|---|
| SNW1 | .35 | $.5 /min | 500 Kb/s | S1 | $20 |
| | | | | S2 | $30 |
| SNW2 | .75 | $1.00 /min | 56 Kb/s | S2 | $15 |
| SNW3 | 1.2 | $2.00 /min | 100 Mb/s | S3 | $10 |
| SNW4 | .5 | $.85 /min | 75 Kb/s | S3 | $15 |
| | | | | S4 | $20 |

Table 29

Figure 44

| Subscriber | Service desired | Price for the service |
|---|---|---|
| SB1 | S1 | PS11 |
| SB2 | S2 | PS21 |
| SB3 | S3, S4 | PS31, PS42 |
| SB4 | S4 | PS42 |
| SB5 | S2 | PS12 |
| SB6 | S3 | PS41 |

Table 30

Figure 46

| Subscriber | Service subscribed for | Fixed Rate | Time service requested | Time sensitive rate |
|---|---|---|---|---|
| SB1 | S1 | $.5 /min | 9:00 a.m. to 9:00 p.m. | $.75 /min |
| | | | 9:01 p.m. to 8:59 a.m. | $.25 /min |
| | S2 | $1.00 /min | 9:00 a.m. to 9:00 p.m. | $1.25 /min |
| | | | 9:01 p.m. to 8:59 a.m. | $.75 /min |

Table 31

Figure 47

| Subscriber | Service Used | SNW providing service | Subscriber Bill for Service | Contracted Price | Charge for Interconnect |
|---|---|---|---|---|---|
| SB1 | S1 | SNW1 | $30.00 | $12.00 | $10.00 |

Table 32

Figure 48

| SNW | Service | Revenue Billed | Cost of Providing the Service | Profit Margin for the Service |
|---|---|---|---|---|
| SNW1 | S1 | $200000 | $75000 | $125000 |
| | S2 | $100000 | $125,000 | -$25000 |
| SNW2 | S2 | $50000 | $20000 | $30000 |
| SNW3 | S3 | $75000 | $35000 | $35000 |
| SNW4 | S4 | $250000 | $150000 | $100000 |

Table 33

Figure 50

| Single System Virtual Operator | Subscribers | Services |
|---|---|---|
| SSVO1 | SB1 | S1 |
| | SB2 | S2 |
| SSVO2 | SB3 | S3 |
| | SB4 | S4 |
| SSVO3 | SB5 | S5 |
| | SB6 | S6 |

Figure 54

METHOD AND APPARATUS FOR TRANSLATION AND AUTHENTICATION FOR A VIRTUAL OPERATOR OF A COMMUNICATION SYSTEM

CROSS REFERENCE TO RELATED APPLICATIONS

This application claims the benefit of priority under 35 U.S.C. §119(e) from U.S. Ser. No. 60/762,879, filed Jan. 30, 2006, the entire contents of which are incorporated by reference.

BACKGROUND OF THE INVENTION

1. Field of the Invention

The present invention relates to mobile telephone networks. More particularly, the present invention relates to a mobile telephone virtual operator which performs functions such as service translation, optimization of network selection, and profitability analysis.

2. Discussion of the Background

Companies involved in providing mobile telecommunications services include Mobile Network Operators (MNO) and Mobile Virtual Network Operators (MVNO). The MNOs are the parties who own the communication infrastructure. As a means for deriving revenue to offset the enormous cost of building networks, MNOs rent their infrastructure to the MVNOs. Examples of MNOs include Verizon, Sprint and T-Mobile. An example of an MVNO is the Virgin Mobile operator.

The MVNO launches services based on the rented infrastructure from the MNO and the MVNO's contracts for the services with the MNO. The subscribers of the MVNO are provided with identifiers that the MNO provides to the MVNO. Subsequently, when the MVNO wants to change its subscribers from the existing MNO to a new MNO, the MVNO may be practically limited to the existing MNO since the change requires mass notification and replacement of the identifiers provided to the existing subscribers. Changing the identifiers for the existing subscribers may not be feasible because an MVNO may have over one million subscribers. Additionally, the MVNO may be limited to the services the particular MNO provides based on their agreement with the MNO. An example of the difficulties of moving between MNOs is illustrated in the following paragraphs.

On January 1, the MVNO manufactures one million subscriber identity module (SIM) cards for their subscribers. The MVNO now needs to have a partnership with an MNO since the MNO is the operator of the radio towers. The MVNO negotiates with an MNO and receives one million identifiers from the MNO, which are provided to the MVNO's subscribers. On February 1, the MVNO decides that using the current MNO is too expensive. The MVNO negotiates with another MNO for one million identifiers.

The problem that exists when the MVNO changes from one MNO to another MNO, is that the MVNO needs to replace the SIM card for each of their subscribers. Replacing the SIM card can be unfeasible when the MVNO has many subscribers. Additionally, when the MVNO is using a particular MNO, the MVNO is limited to the MNO's services and costs for using the services.

SUMMARY OF THE INVENTION

According to one embodiment of the present invention, a method comprises:

receiving, from a first mobile operator, an identifier of hardware which requests to communicate;

determining, by referring to a database, whether the hardware is permitted to communicate to the first mobile operator;

indicating to the first mobile operator that the hardware is to communicate using the first mobile operator;

changing a database indicating the hardware is to use a second mobile operator; and receiving, from a second mobile operator, the identifier of the hardware which requests to communicate.

According to another embodiment of the present invention, a method comprises:

receiving, from a first mobile operator, an identifier of hardware which requests to be authenticated;

determining, by referring to a database, whether the first mobile operator hardware is permitted to authenticate the hardware;

indicating to the first mobile operator that the first mobile operator is to authenticate the hardware; and changing a database indicating that a second mobile operator authenticates the hardware.

According to another embodiment of the present invention, a method comprises:

receiving, from a first mobile operator, an identifier of a requested service;

determining, by referring to a database, a plurality of mobile operators that provide the requested service;

selecting, from the plurality of mobile operators, at least one mobile operator for providing the requested service using network optimization criteria.

According to one embodiment of the present invention, an apparatus comprises:

means for receiving, from a first mobile operator, an identifier of hardware which requests to communicate;

means for determining, by referring to a database, whether the hardware is permitted to communicate to the first mobile operator;

means for indicating to the first mobile operator that the hardware is to communicate using the first mobile operator;

means for changing a database indicating the hardware is to use a second mobile operator; and means for receiving, from a second mobile operator, the identifier of the hardware which requests to communicate.

According to another embodiment of the present invention, an apparatus comprises:

means for receiving, from a first mobile operator, an identifier of hardware which requests to be authenticated;

means for determining, by referring to a database, whether the first mobile operator hardware is permitted to authenticate the hardware;

means for indicating to the first mobile operator that the first mobile operator is to authenticate the hardware; and means for changing a database indicating that a second mobile operator authenticates the hardware.

According to another embodiment of the present invention, an apparatus comprises:

means for receiving, from a first mobile operator, an identifier of a requested service;

means for determining, by referring to a database, a plurality of mobile operators that provide the requested service;

means for selecting, from the plurality of mobile operators, at least one mobile operator for providing the requested service using network optimization criteria.

According to one embodiment of the present invention, an apparatus comprises:

a device configured to receive, from a first mobile operator, an identifier of hardware which requests to communicate;

a device configured to determine, by referring to a database, whether the hardware is permitted to communicate to the first mobile operator;

a device configured to indicate to the first mobile operator that the hardware is to communicate using the first mobile operator;

a device configured to change a database indicating the hardware is to use a second mobile operator; and a device configured to receive, from a second mobile operator, the identifier of the hardware which requests to communicate.

According to another embodiment of the present invention, an apparatus comprises:

a device configured to receive, from a first mobile operator, an identifier of hardware which requests to be authenticated;

a device configured to determine, by referring to a database, whether the first mobile operator hardware is permitted to authenticate the hardware;

a device configured to indicate to the first mobile operator that the first mobile operator is to authenticate the hardware; and a device configured to change a database indicating that a second mobile operator authenticates the hardware.

According to another embodiment of the present invention, an apparatus comprises:

a device configured to receive, from a first mobile operator, an identifier of a requested service;

a device configured to determine, by referring to a database, a plurality of mobile operators that provide the requested service;

a device configured to select, from the plurality of mobile operators, at least one mobile operator for providing the requested service using network optimization criteria.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 illustrates in Table 1 an example serving network offerings to MVNO;

FIG. 7 illustrates in Table 2 key identifiers provisioned for the subscribers;

FIG. 8 illustrates in Table 3 subscriber profiles with the key identifiers;

FIG. 9 illustrates in Table 4 the assigned serving networks for each subscriber;

FIG. 10 illustrates in Table 5 an example format of the subscriber profile data;

FIG. 13 illustrates in Table 6 the serving networks mapped to the services offerings;

FIG. 14 illustrates in Table 7 the service offerings from the various serving networks and the services desired by the subscribers;

FIG. 15 illustrates in Table 8 the services desired by each subscriber and the serving network providing the service;

FIG. 16 illustrates in Table 9 the serving networks the subscribers are attached to, the subscriber key identifiers, the service desired by each subscriber, and the serving networks providing the service desired;

FIG. 17 illustrates in Table 10 an example services profile data;

FIG. 20 illustrates in Table 11 an example translation table;

FIG. 21 illustrates in Table 12 an example translation table for GSM to CDMA conversion;

FIG. 22A illustrates in Table 13 an example GSM packet;

FIG. 22B illustrates in Table 14 an example IP packet;

FIG. 22C illustrates in Table 15 an example CDMA packet;

FIG. 23 illustrates in Table 16 an example translation table for key identifiers;

FIG. 24 illustrates in Table 17 the relationship between the old and new serving networks when subscribers are transferred;

FIG. 25 illustrates in Table 18 the serving network a subscriber is assigned to and the subscriber's subscriber key identifier;

FIG. 26A illustrates in Table 19A an example service request packet;

FIG. 26B illustrates in Table 19B example service center numbers;

FIG. 26C illustrates in Table 19C example service types;

FIG. 27A illustrates in Table 20A an example authentication request packet;

FIG. 27B illustrates in Table 20B an example translated authentication request packet;

FIG. 27C illustrates in Table 20C an example service result;

FIG. 28A illustrates in Table 21A an example service request packet for text messaging;

FIG. 28B illustrates in Table 21B a translated service request packet for text messaging;

FIG. 28C illustrates in Table 21C an example service result for text messaging;

FIG. 35 illustrates in Table 22 the types of Charge Detail Record (CDR) formats each serving network supports;

FIG. 36 illustrates in Table 33 the format of an example CDR;

FIG. 38 illustrates in Table 34 the bandwidth allotment for each serving network;

FIG. 39 illustrates in Table 25 an example utilization rate plan that a MVNO has with a MNO;

FIG. 40 illustrates in Table 26 an example current utilization in rate file;

FIG. 41 illustrates in Table 27 an example subscriber account;

FIG. 43 illustrates in Table 28 an MVNO's rate plans with the MNOs;

FIG. 44 illustrates in Table 29 an example format of an Interconnect Charge Detail Record (IC-CDR);

FIG. 46 illustrates in Table 30 an example subscriber rating plan;

FIG. 47 illustrates in Table 31 an example rate plan an MVNO has with a subscriber;

FIG. 48 illustrates in Table 32 an example format of a Subscriber Charge Detail Record (sub-CDR);

FIG. 50 illustrates in Table 33 the format of an example profitability analysis report;

FIG. 54 illustrates in Table 34 an example translation table for a multiple virtual operator system.

DETAILED DESCRIPTION OF THE PREFERRED EMBODIMENTS

The present invention relates to virtual mobile network operators. A MVNO may be the party that owns and operates a virtual operator (VO). A MNO may be the operator of a serving network (SNW), which the virtual operator may use to receive a service from.

A virtual operator can provide services to subscribers across networks of different technology types. Additionally, a subscriber can be moved from one serving network to another serving network for the services while the virtual operator keeps track of the subscribers' identifiers. Examples of services include subscriber authentication, Internet access, text messaging, e-mail, making a voice call, etc.

The virtual operator is implemented on network architectures of varying types. For example, FIG. 1A illustrates a two-tier network architecture. The network architecture in FIG. 1A contains a graphical user interface (GUI) 2*a*, a network logic/service logic unit 4*a*, a transaction logic/business logic unit 6*a*, and a database 8*a*. The GUI user interface is any computer terminal that preferably provides a visual interface with the user to access the network. The network logic/service logic 4*a* contains the middleware used to transfer data through the network. For example, for an IP network, the network logic/service logic 4*a* contains routers, hubs, and switches. The transaction logic/business logic 6*a* contains the decision tables necessary for routing data to the various elements in the network. The database 8*a* is used to store routing information and subscriber information.

Figure 1B:
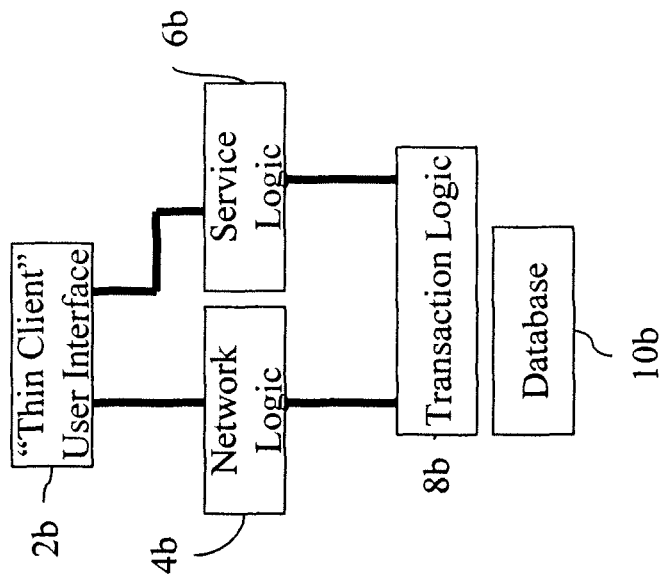
FIG. 1B illustrates a multi-tier network architecture.
Figure 1A:
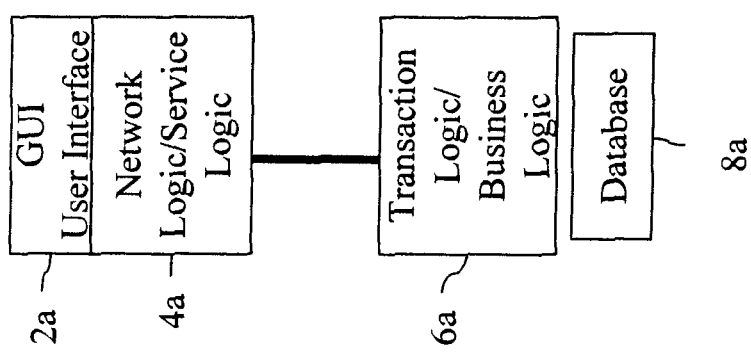
FIG. 1A illustrates a two component network architecture.

FIG. 1B illustrates a multi-tier network architecture containing a thin client user interface 2*b*, network logic 4*b*, service logic 6*b*, transaction logic 8*b*, and a database 10*b*. The thin client user interface 2*b* is similar to the GUI 2*a* in FIG. 1A. The network logic 4*b* and the service logic 6*b* perform the same functionality as the network logic/service logic 4*a* of FIG. 1A. The difference between the network logic 4*b* and the service logic 6*b* and their counterpart in FIG. 1A is that the functionalities are separated into separate units. The transaction logic 8*b* performs the same functionality as the transaction logic/business logic 6*a* in FIG. 1A. Additionally, the database 10*b* performs the same functionality as the database 8*a* of FIG. 1A.

Figure 1C:
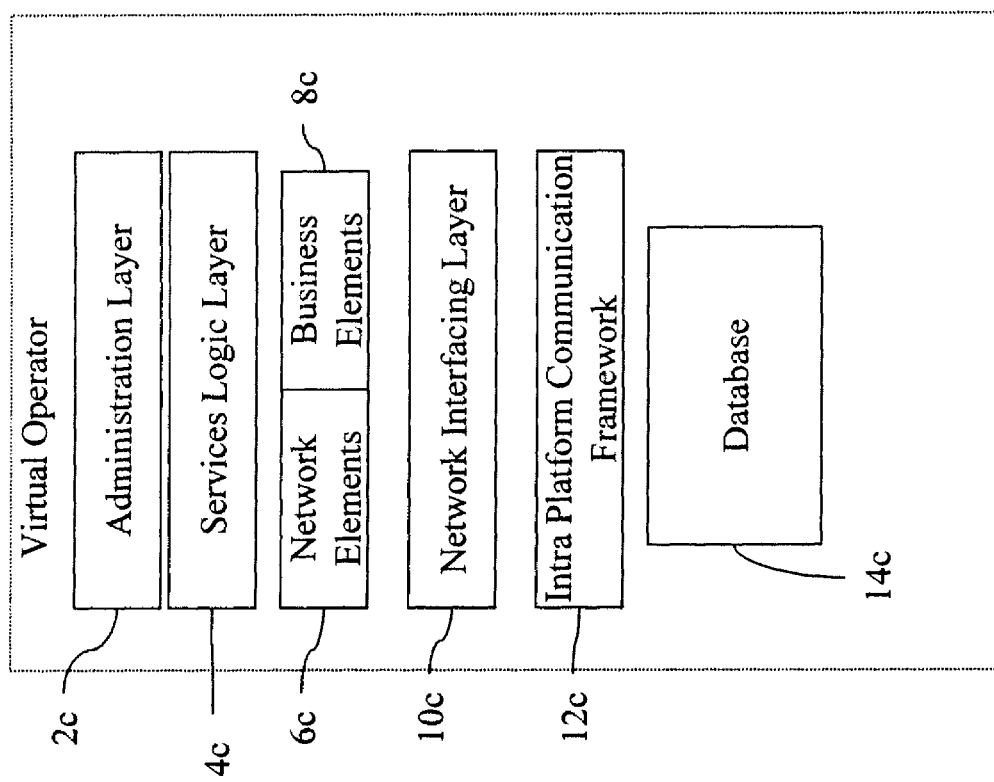
FIG. 1C illustrates a virtual operator multi-tier network architecture.

FIG. 1C illustrates an exemplary embodiment of the virtual operator implemented on a network architecture. The administration layer 2*c* performs the function of provisioning subscriber data and the data related to particular serving networks. This data may include the identity of the subscribers, and the particular services that each serving network provides. The services logic layer 4*c* performs the function of mapping services to each serving network. The network elements 6*c* is used to store information relating to the components of each serving network. The business elements 8*c* is used to store information relating to the contracts MVNO has with each serving network. The network interfacing layer 10*c* provides the hardware and logic necessary to interface with each serving network. The intra platform communication framework 12*c*, provides the hardware and logic for communication with the different types of serving networks. The database 14*c* is used to store information such as subscriber data, the services provided by each serving network, and particular rate plans provided by the serving networks.

Figure 2:
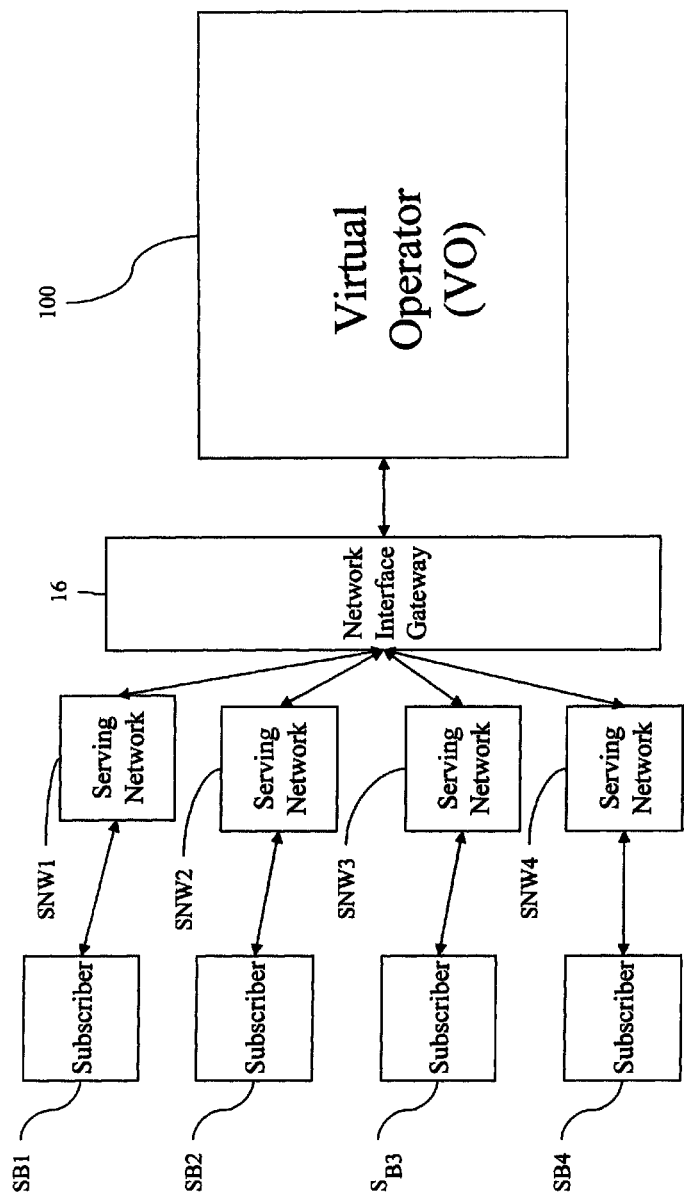
FIG. 2 illustrates a network configuration for serving networks in the virtual operator.

FIG. 2 illustrates a relationship between the subscribers, the serving networks, and the virtual operator. Each subscriber is designated as "SB#". Each serving network is designated as "SNW#". FIG. 2 illustrates four subscribers SB1, SB2, SB3, and SB4. Subscribers communicate with their serving networks through a any desired device such as a computer terminal, a mobile phone, a Personal Device Assistant (PDA), etc. How a subscriber communicates with a serving network may be dependent on the technology requirements of the serving network. FIG. 2 illustrates four serving networks SNW1, SNW2, SNW3, and SNW4. A serving network can be any desired network architecture types such as a Global System For Mobile Communications (GSM) network, an Internet (IP) network, a Code Division Multiple Access (CDMA), etc. In one embodiment, each subscriber may be provisioned to a particular serving network. For example, FIG. 2 illustrates subscriber SB1 provisioned to serving network SNW1, subscriber SB2 provisioned to serving network SNW2, subscriber SB3 provisioned to serving network SNW3, and subscriber SB4 provisioned to serving network SNW4.

According to one embodiment of the present invention, each of the serving networks SNW1 to SNW4 communicates to a virtual operator (VO) 100 through a network interface gateway 16. The network interface gateway 16 allows the virtual operator 100 to communicate with varying networks such as a GSM, CDMA, or an IP network, all under the same framework. The network interface gateway 16 may incorporate any desired signaling protocol to transmit data. These signaling protocols include, but are not limited to, Signaling System 7 (SS7) or C-7 signaling. The standard interfaces the network interface gateway 16 may support includes Integrated Services User Part (ISUP), Customized Applications Mobile Enhanced Logic (CAMEL), Wireless Intelligent Network (WIN), Remote Authentication Dial-In User Service (RADIUS), DIAMETER (an upgrade for RADIUS), etc. The network interface gateway 16 is not limited to these interfaces and may support any desired interface. In one embodiment, the connections between each serving network SNW1 to SNW4 to the network interface gateway 16, and the virtual operator 100 to the network interface gateway 16 is bidirectional. For example, data may pass in both directions from each serving network SNW1 to SNW4 to network interface gateway 16 to the virtual operator 100, and vice versa.

Figure 3B:
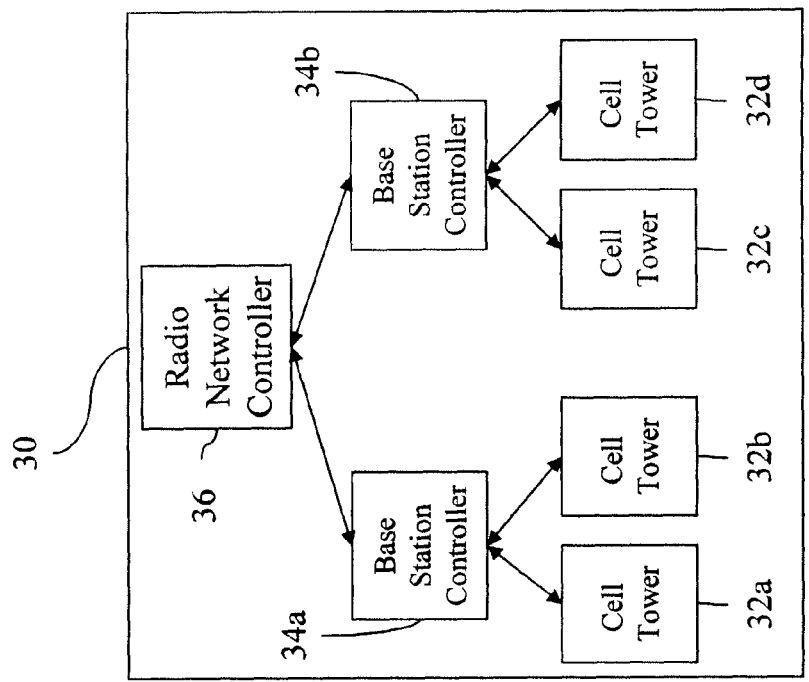
FIG. 3B illustrates an example wireless network.
Figure 3A:
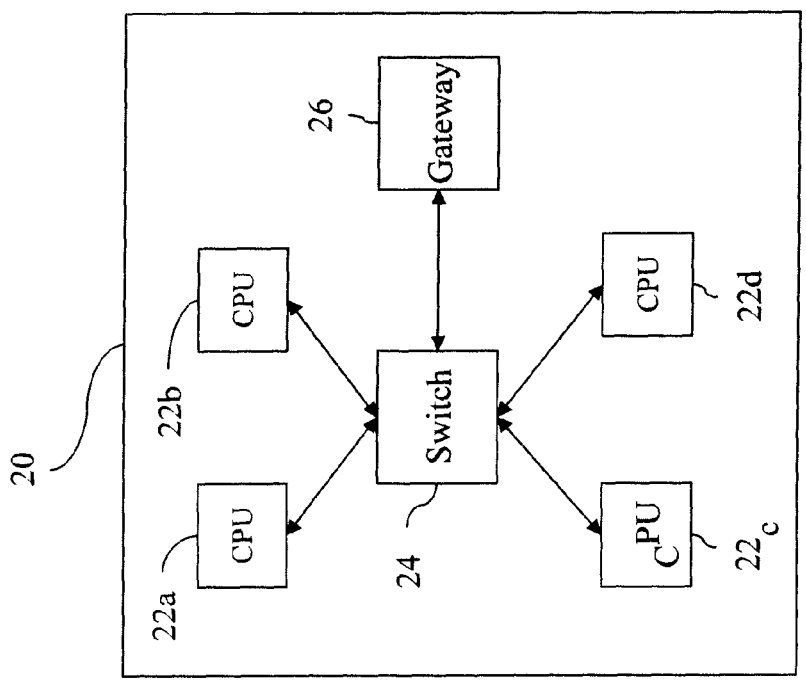
FIG. 3A illustrates an example IP network.

FIGS. 3A and 3B illustrate exemplary embodiments of particular types of serving networks. FIG. 3A illustrates a standard IP network 20. The IP network 20 contains computer terminals (CPU) 22a, 22b, 22c and 22d. Each CPU 22a, 22b, 22c, and 22d communicate with a switch 24 that communicates with gateway 26. The gateway 26 provides connectivity to any other IP network.

FIG. 3B illustrates a standard wireless network 30. The wireless network contains cell towers 32a, 32b, 32c, and 32d, which are connected to base station controllers 34a and 34b. Each base station controller is connected to a radio network controller 36. The radio network controller 36 controls handover from base station controller 34a to base station controller 34b.

Figure 4:
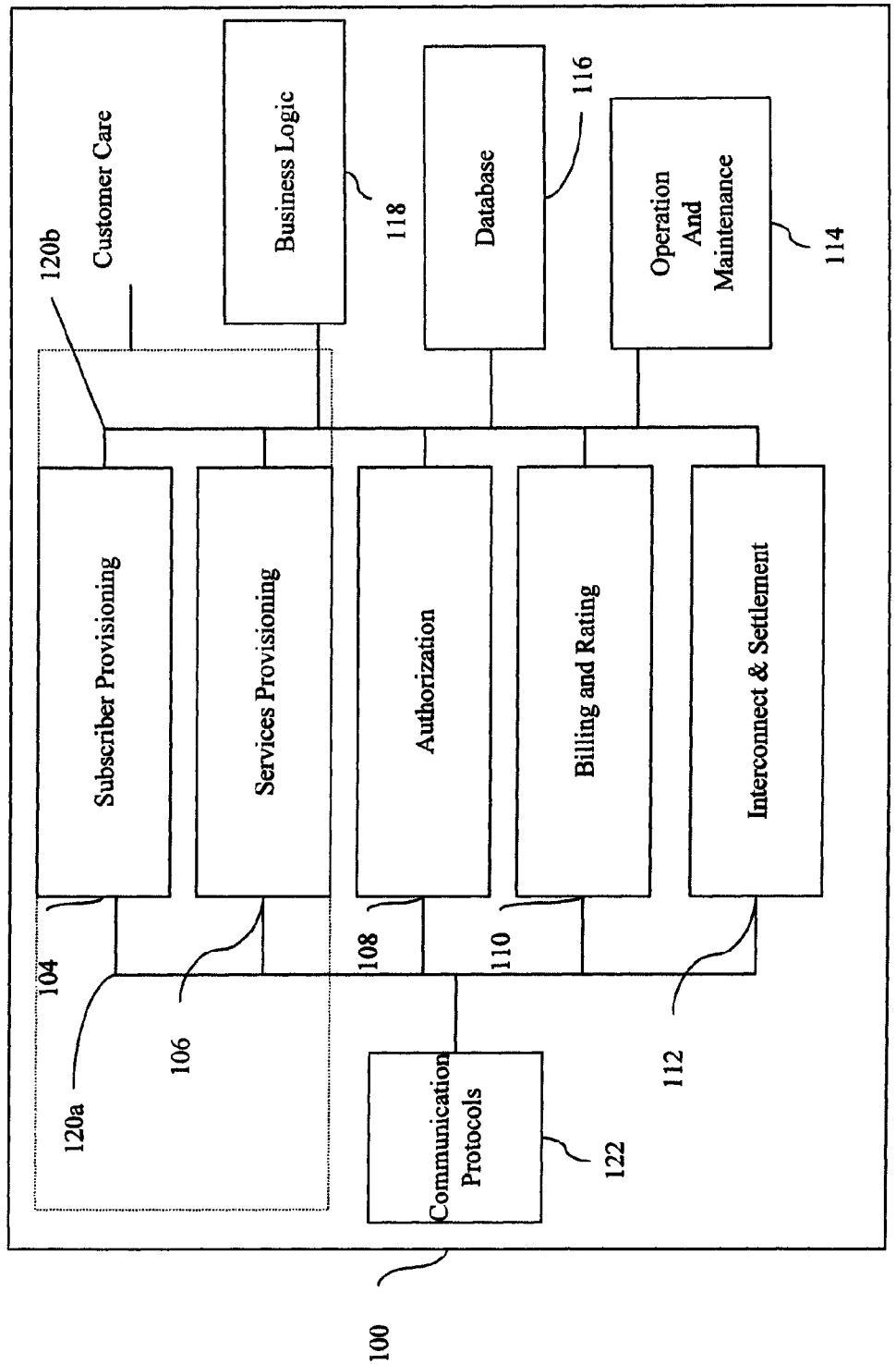
FIG. 4 illustrates the architecture for a virtual operator.

FIG. 4 illustrates an exemplary architectural embodiment of the virtual operator 100. In FIG. 4, a subscriber provisioning layer 104, a services provisioning layer 106, an authorization layer 108, a billing and rating layer 110, and an interconnect and settlement layer 112 are shown. The subscriber provisioning layer 104 includes the functionalities of assigning an identifier from a serving network to a subscriber. The services provisioning layer 106 includes the functionality of mapping the services each serving network provides. The authorization layer 108 includes the functionality of identifying a subscriber, authenticating a subscriber, and providing services for a subscriber between heterogeneous networks. The billing and rating layer 110 includes the functionality of calculating bills for a subscriber's use of a service, and providing real-time rates for connecting to a serving network. In one embodiment, the billing functionality from the billing and rating layer 110 includes both real time and non real time billing for the services. The interconnect and settlement layer 112 includes control-logic for routing messages between the different serving networks. The functionalities of each layer will be described in more detail in the following figures. While the term "layer" has been used throughout this writing, each of these layers and other aspects of the invention can be treated as a block which may be implemented using a programmed general purpose computer a special purpose device using ASICs or other special purpose hardware, or a combination of general and special purpose hardware.

The subscriber provisioning layer 104, services provisioning layer 106, authorization layer 108, billing and rating layer 110, an interconnect and settlement layer 112 are implemented in a variety of embodiments. For example, in one embodiment, each of the above-described layers are independently implemented on a server connected to each other through any desired network type 120a and 120b. For example, connections 120a and 120b can be an IP network connecting each of the layers to each other. In an alternative embodiment, each of the above-described layers are implemented on a single server. The processing unit that each layer is implemented on such as a server, can include any desired operating system, such as Linux.

The communication protocols unit 122 is configured to implement the protocols used to communicate with each serving network through the network interface gateway 16 of FIG. 2. These protocols may include, but are not limited to, the GSM, CDMA, IP, or Wi-Fi protocol, or any other desired protocol. The communication protocols unit 122 interfaces with the layers 104 to 12 through interface 120a, which can be any desired network type such as an IP network.

The operation and maintenance unit 114 is any computer or terminal allowing a user of the virtual operator to access the layers. In one embodiment, the operation and maintenance unit contains a Graphical User Interface (GUI) so that the user can perform maintenance operations on the layers. Maintenance operations may include, but are not limited to, upgrading software on each of the layers. The operation and maintenance unit 114 interfaces with each of the layers through interface 120b. The interface 120b is any desired network type such as an IP network.

The database 116 includes the functionality of storing data necessary to carry out the operations of the virtual operator. Such data includes, but is not limited to, subscriber data or the service offerings from each SNW. Each of the layers 104 through 112 can retrieve data from the database 116 or store data in the database 116 as necessary.

The business logic unit includes the functionality of providing the layers 104 through 112 of virtual operator 100 with information regarding the MVNO's contracts with the MNOs. In one embodiment, the business logic unit 118 provides the layers 104 through 112 with the prices an MNO charges for services. The business logic unit 118 communicates with the layers 104 through 112 through interface 120b.

Additionally, the subscriber provisioning layer 104 and the services provisioning layer 106 are designated as the customer care layers indicating that these layers define the subscribers' relationships with the MVNO.

Subscriber Provisioning

The subscriber provisioning layer 104 includes the functionality of provisioning, i.e. assigning, subscribers to the respective serving networks. In one embodiment, assigning a subscriber to a serving network includes the step of assigning the subscriber with a Subscriber Key identifier, and updating the subscriber's Virtual Key identifier. A Subscriber Key identifier is an identifier a subscriber may use to log onto a serving network. A Virtual Key identifier is an identifier the virtual operator 100 uses to determine which serving network authenticates the subscriber. The assigning and updated of identifiers will be explained in more detail in the following paragraphs.

Figure 5:
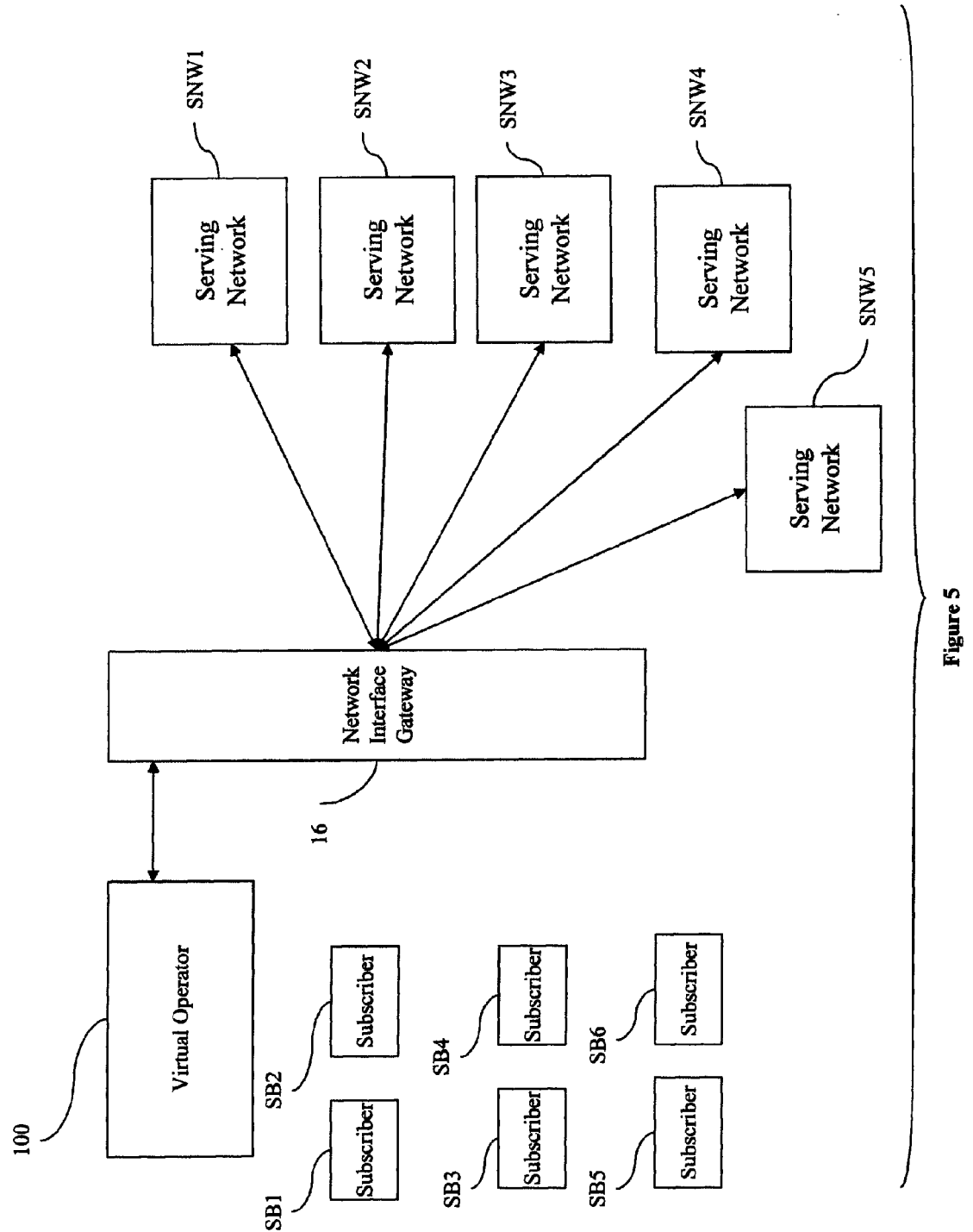
FIG. 5 illustrates the network configuration before subscriber provisioning.

FIG. 5 illustrates the configuration of the serving networks before the subscriber provisioning layer 104 of FIG. 4 performs subscriber provisioning. In FIG. 5, serving networks SNW1, SNW2, SNW3, SNW4, and SNW5 communicate to the virtual operator 100 through the network interface gateway 16 in the same manner as described in FIG. 2. FIG. 5 illustrates subscribers SB1, SB2, SB3, SB4, SB5, and SB6, where each subscriber has not been assigned to any of the serving networks SNW1 to SNW5. Therefore, subscribers SB1 to SB6 have not been assigned Subscriber Key identifiers necessary for providing network access to the subscribers.

Before a subscriber is assigned a Subscriber Key identifier, an MVNO may need to contract for the identifiers from the MNOs of serving networks SNW1 to SNW5. Table 1 of FIG. 6 illustrates the serving network offerings of serving networks SNW1 to SNW5 to the MVNO. The Price Offered per Subscriber in Table 1 illustrates the prices that each respective serving network offers per subscriber identifier. The Subscriber Identifier for the technology of the SNW indicates the different types of subscriber identifiers. The different types of subscriber identifiers include, but are not limited to, an International Mobile Subscriber Identity (IMSI), a Mobile Identification Number (MIN), a user ID/password, or any other desired identifier. The use of these types of identifiers are well known in the art. In one embodiment, the identifiers are used for identifying the hardware a subscriber is using such as a the subscriber's Subscriber Identity Module (SIM) card. In another embodiment, the identifiers can be used to identify the subscriber.

The Number of Subscribers indicates the number of subscribers that can be assigned an identifier for a respective serving network. The Network Address is used to identify a unique address for each of the serving networks. The Type of the Network illustrates the different types of networks that a virtual operator may communicate with such as a GSM, CDMA, or IP network.

An application of the information illustrated in Table 1 will be described for serving network SNW1. Table 1 illustrates serving network SNW1 is a GSM network with a network address GT:101. Serving network SNW1 is offering a price per a subscriber identifier at price P1. The type of identifiers serving network SNW1 offers are IMSI identifiers ranging from IMSI#0 to IMSI#10. Additionally, serving network SNW1 is allowing the MVNO to assign up to 10,000 subscribers to serving network SNW1.

When a subscriber enters into a contract with an MVNO and is assigned a Subscriber Key identifier for the first time, the virtual operator 100 may assign a Virtual Key identifier to the subscriber that matches the subscriber's Subscriber Key Identifier. Table 2 of FIG. 7 illustrates the Subscriber Key identifiers and Virtual Key identifiers for subscribers SB1 to SB6. In Table 2, each of the subscribers' Virtual Key identifiers matches their Subscriber Key Identifiers. Table 2 may represent the scenario where subscribers SB1 to SB6 have entered into contracts and have been assigned identifiers for the first time.

For example, when subscriber SB1 enters into a contract with the MVNO, the subscriber may receive a Subscriber Key identifier IMSI #1. Since this is the first time the subscriber is receiving a Subscriber Key identifier, the Virtual Key identifier is set to match the Subscriber Key identifier IMSI#1. If the MVNO needs to move Subscriber SB1 to another serving network, the use of Virtual Key identifier allows the MVNO to change the Virtual Key identifier of Subscriber SB1 while subscriber SB1 keeps his or her original Subscriber Key identifier to log onto the network.

In an alternative embodiment, the MVNO assigns general identifiers to its subscribers while the subscribers' Virtual Key identifiers are matched to the identifiers of the serving networks. For example, when subscriber SB1 enters into a contract with the MVNO, subscriber SB1 may be assigned a Subscriber Key identifier MVNO_Identifier#1 whereas the subscriber SB1's Virtual Key identifier is set to IMSI#1.

Table 1 of FIG. 6 and Table 2 of FIG. 7 can be stored in any memory device located on the virtual operator 100 such as database 116 of FIG. 4. The subscriber provisioning layer 104 of FIG. 4 is configured to retrieve the information contained in Table 1 and Table 2 when necessary.

Table 3 of FIG. 8 illustrates the relationship between the subscribers with their respective Subscriber Key identifiers and the service access equipment required. The Type of service access equipment in column 3 of Table 3 illustrates the service access equipment each subscriber uses for their respective Subscriber Key identifiers. For example, Table 3 of FIG. 8 illustrates that subscriber SB1 has been assigned a Subscriber Key identifier of IMSI #1, which uses access equipment for a GSM network.

After a subscriber is assigned a Subscriber Key identifier, the subscriber becomes attached, i.e. assigned, to a serving network. Table 4 of FIG. 9 illustrates the relationship between subscribers SB1 to SB6 and serving networks SNW1 to SNW5. For example, Table 3 of the FIG. 8 illustrates that subscriber SB3 received a Subscriber Key identifier of MIN #33. Table 1 of FIG. 6 illustrates that the identifier MIN #33 corresponds to serving network SNW3. Therefore, as shown in Table 4 of FIG. 9 subscriber SB3 is attached to serving network 3.

When the virtual operator 100 performs the operation of provisioning a subscriber in the subscriber provisioning layer 104, the virtual operator 100 can refer to a subscriber's profile data. Table 5 of FIG. 10 illustrates the subscriber profile data the VO uses to assign a subscriber a Subscriber Key identifier, thus attaching a subscriber to a serving network. For example, subscriber SB3 may contract with an MVNO for services S3 and S4. The subscriber lets the MVNO know that its technology requirements are for a CDMA network. Additionally, the subscriber may contract for using services S3 and S4 at a fixed rate, which means that subscriber SB3 may use these services at a fixed price. Table 5 of FIG. 10 illustrates the exemplary embodiment of subscriber profile data. In other embodiments, the subscriber profile data may include other factors such as a subscriber's geographic location, and the expiration date of the subscribers contract with the MVNO. The MVNO may use the operation and maintenance unit 114 of FIG. 4 to enter the subscriber profile data, which may be stored in database 116 of FIG. 4.

Figure 11A:
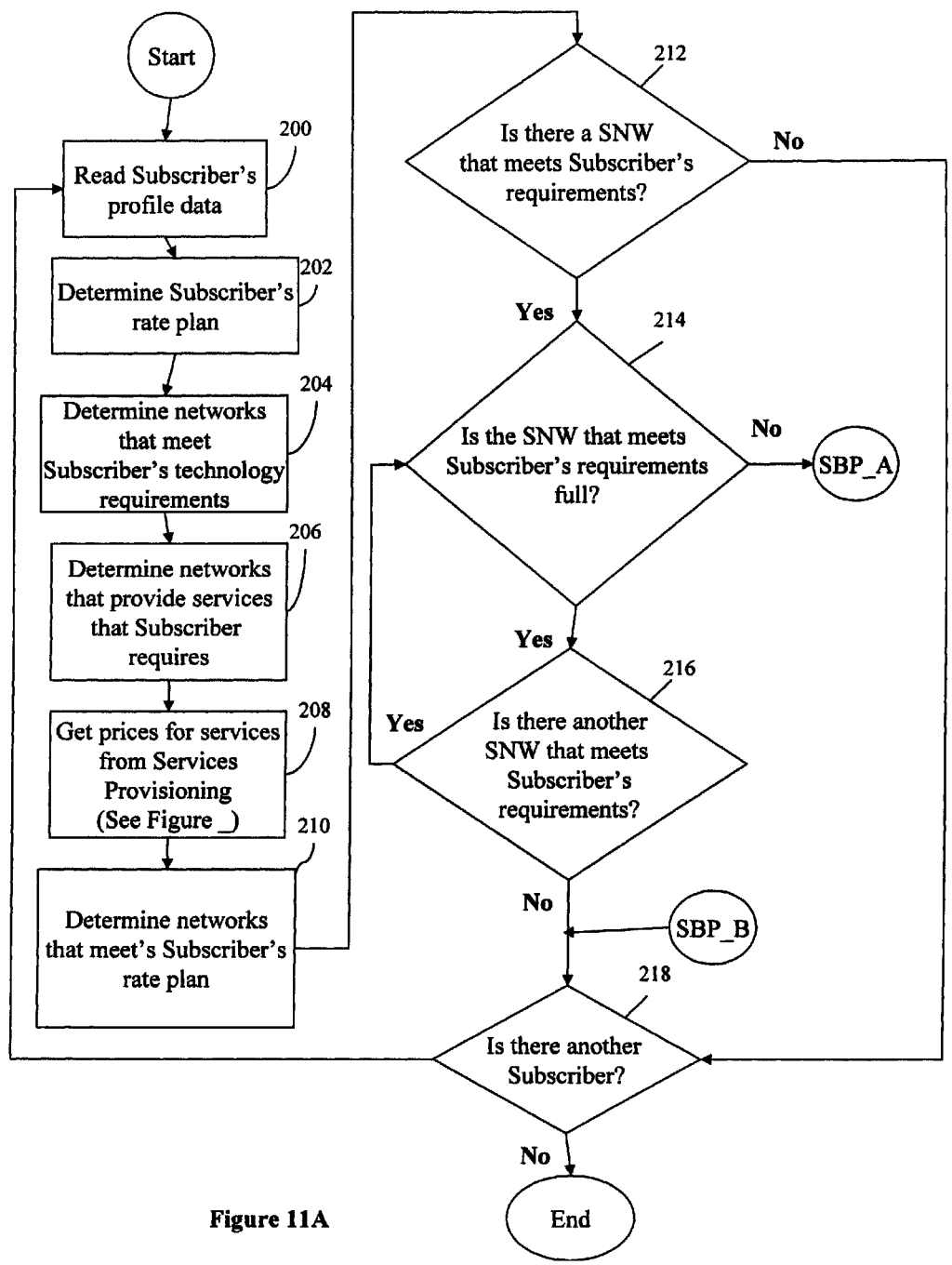
FIGS. 11A and 11B illustrate an exemplary method for provisioning subscribers.
Figure 11B:
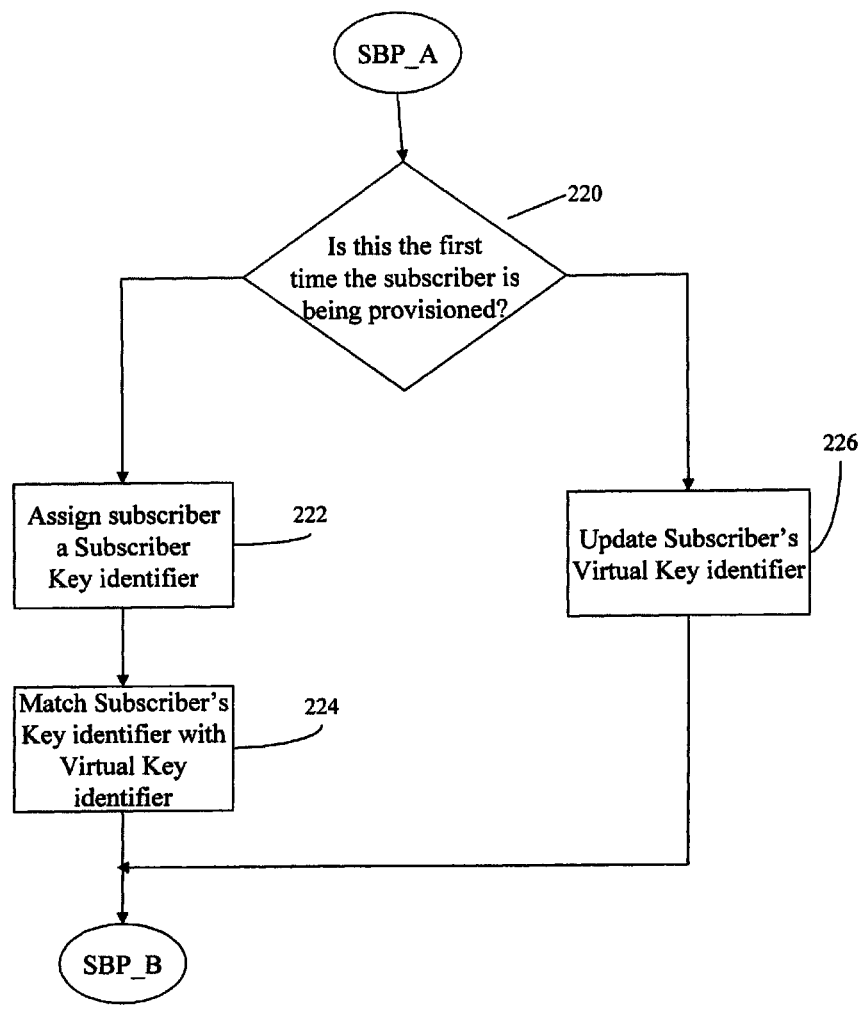

FIGS. 11A and 11B illustrate an exemplary method the virtual operator 100 or other entity performs in assigning a subscriber a Subscriber Key identifier and updating the Virtual Key identifier. The method illustrated in FIGS. 11A and 11B can be performed in the Subscriber Provisioning layer 104 of FIG. 4. While the method illustrated in FIGS. 11A and 11B is an exemplary embodiment, other methods may be used to assign a Subscriber Key identifier to a subscriber in updating the virtual key identifier.

Step 200 of FIG. 11A starts the subscriber provisioning process by reading subscriber's profile data. As one example, the virtual operator reads the subscriber's profile data illustrated in Table 5 of FIG. 10 from database 116 of FIG. 4. When the subscriber's profile data is obtained, step 202 determines the subscriber's rate plan from the profile data. Step 204 determines the serving networks that meet the subscriber's technology requirements. In one example, the virtual operator uses the retrieved subscriber profile data to determine the technology requirements of the subscriber. For example, Table 5 of FIG. 10 illustrates that subscriber SB3 uses a CDMA network. The virtual operator uses the SNW offerings from Table 1 of FIG. 6 to determine that serving networks SNW3 and SNW5 are CDMA networks. The virtual operator retrieves the SNW offerings in Table 1 of FIG. 6 from the database 116 of FIG. 4.

Step 206 determines the networks that provide services that the subscriber desires. As an example, the virtual operator uses the subscriber profile data to determine the services that the subscriber desires. Table 5 of FIG. 10 illustrates that subscriber SB3 desires services S3 and S4. The virtual operator determines which networks provide which services from the services provisioning layer 106 of FIG. 4, which will be described later in further detail. Once the serving networks that provide services that the subscriber desires are determined, step 208 retrieves the prices for the services from the services provisioning layer 106 of FIG. 4. When the prices for the services are retrieved, step 210 determines the networks that meets the subscriber's rate plan. In one embodiment, the virtual operator uses the retrieved subscriber profile data to determine the rate plan the subscriber uses, and comparing the rate plan with the prices that each serving network offers for the services. For example, Table 5 of FIG. 10 illustrates that subscriber SB3 desires services S3 and S4 at a fixed rate plan. Therefore, the virtual operator can determine the networks that provide these services at a fixed rate.

After step 210, flow proceeds to step 212 which determines if there is a serving network that meets the subscriber's requirements. If there is no serving network that meets the subscriber's requirement, flow proceeds to step 218. Step 218 determines if there is another subscriber that needs to be provisioned. If there is not another subscriber that needs to be provisioned, the process of FIG. 11A ends. If there is another subscriber that needs a subscriber identifier, flow returns to step 200 and repeats the same process.

If step 212 determines that there is a serving network that meets the subscriber's requirements, flow proceeds to step 214 which determines whether the network that meets the subscriber's requirements is fill. For example, Table 1 of FIG. 6 illustrates that 30,000 subscribers may be assigned identifiers to serving network SNW3. If 30,000 identifiers are already assigned to SNW3, then the network is full. If the network is full, flow proceeds to step 216 of FIG. 11A.

If step 216 determines there is another SNW that meets a subscriber's requirements, flow returns to step 214. For example, Table 5 of FIG. 10 illustrates that subscriber SB3 uses a CDMA network. Table 1 of FIG. 6 illustrates that serving network SNW3 and SNW5 are both CDMA networks. If serving network SNW3 is full, flow returns to step 214 to check to see if serving network SNW5 is full. If serving network SNW5 is not full, then flow proceeds from step 214 to process SBP_A of FIG. 11B. If there is not another SNW that meets the subscriber's requirements, flow proceeds from step 216 to step 218 and repeats the process described above for step 218.

In FIG. 11B, process SBP_A starts at step 220. If step 220 determines that this is the first time the subscriber is being provisioned, flow proceeds to step 222. As discussed above, the first time a subscriber is assigned a Subscriber Key identifier may occur when the subscriber enters into a contract with the MVNO. Step 222 assigns the subscriber a Subscriber Key identifier. Step 224 matches the subscriber's Virtual Key identifier to the subscriber's Subscriber Key identifier. Therefore, after step 224 is completed, subscriber SB3, who desires access to a CDMA network, as illustrated in Table 3 of FIG. 8, may be assigned a Subscriber Key identifier MIN #33 with the Virtual Key Identifier matching the Subscriber Key identifier, as illustrated in Table 2 of FIG. 7. After step 224 is completed, flow proceeds to process SBP_B of FIG. 11A.

Returning to step 220, if the subscriber has already been assigned a Subscriber Key identifier, flow proceeds to step 226. Step 226 updates the subscriber's Virtual Key identifier to match the network to which the subscriber is assigned. When step 226 is completed, flow proceeds to process SBP_B of FIG. 11A.

Step 226 represents the situation where a subscriber is transferred from one serving network to another serving network. For example, when a subscriber first enters into a contract with an MVNO, the virtual operator may assign the subscriber to serving network SNW1. However, if the MVNO decides that moving the subscriber to serving network SNW2 may be cheaper, the MVNO may have the virtual operator move the subscriber to serving network SNW2. By updating the subscriber's Virtual Key identifier to match an identifier on serving network SNW2, the subscriber may keep the Subscriber Key identifier that was assigned to the subscriber, when the subscriber was first assigned serving network SNW1. Therefore, the method of updating the Virtual Key identifier when a subscriber is transferred between serving networks provides the advantage of allowing the subscriber to keep the original Subscriber Key identifier. Thus, any hardware that the subscriber uses to log onto a serving network, such as an SIM card, need not be changed.

From step 224 or step 226, flow proceeds to process SBP_B of FIG. 11A. Process SBP_B starts at step 218 of FIG. 11A. When process SBP_B enters step 218, the process described above for step 218 is repeated.

Figure 12:
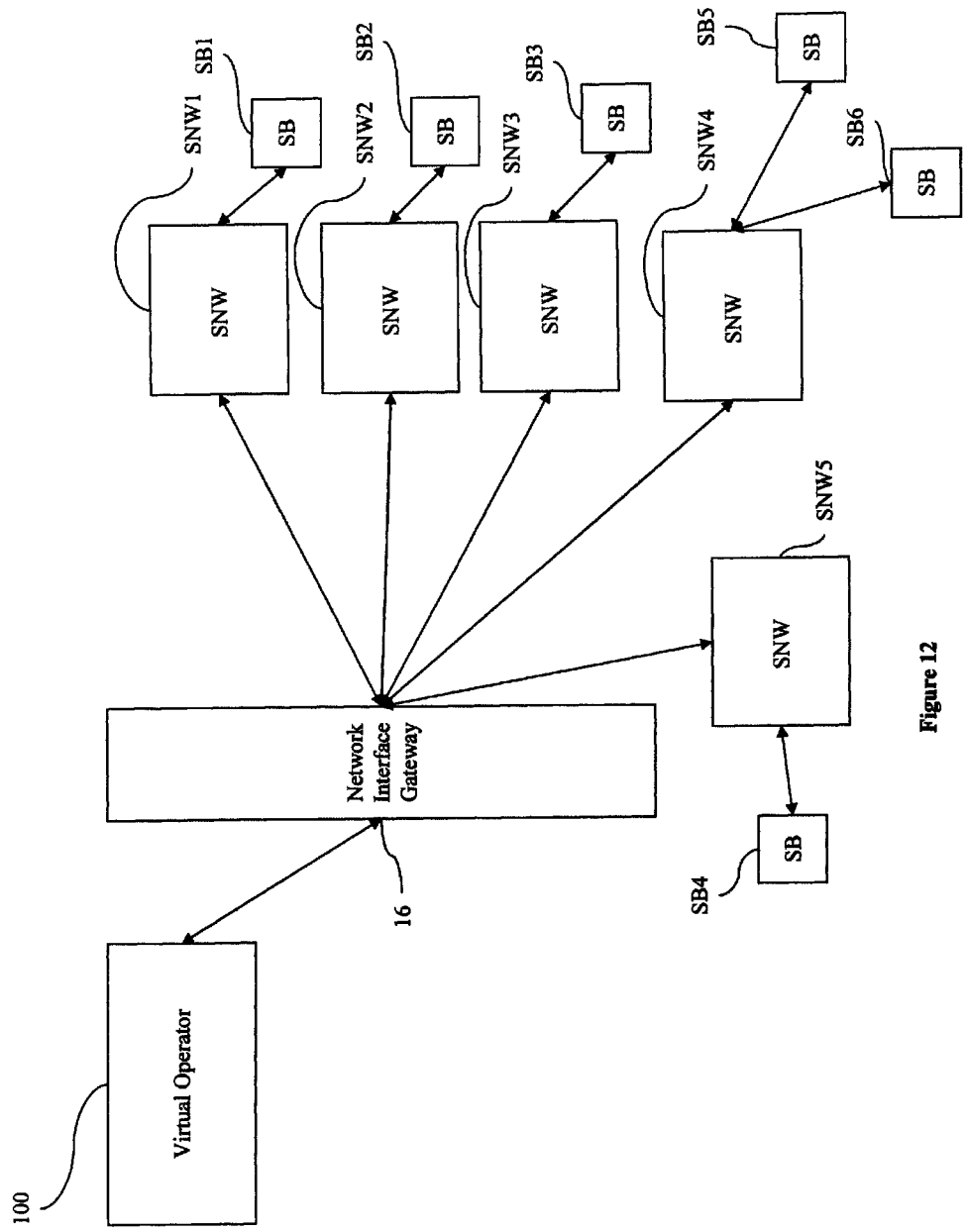
FIG. 12 illustrates the network configuration after the subscriber provisioning method is performed.

FIG. 12 illustrates an example network configuration after the virtual operator assigns the subscribers to the serving networks. The example network configuration illustrated in FIG. 12 is consistent with the information in Table 4 of FIG. 9. For example, in FIG. 12, subscriber SB1 is assigned to serving network SNW1, subscriber SB2 is assigned to serving network SNW2, subscriber SB3 is assigned to serving network SNW3, subscribers SB5 and SB6 are assigned to serving network SNW4, and subscriber SB4 is assigned to serving network SNW5. Therefore, after subscriber provisioning, the virtual operator 100 knows which subscribers are assigned to which networks. The virtual operator 100 and network interface gateway 16 provide the same functions as described for the virtual operator 100 and network interface gateway 16 of FIG. 5.

Services Provisioning Layer

The Services Provisioning layer 106 of FIG. 4 is responsible for mapping the services that each serving network provides. Table 6 of FIG. 13 illustrates the serving networks, the services that the MNOs provide on their serving network, and the price of the service. For example, the MNO of serving network SNW1 offers service S1 at price PS11 and service S2 at price PS12. The price of the service may be the price that the MVNO contracted for with the MNO.

Table 7 of FIG. 14 illustrates an example of the Services Availed, the Service Desired, and the Current Serving Network providing the service. The Service Desired in column 2 of Table 7 represents services that a subscriber subscribes for or may request. When the subscribers are provisioned for the first time, the Services Availed and Service Desired may be the same. The Service Desired and Services Availed may be different when the subscriber requests a service that is provided on a serving network different from the serving network that the subscriber is currently using.

Subscribers may subscribe for more than one service. Therefore, the subscriber may be provided a service from a serving network different from the serving network the subscriber is currently using. Table 8 of FIG. 15 illustrates the Service Desired for each subscriber, and the Serving Network providing the service to the subscriber. For example, subscriber SB3 desires service S3 and service S4. Table 6 of FIG. 13 shows that serving networks SNW3 and SNW4 both provide service S3. An example of services include call setup, text messaging content download. The method of choosing a serving network to provide a service when there is more than one serving network available, will be described in more detail when describing the functions of the Authorization layer 108 of FIG. 4. Table 8 of FIG. 15 illustrates that subscriber SB3 receives service S3 from serving network SNW3. However, since Table 6 of FIG. 13 illustrates that serving network SNW4 is the only serving network that provides service S4, the service is provided to subscriber SB3 from serving network SNW4. The asterisks next to serving networks SNW1 and SNW4 in column 3 of Table 8 indicate that more than one serving network can provide the service desired.

Selecting a serving network to provide a service can be based on multiple criteria such as, but not limited to, time sensitive rates, day sensitivity, and destination based rates.

These criteria may be used in determining which serving network is used to provide the particular service that a subscriber desires. Using these criteria when selecting a serving network will be described later in more detail when describing the functions of the Authorization layer 108.

Table 9 of FIG. 16 illustrates the relationship of the serving networks that each subscriber is assigned to for authentication, the services that each subscriber desires, and the serving network that provides the service to the subscriber. For example, subscriber SB3 is assigned to serving network SNW3, and is therefore be authenticated on serving network SNW3 when logging onto any serving network using Subscriber Key identifier MIN#33. When subscriber SB3 desires service S3, subscriber SB3 receives that service from SNW3. However, when subscriber SB3 requests service S4, subscriber SB3 receives service S4 from serving network SNW4. The asterisks next to serving network SNW1 and serving network SNW4 in column 3 of Table 9 indicate that more than one network is capable of providing the service desired.

The virtual operator internally keeps track of which serving networks provides which service. In one embodiment, the virtual operator uses a file located on a memory device such as database 116 of FIG. 4. For example, the virtual operator uses the services profile illustrated in Table 10 of FIG. 17 to determine services provided by each serving network.

Figure 18:
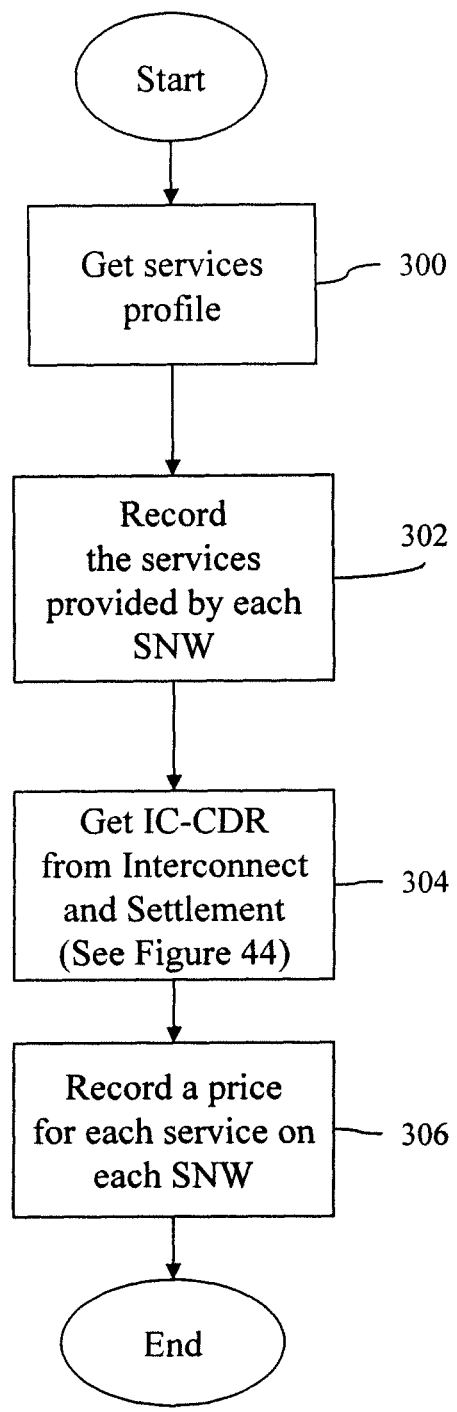
FIG. 18 illustrates an exemplary method for provisioning services.

FIG. 18 illustrates an exemplary method the virtual operator performs in the Services Provisioning layer 106 for provisioning the services. Step 300 retrieves the services profile. In one embodiment, the services profile is located in database 116 of FIG. 4. The services profile contains the same information as illustrated in Table 10 in FIG. 17. After the virtual operator gets the services profile, the virtual operator knows the services provided by each serving network. Step 302 records the services provided by each serving network. Step 304 receives an Interconnect Charge Detail Record (IC-CDR) from the Interconnect and Settlement layer 112 of FIG. 4. The generation of an IC-CDR will be described below in more detail when describing the Interconnect and Settlement layer 112 of FIG. 4. Table 29 in FIG. 44 illustrates that an IC-CDR contains the prices for each service on each serving network. Step 306 records a price for each service on each serving network ending the services provisioning process. After the services provisioning process ends, the virtual operator knows the services provided by each serving network, and the price for each service on each serving network, as illustrated in Table 6 of FIG. 13.

As an example, the virtual operator performs the above-described process in the Services Provisioning layer 106 of FIG. 4 each time the serving network changes, or the service on the serving network changes. For example, an MVNO may choose to stop using a particular serving network, because the cost of using that serving network is too high. Additionally, an MNO may decide to stop providing the service or add a service to its serving network. When an MNO adds a service to its serving network, the MVNO may contract with the MNO to allow the subscribers of the MVNO to use the MNOs newly provided service. Therefore, the process performed in the Services Provisioning layer 106 of the virtual operator 100 allows the subscribers of the MVNO to be independent of the services that each serving network provides.

Figure 19:
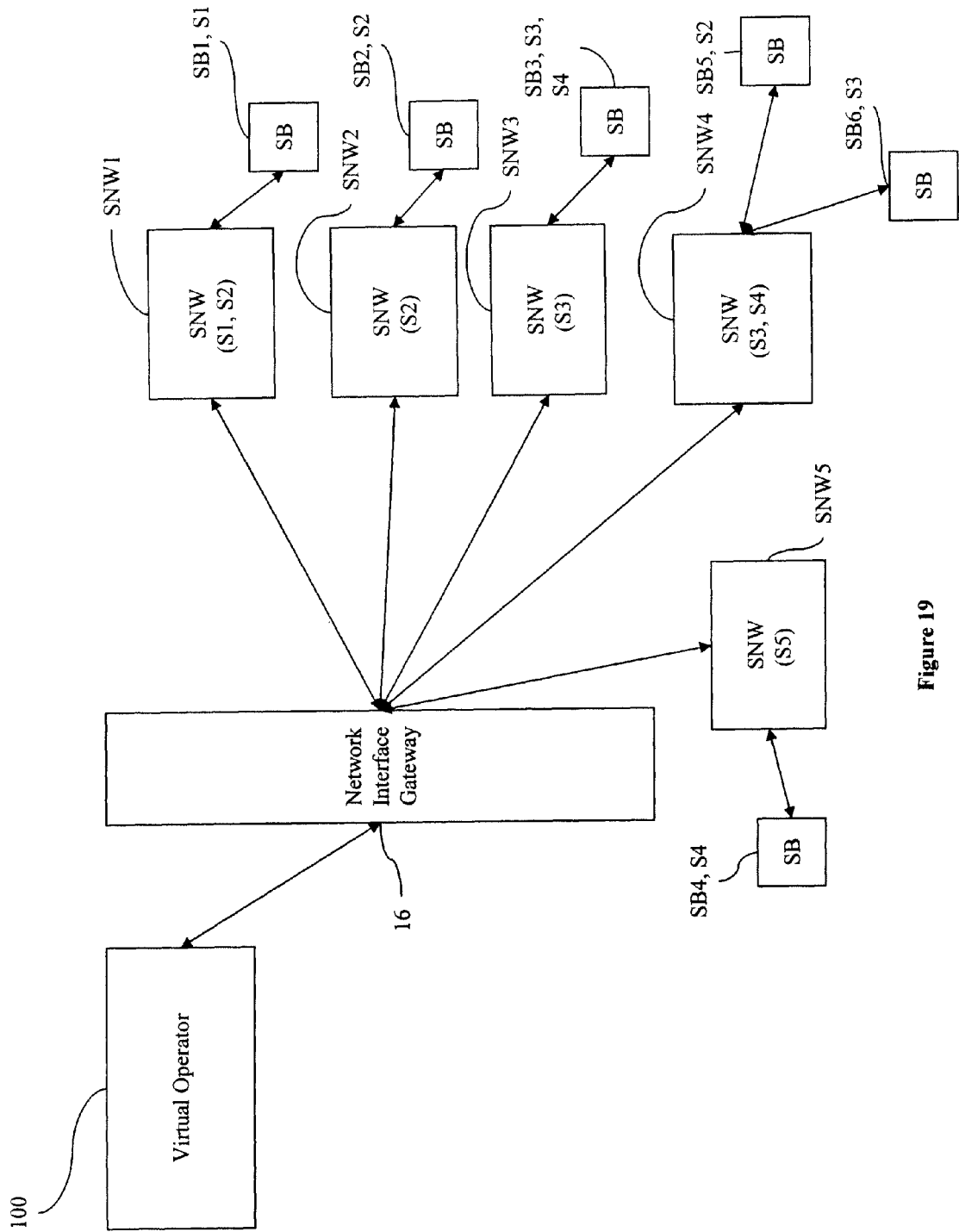
FIG. 19 illustrates the network configuration after subscriber provisioning and services provisioning are performed.

FIG. 19 illustrates an example network configuration that the virtual operator 100 keeps track of after subscriber provisioning and services provisioning are performed. FIG. 19 illustrates subscribers SB1 to SB6 assigned to their respective networks as shown in FIG. 12. Additionally, FIG. 19 illustrates the serving networks and the services they provide. For example, serving network SNW1 provides services S1 and S2, serving network SNW2 provides service S2, serving network SNW3 provides service S3, serving network SNW4 provides services S3 and S4, and serving network SNW5 provide service S5. Furthermore, FIG. 19 illustrates that the virtual operator 100 can keep track of the services that each subscriber uses. For example, subscriber SB1 uses service S1, subscriber SB2 uses service S2, subscriber SB3 uses services S3 and S4, subscriber SB4 uses service S4, subscriber SB5 uses service S2, and subscriber SB6 uses service S3. In one embodiment, virtual operator 100 stores this information and retrieves it when necessary in database 116 of FIG. 4. Network interface gateway 16 serves the same function as discussed for network interface gateway 16 of FIG. 2.

Authorization Layer

The Authorization Layer 108 of FIG. 4 performs the functions of identification, translation, and authentication. Each of the functions will be described in more detail in the following paragraphs.

Identification

When a subscriber attempts to log onto a network, the subscriber uses his or her respective Subscriber Key identifier. As an example, all authentication requests, which contain the subscriber's identifier, are forwarded to the virtual operator. Table 3 of FIG. 8 illustrates each subscriber and his or her respective Subscriber Key identifier. The virtual operator compares the identifier in an authentication request to the Subscriber Key identifier listed in column 2 of Table 3. If the identifier of an authentication request matches the Subscriber Key identifier listed in column 2 of Table 3, then the subscriber is successfully identified by the virtual operator.

Translation

The virtual operator performs translation for the technology and translation of the Virtual Key identifier for service delivery in the Authorization layer 108.

According to one embodiment of the present invention, translation for the technology is performed when a serving network providing the requested service is using a network protocol different than the serving network the subscriber is using. The virtual operator is configured to transmit and receive messages to and from networks running any desired protocol, such as the GSM protocol, the CDMA protocol, or the IP protocol.

Table 11 of FIG. 20 illustrates the technology types and the technology key identifiers used for a source network and a destination network. For example, a GSM network may use an IMSI identifier, a CDMA network may use an MIN identifier, and an IP network may use a user ID and password as a key identifier. Table 11 of FIG. 20 further illustrates when a translation from one network protocol to another network protocol is performed. For example, row 3 of Table 11 illustrates that the source network is a GSM network using an IMSI key identifier. The destination network is a CDMA network using the Wireless Intelligent Network (WIN) protocol with an MIN key identifier. Since the GSM network uses a GSM protocol and the CDMA network uses a WIN protocol, a translation of network protocols is performed when a message is passed from a GSM network to a CDMA network. Additionally, since the GSM network uses an IMSI key identifier and a CDMA network uses an MIN key identifier, a translation of the identifiers is also performed. Another example of when translation of network protocols is performed is illustrated in the fifth row of Table 11. The fifth row illustrates the source network is a GSM network, which runs the GSM network protocol, while the destination network is an IP network using an IP protocol. Therefore, when a message passes from the source GSM network to the destination IP network, a translation of network protocols is performed.

Additionally, since the GSM network uses an IMSI key identifier, and the IP network uses a user ID and a password as a key identifier, a translation of the key identifiers is also performed. Table 11 of FIG. 20 also illustrates the serving networks offering the technology for the destination network.

According to one embodiment, whether translation is performed is based on the contracts between the MVNO and the MNOs of the serving networks. For example, Table 11 of FIG. 20 illustrates that while a translation from a GSM network running the GSM protocol to a CDMA network running the WIN protocol is performed, Table 11 does not illustrate that CDMA to GSM translation takes place. Therefore, the virtual operator keeps track of when translation occurs.

An example of when translation for the technology and identifier is performed is now described. Subscriber SB3 has a dual mode phone that works on a CDMA and a GSM network. The subscriber SB3 is visiting a GSM network and turns on the phone while in the GSM network. When a subscriber turns on the phone, an authentication request is forwarded to the virtual operator. The virtual operator identifies the subscriber using the information in Table 3 of FIG. 8, and determines that the subscriber's authentication data is on serving network SNW3 based on the information contained in Table 4 of FIG. 9. Table 1 of FIG. 6 illustrates that serving network SNW3 is a CDMA network. Therefore, when the virtual operator forwards the authentication request to serving network SNW3, a translation from the GSM protocol to the network protocol of the CDMA network is performed, which will be described later in FIGS. 22A to 22C. Table 12 of FIG. 21 illustrates the type of translation performed for subscriber SB3. Table 12 illustrates that when a subscriber is visiting the GSM network, the subscriber is using an IMSI key identifier. However, the subscriber uses an MIN identifier when the authentication request is forwarded to serving network SNW3. To convert subscriber SB3's IMSI key identifier to its respective MIN key identifier, the virtual operator checks its translation table as illustrated in Table 2 of FIG. 7, to translate SB3's Subscriber Key identifier to its corresponding Virtual Key identifier.

In one embodiment, when translating from one network protocol to another protocol, the virtual operator translates a data format corresponding to the network protocol of the source network to a data format corresponding to a network protocol for the destination network. Table 13 of FIG. 22A illustrates an exemplary embodiment of the format of a GSM packet that is used on a network running the GSM protocol. Table 14 of FIG. 22B illustrates an exemplary embodiment of the format of an IP packet that is used on a network running the IP protocol. Table 15 of FIG. 22C illustrates an exemplary embodiment of the format of a CDMA packet.

Tables 13, 14, and 15 illustrate that each packet format has a specified header format that is used for each of the packets' respective network protocol. When data is transferred from a GSM network to an IP network, the header information of the GSM packet as illustrated in Table 15 of FIG. 22A is converted to match the header information of an IP packet as illustrated in Table 14 of FIG. 22B for the destination IP network to be able to properly receive the data packet from the GSM network. Additionally, the data field in the GSM packet of Table 13 is converted to match the data field of the IP packet illustrated in Table 14. Similar conversions are made if a GSM packet is converted to match a CDMA packet, or an IP packet is converted to match a CDMA packet. Any desired algorithm or software may be utilized to perform GSM to CDMA conversion, GSM to IP conversion, or IP to CDMA conversion. Examples of such algorithms or translation software may be found in U.S. Pat. No. 6,349,205 to Fang et al and U.S. Pat. No. 6,680,923 to Leon, the entire contents of both documents which are incorporated by reference.

Additionally, the virtual operator is configured to handle the signaling between the GSM network in an IP network, a GSM network and a CDMA network, or an IP network in a CDMA network. For example, when the virtual operator receives a packet from a GSM network, and forwards the packet to an IP network, the Authorization layer 108 of FIG. 4 performs the translation as discussed above and uses the Communication Protocols unit 122 to forward the pack to a network interface gateway, which forwards the packet to the IP network.

As described above in the dual mode phone example, the virtual operator is configured to perform the translation of the Subscriber Key identifier to the Virtual Key identifier in the Authorization layer 108. As an example, the Virtual Key identifier does not match the Subscriber Key identifier when the service provider for a subscriber changes. For example, when the MVNO changes the network its subscribers use, the subscriber's Virtual Key identifiers are updated to match the changed network. Table 16 of FIG. 23 illustrates the situation of when the MVNO transfers subscriber SB3 from serving network SNW3 to serving network SNW1. Table 3 of FIG. 8 illustrates that when the subscriber is first provisioned a Subscriber Key identifier, the Subscriber Key identifier is MIN #33 corresponding to an identifier for serving network SNW3. However, when subscriber SB3 is transferred to serving network SNW1, subscriber SB3 has a new identifier corresponding to serving network SNW1. However, since subscriber SB3 keeps the original subscriber key identifier MIN #33, only the Virtual Key identifier is updated. In one embodiment, updating the Virtual Key identifier is performed by the process described in FIGS. 11A and 11B. Furthermore, subscriber SB3 continues to use Subscriber Key identifier MIN #33 without seeing or having knowledge that the Virtual Key identifier has been updated.

Additionally, Table 16 of FIG. 23 illustrates that changing a Virtual Key identifier does not mean the serving network changed. For example, subscriber SB6 is provisioned a Subscriber key identifier User2@password. If the identifier User2@password were to become unavailable on serving network SNW5, the virtual operator updates subscriber SB6's Virtual Key identifier to a valid identifier, such as User3@password, on serving network SNW5 through the process described in FIGS. 11A and 11B. Table 16 further illustrates that when the Virtual Key identifiers for both subscribers SB3 and SB6 are changed, the Subscriber Key identifiers for SB3 and SB6 remain the same.

Table 17 of FIG. 24 illustrates the relationship between subscriber SB3's and SB6's old serving network to the new serving network. For example, subscriber SB3's old serving network was SNW3. However, subscriber SB3 was transferred to new serving network SNW1, reflected in the change to subscriber SB3's Virtual Key identifier. Additionally, Table 17 illustrates that even though subscriber SB6's Virtual Key identifier changed, subscriber SB6 did not change serving networks.

According to one embodiment, the virtual operator continues to use the Subscriber Key identifier to identify the subscriber even though the Subscriber's Virtual Key identifier changed. Thus, the subscriber continues to use his or her Subscriber Key identifier when requesting authentication. Table 18 of FIG. 25 illustrates that when a subscriber is transferred to a new network, the subscriber maintains his or her Subscriber Key identifier. For example, when subscriber SB3 was transferred to serving network SNW1, subscriber SB3 kept the same Subscriber Key identifier MIN #33. Therefore, even though the Virtual Key identifier IMSI #5 is used to authenticate subscriber SB3 as illustrated in Table 16 of FIG. 23, subscriber SB3 still continues to use MIN #33 to request authentication. Therefore, the Virtual Key identifier provides the advantage of allowing subscribers to keep their original Subscriber Key identifiers. By allowing subscribers to keep their subscriber key identifiers, the hardware that the subscribers use for authentication does not have to be changed.

Authentication

According to one embodiment, the virtual operator is configured to process all subscriber authentication requests in the Authorization layer 108. The virtual operator is configured to handle authentication requests from varying types of networks, such as IP networks, GSM networks, and CDMA networks. The format of an authentication request will be discussed later in more detail in FIGS. 26a and 27a.

As discussed in previous sections, an MVNO may contract with an MNO to receive subscriber identifiers. When the subscriber sends an authentication request to a serving network containing the subscriber's identifier, a network element such as the serving switch is configured to recognize that the subscriber identifier was contracted for with a particular MVNO, and therefore forward the authentication request to that MVNO's virtual operator instead of forwarding the authentication request to the serving network's network authentication element such as a Home Location Register (HLR). An HLR is a network authentication element containing a database of subscriber identifiers.

When the virtual operator receives the authentication requests, the virtual operator identifies the subscriber based on information contained in Table 3 of FIG. 8, and determines the serving network to perform authentication based on the information contained in Table 4 of FIG. 9. After the virtual operator determines the serving network that performs authentication, the virtual operator forwards the authentication requests to that serving network's authentication element such as a Home Location Register (HLR) or Service Control Point.

In an alternative embodiment, the virtual operator contains a stand-alone database or an Authentication, Authorization, or Accounting (AAA) server running the Remote Authentication Dial In User Service (RADIUS) or DIAMETER (upgrade from RADIUS) protocols for performing authentication. An AAA server and the RADIUS and DIAMETER protocols are known in the field of communications networking the virtual operator uses for performing authentication when receiving an authentication request instead of forwarding the authentication request to an authentication element of a serving network.

Format of Authentication and Service Requests

The format of an authentication request and a service request will now be discussed in more detail. According to an embodiment of the invention, the virtual operator is configured to process the authentication request as a service request.

Table 19A of FIG. 26A illustrates an exemplary embodiment of the format of the server's request packet. The service request packet contains field identifiers such as a Service Center Number, Service Type, Subscriber ID, and Subscriber Data. The Service Center Number field is used to indicate the network element that is to receive the requested service. The Service Type Field is used to indicate the type of service that is requested. The Subscriber ID field contains the identifier the subscriber uses when requesting authentication. The Subscriber Data Field holds the data used to perform the service. The service request packet illustrated in Table 19A is encoded in any format for a network running the GSM protocol, IP protocol, WIN protocol, or any other desired network protocol.

Table 19B of FIG. 26B illustrates an exemplary embodiment of types of Service Center Numbers. A Service Center Number indicates the network element that receives the requested service or performs the requested service. Table 19B illustrates each serving network, and a serving network's network address as illustrated in column 5 of Table 1 in FIG. 6. In another embodiment, a serving network comprises a number of network elements. For example, an IP network contains a number of switches, routers and hubs, with each network element having its own unique network address. The virtual operator is configured to hold information, such as in database 116 of FIG. 4, indicating which network element in each serving network performs a service, or which network element in each serving network receives the result of a service request. An MNO provides the MVNO with this information, which the MVNO enters into the virtual operator. For simplicity, Table 19B of FIG. 26B lists only one network address as a Service Center Number for each serving network.

In another embodiment, a binary number represents a service center number, where a unique binary number represents each network element to perform a service or receive a service. The virtual operator is configured to translate the binary number to a network element of a serving network.

Table 19C of FIG. 26C illustrates Service Types for a corresponding service. According to one embodiment of the present invention, the Service Type field is represented by a binary number, and each service is represented by a unique binary number. For example, Table 19C illustrates that the authentication service is represented by the binary number 00, a text messaging service is represented by the binary number 01, an e-mail service is represented by the binary number 10, and the voicemail service is represented by a binary number 11. The virtual operator is not limited to handling service requests for the services listed in Table 19C. When an MNO adds a service to its serving network, the virtual operator updates the information in Table 19C to include the new service, and provide a unique binary identifier for the new service.

When a subscriber makes a request for authentication, the subscriber's device forwards a service request packet to a serving network with the Service Type indicating authentication. Table 20A of FIG. 27A illustrates an exemplary embodiment of a service request packet where the service requested is authentication. The Service Type 00 indicates that a subscriber is making a request for authentication, which the virtual operator verifies from Table 19C of FIG. 26C. The Service Center Number GT:103 indicates that the subscriber is making a request for authentication from serving network SNW3, which the virtual operator verifies from Table 19B of FIG. 26B. The virtual operator verifies from Table 16 of FIG. 23 that a Subscriber ID of MIN #33 corresponds to subscriber SB3. When a request for authentication is made, the Subscriber Data field is left empty since the Subscriber ID is used to verify the authentication. When serving network SNW3 receives the service request for authentication, the serving network SNW3 forwards the service packet to the virtual operator.

Table 20B of FIG. 27B illustrates an exemplary embodiment of a translated service request packet. Since the service requested is for authentication, the virtual operator checks the Virtual Key identifier of the subscriber making the authentication request. The virtual operator verifies from Table 16 in FIG. 23 that the Virtual Key identifier for subscriber SB3 is IMSI #5, and serving network SNW1 performs the authentication. Using Table 19B of FIG. 26B, the virtual operator verifies that serving network SNW1's network address and Service Center Number is GT:101. Therefore, since serving network SNW1 performs the authentication, Table 20B of FIG. 27B illustrates that the Service Center Number is changed to GT:101. Furthermore, since the Virtual Key identifier, used for authenticating the subscriber is not the same as the Subscriber Key identifier, Table 20B illustrates that the virtual operator updated the Subscriber ID field of the service to IMSI #5. After the virtual operator translates the service request packet as shown in Table 20B, the virtual operator forwards the service request packet to serving network SNW1.

Table 20C of FIG. 27C illustrates an exemplary embodiment of a packet indicating the Service Result. In another embodiment, the Service Result is represented by a binary number, where a unique binary number is used to represent the different types of service results.

Table 21A of FIG. 28A illustrates an exemplary embodiment of a service request packet, where the service requested is text messaging. When the virtual operator receives the service request packet illustrated in Table 21A, the virtual operator determines from Table 19B of FIG. 26B that a Service Center Number GT:101 corresponds to a service request from serving network SNW1. The virtual operator verifies from Table 19C of FIG. 26C that a Service Type 01 corresponds to a text messaging service. The virtual operator verifies from Table 16 of FIG. 23 that a Subscriber ID of IMSI #20 corresponds to subscriber SB2. The Subscriber Data field of the service request packet illustrated in Table 21A indicates that subscriber SB2 is sending a text message containing the word "Hello."

Table 21B of FIG. 28B illustrates an exemplary embodiment of the translated service request packet. Using Table 6 of FIG. 13 which is generated using the method described in FIG. 18, the virtual operator determines which serving networks provide the text messaging service. For example, if the text messaging service corresponds to service S3, then the virtual operator verifies from Table 6 of FIG. 13 that serving networks SNW3 and SNW4 provide service S3, the text messaging service. The virtual operator chooses between serving network SNW3 and SNW4 to provide the text messaging service to subscriber SB2. Details of how the virtual operator chooses between serving networks are set forth below.

If the virtual operator chooses serving network SNW3 to provide the text messaging service, the virtual operator uses Table 19B of FIG. 26B to translate the Service Center Number to GT:103 as illustrated in Table 21B of FIG. 28B. Since the Subscriber ID is not used for performing the text messaging service, the Subscriber ID is not translated. After the virtual operator translates the service request packet as illustrated in Table 21B, the virtual operator forwards the service request packet to the network element of the serving network that performs the service requested, which is indicated in the Service Center Number field.

Table 21C of FIG. 28C illustrates an exemplary embodiment of a packet containing the Service Result. The service center number GT:101 in Table 21C illustrates that serving network SNW1 receives the result of the service. The Service Result field in Table 21C indicates that the message was received. The Service Result is not limited to the embodiment illustrated in Table 21C. For example, in another embodiment, the Service Result is represented by a binary number, where a unique binary number is used to represent each type of service result.

Figure 29A:
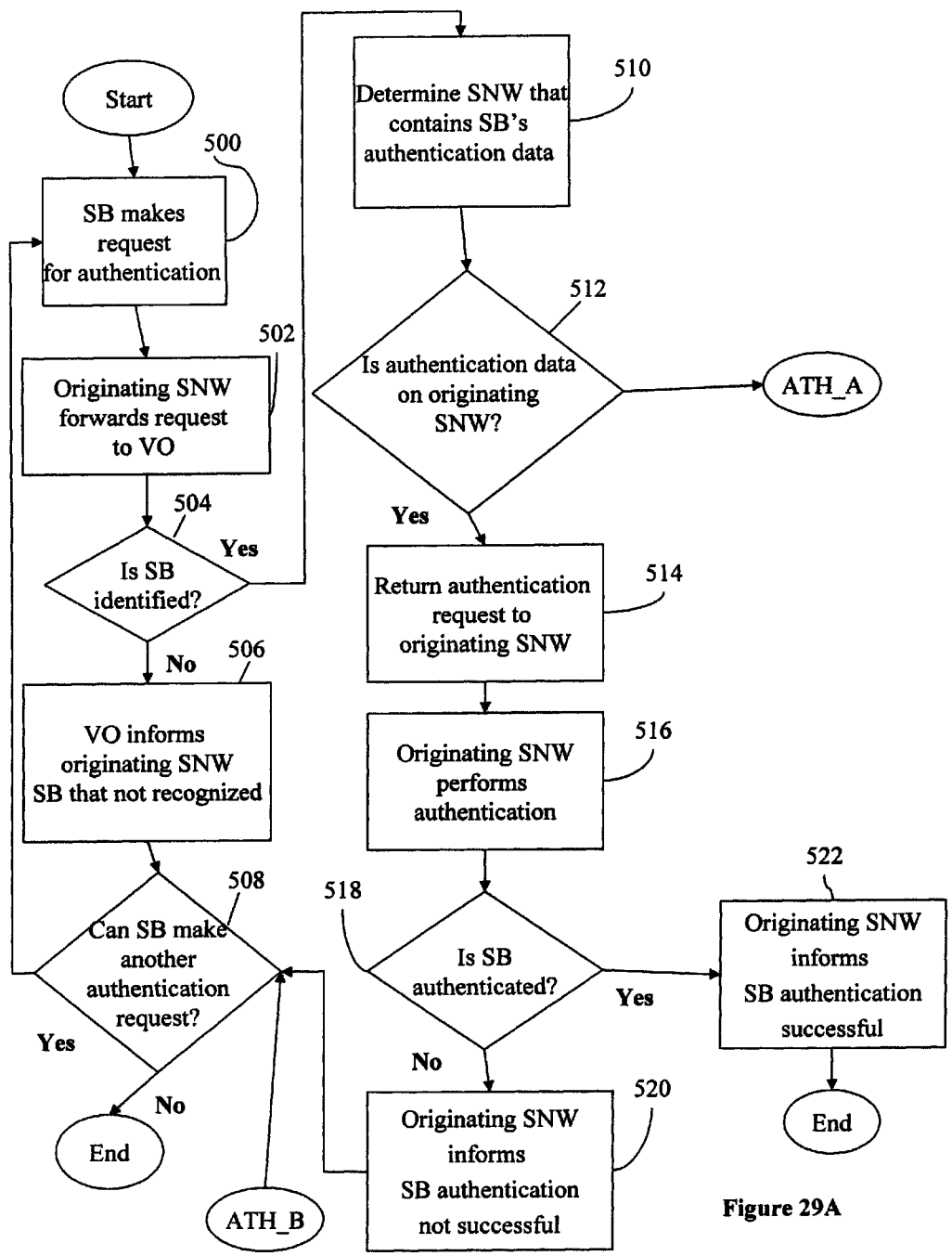
FIGS. 29A and 29B illustrate an exemplary method for servicing an authentication request.
Figure 29B:
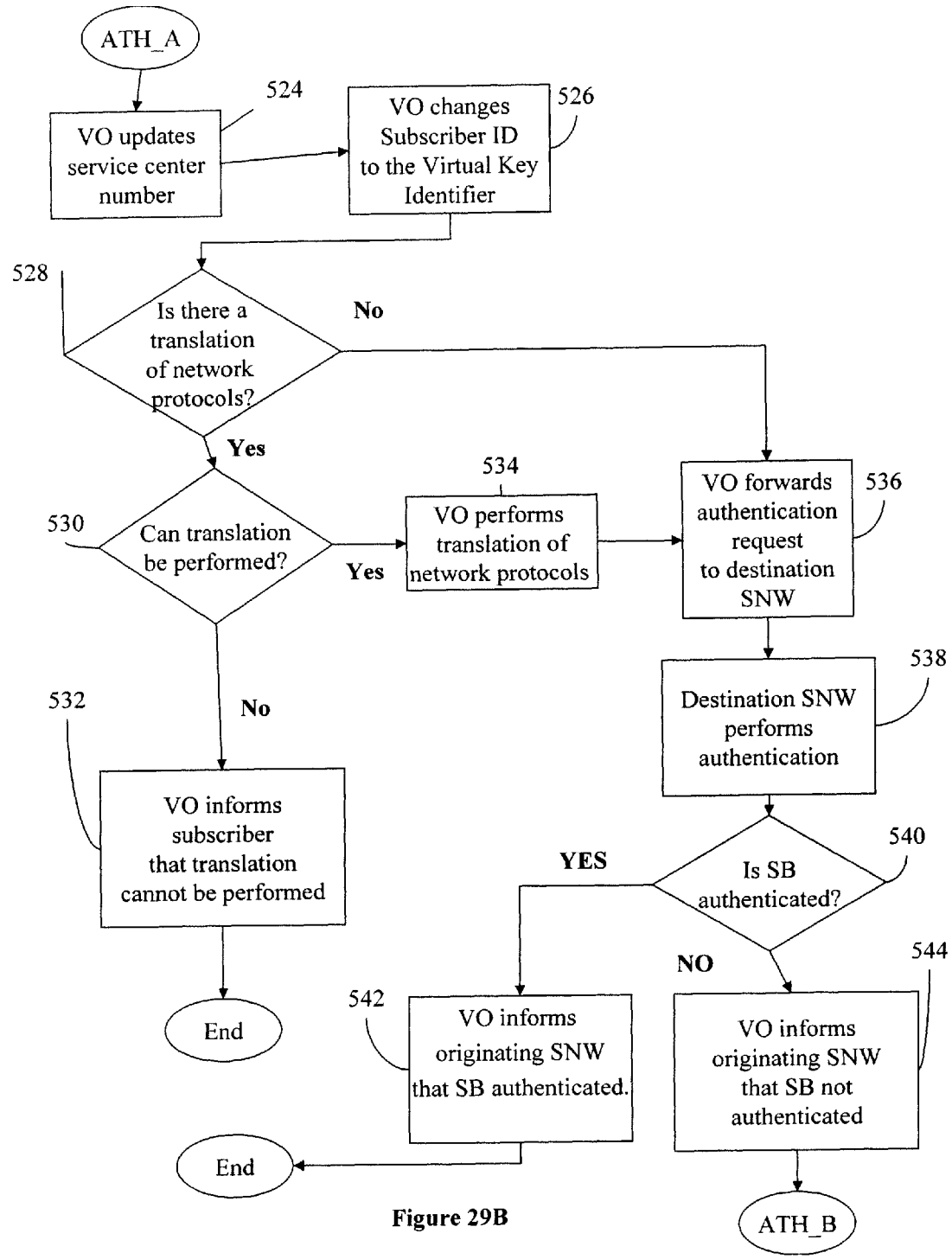

An exemplary method for performing authentication is illustrated in the flow diagrams of FIGS. 29A and 29B. The process starts at step 500 of FIG. 29A when a subscriber makes a request for authentication. A request for authentication may occur when a subscriber first turns on a device, such as a cell phone, and the device needs to be authenticated. The subscriber's device forwards the authentication request to a serving network's element such as a serving switch. According to one embodiment of the present invention, the authentication request is in the form of a service request packet illustrated in Table 20A of FIG. 27A, where the Service Type field in the service request packet indicates that authentication is the service requested. Step 502 forwards the request from the serving network to the virtual operator. The serving network that receives the authentication request is designated as the originating serving network.

Step 504 identifies the subscriber from the subscriber ID field of the service request packet. In one embodiment, the virtual operator uses Table 16 of FIG. 23 to verify that the subscriber ID MIN #33 corresponds to subscriber SB3. If step 504 does not verify the subscriber, i.e. the subscriber ID does not match a Subscriber Key identifier listed in Table 16 of FIG. 23, flow proceeds to step 506 to inform the originating serving network that the subscriber is not recognized. The process ends at step 508 if the subscriber cannot make another request for authentication. Flow proceeds from step 508 to step 500, where the same process is repeated.

If step 504 identifies the subscriber, then flow proceeds to step 510. Step 510 determines the serving network that contains the subscriber's authentication data. In one embodiment, the virtual operator verifies the serving networks that contain the subscriber's authentication data from Table 16 of FIG. 23. For example, when subscriber SB3 is making a request for authentication, Table 16 indicates that serving network SNW1 is the serving network that performs authentication for subscriber SB3. On the other hand, if subscriber SB2 is making a request for authentication, Table 16 indicates that serving network SNW2 is the serving network that performs authentication for subscriber SB2.

Step 512 determines if the serving network performing the authentication is the same as the originating serving network. According to one embodiment, the virtual operator determines if the serving network performing authentication is the same as originating serving network from the Service Center Number as illustrated in Table 20A of FIG. 27A, and Table 16 of FIG. 23. For example, if subscriber SB3 is making a request for authentication from serving network SNW1, the Service Center Number of the service request packet may correspond to the network address for serving network SNW1, which Table 19B of FIG. 27B indicates as GT:101.

Flow proceeds from from step 512 to step 514 if the serving network performing authentication is the same as the originating SNW, and returns the authentication request to the originating serving network. Step 516 performs the authentication service at the originating serving network. In one embodiment, the originating serving network performs authentication by forwarding the authentication request to a network authentication element such as an HLR. In an alternative embodiment, the virtual operator forwards the authentication request directly to the serving network's authentication element.

Flow proceeds from step 518 to step 522 if the originating serving network indicates that the subscriber is successfully authenticated. Step 522 informs the subscriber that the authentication is successful, and the authentication process ends. Flow proceeds from step 518 to step 520 if the originating serving network indicates that the subscriber is not successful authenticated. Step 520 informs the subscriber that the authentication was not successful and flow proceeds to step 508 where the same process is repeated.

Flow proceeds from step 512 to process ATH_A of FIG. 29B if the serving network performing authentication is different from the originating serving network, the virtual operator moves to process ATH_A of FIG. 29B. For example, if subscriber SB3 is making an authentication request from serving network SNW3, Table 16 in FIG. 23 indicates that serving network SNW1 is the serving network that performs authentication. Therefore, the originating serving network, serving network SNW3, is different than the serving network performing authentication, serving network SNW1.

Process ATH_A of FIG. 29B starts at step 524. Process ATH_A is entered when the serving network performing authentication is different than the originating serving network. Step 524 updates the Service Center Number since the serving network performing authentication is different than the originating serving network. In one embodiment, the virtual operator updates the Service Center Number using Table 16 of FIG. 23 to correspond to the serving network that performs authentication. For example, since Table 16 of FIG. 23 illustrates that the serving network performing authentication for subscriber SB3 is SNW1, the virtual operator updates the Service Center Number of the received service request packet to GT:101, which Table 19B of FIG. 26B indicates as the Service Center Number for serving network SNW1.

Step 526 changes the Subscriber ID field as illustrated in Table 20B of FIG. 27B to the Virtual Key identifier of the subscriber. For example, Table 16 of FIG. 23 illustrates that when subscriber SB3 logs onto a network, subscriber SB3 uses a Subscriber Key identifier of MIN #33. However, the Subscriber ID field of the service request packet is changed to match the Virtual Key identifier, which Table 16 of FIG. 23 indicates as IMSI #5.

Step 528 determines if there is a translation of network protocols. Column 6 of Table 1 in FIG. 6 lists the types of networks for each of the serving networks. For example, if subscriber SB3 is making a request for authentication from serving network SNW3, and serving network SNW1 is the network performing authentication, Table 1 of FIG. 6 indicates that the network protocol for the originating serving network SNW3, a GSM network, is not the same as the destination serving network SNW1, which is a CDMA network.

Flow proceeds from step 528 to 530 if the network protocol of the originating network is not the same as the network protocol for the destination network. Step 530 determines if translation can be performed. In one embodiment, the virtual operator uses Table 11 of FIG. 20 to determine if translation can be performed. For example, Table 11 of FIG. 20 illustrates that translating from CDMA to GSM is not available. Therefore, since translation cannot be performed for the above-mentioned example, flow proceeds from step 530 to step 532. Step 532 informs the subscriber that translation cannot be performed, and the authentication process ends.

If translation can be performed, i.e. Table 11 of FIG. 20 indicates that translation is possible, flow proceeds from step 530 to step 534. Step 534 translates the authentication request packet from the format of the network protocol of the originating serving network to the format of the network protocol of the destination serving network. The destination serving network is the serving network performing authentication. According to one embodiment of the present invention, the virtual operator performs translation using method discussed for FIGS. 22A, 22B, and 22C.

Step 536 forwards the authentication request to the destination serving network. Additionally, flow proceeds from step 528 to step 536 if the network protocol of the originating network is the same as the network protocol for the destination network. Step 538 authenticates the subscriber at the destination serving network. Step 540 determines if the subscriber is successfully authenticated at the destination serving network. Flow proceeds from step 540 to step 542 if the destination serving network indicates that the subscriber is successfully authenticated. Step 542 informs the originating serving network that the subscriber is successfully authenticated and the authentication process ends. Flow proceeds from step 540 to step 544 if the subscriber is not successfully authenticated at the destination serving network. Step 544 informs the originating serving network that the subscriber is not successfully authenticated, and flow proceeds to process ATH_B of FIG. 29A.

According to one embodiment of the present invention, the destination serving network forwards the authentication result directly to the originating serving network. In another embodiment, the destination serving network forwards the authentication result to the virtual operator, and the virtual operator forwards the authentication result to the serving network.

Process ATH_B of FIG. 29A starts at step 508 of the authentication process. The process described earlier for step 508 is repeated when process ATH_B is entered.

Figure 30:
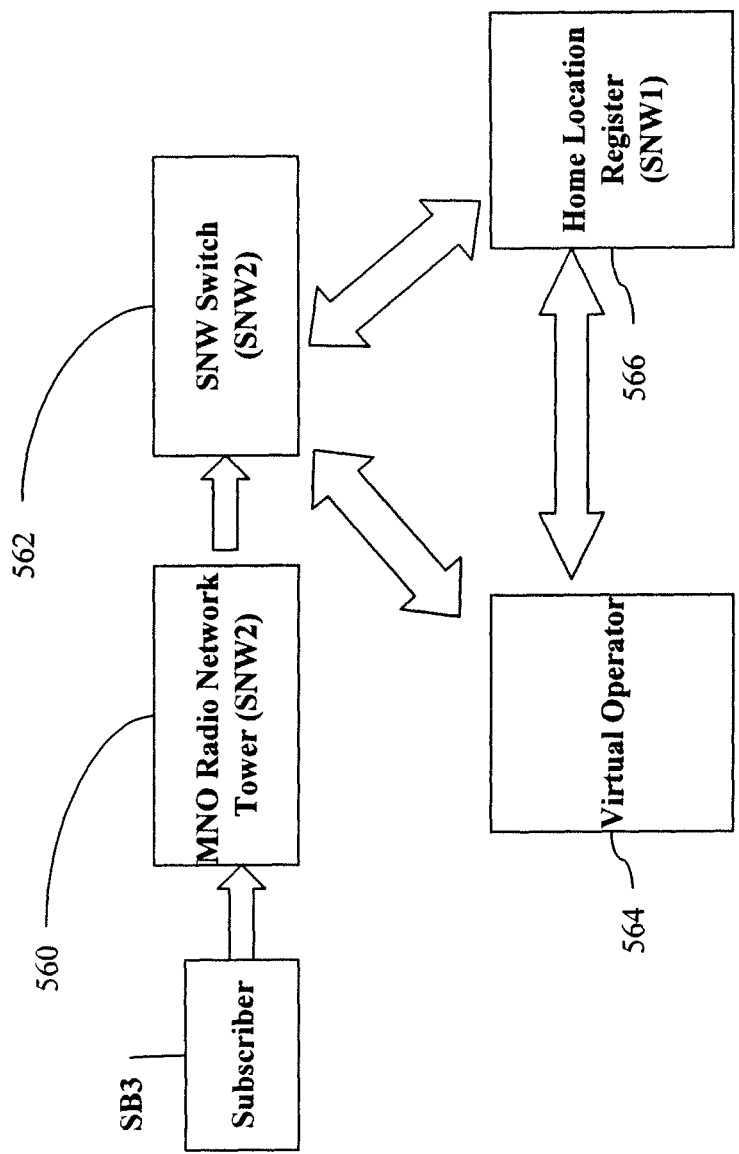
FIG. 30 illustrates an example network configuration that handles an authentication request.

FIG. 30 illustrates an example for subscriber authentication on a serving network using the exemplary method described in FIGS. 29A and 29B. Subscriber SB3 is visiting serving network SNW2. Subscriber SB3 turns on his device, such as a cell phone, which sends an authentication request to a MNO radio network tower 560 for serving network SNW2. In one embodiment, the authentication request is in the form of the service request packet illustrated in Table 28 of FIG. 27A. The MNO radio network tower 560 forwards the authentication request to a serving network switch 562 of serving network SNW2. Based on contracts between the MNO and the MVNO, the serving network switch 562 knows from the ID contained in the Subscriber ID field of the authentication request illustrated in Table 20A of FIG. 27A to forward the authentication request to a virtual operator 564.

The virtual operator 564 contains the same components and performs the same functions described for virtual operator 100 in FIG. 4. When the virtual operator 564 receives the authentication request packet, the virtual operator identifies the subscriber, determines the serving network that performs authentication for the subscriber, and forwards the authentication request to the serving network that performs authentication as illustrated in FIGS. 29A and 29B. For example, since subscriber SB3 is making the request for authentication, the virtual operator 564 verifies from Table 16 of FIG. 23 that subscriber SB3's Virtual Key identifier is IMSI #5, and serving network SNW1 performs the authentication for subscriber SB3. Therefore, the virtual operator 564 updates the Subscriber ID field of the authentication request to match the Virtual Key identifier for subscriber SB3, and updates the Service Center Number of the authentication request to match the Service Center Number for the authentication element of SNW1 to perform authentication, as illustrated in Table 20B of FIG. 27B. Furthermore, since Table 1 of FIG. 6 indicates that serving networks SNW1 and SNW2 are both GSM networks running the GSM protocol, the virtual operator 564 does not perform a translation of the network protocols.

FIG. 30 illustrates that a home location register (HLR) 566 of SNW1 performs the authentication for subscriber SB3. Therefore, the virtual operator 564 forwards the authentication request to the HLR 566 of serving network SNW1. After the HLR 566 performs authentication, the HLR 566 forwards the results to the virtual operator 564. After receiving the authentication results, the virtual operator 564 informs subscriber SB3 whether authentication was successful. In an alternative embodiment, the HLR 566 directly informs subscriber SB3 the results of the authentication.

Figure 31A:
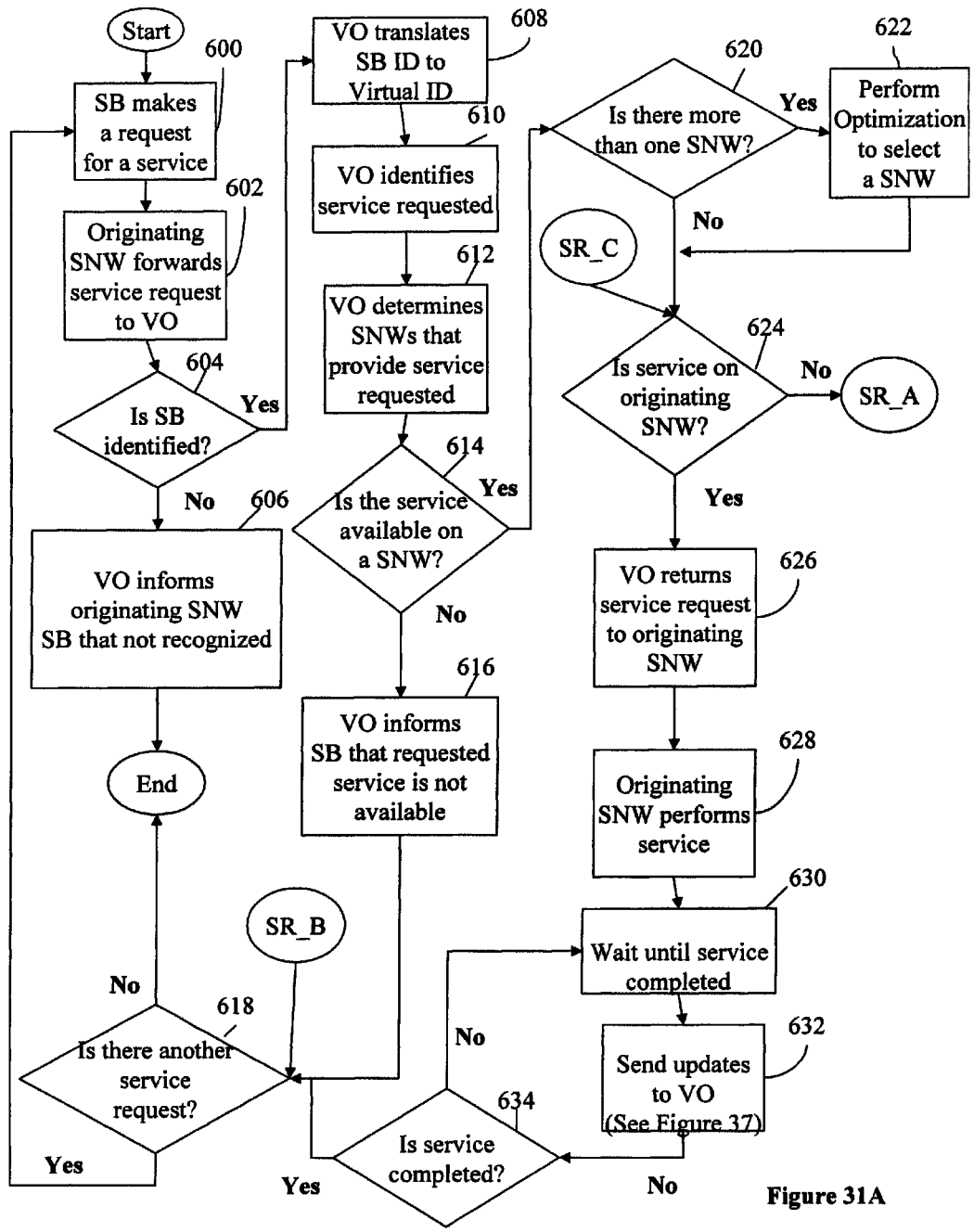
FIGS. 31A and 31B illustrate an exemplary method for handling a service request.
Figure 31B:
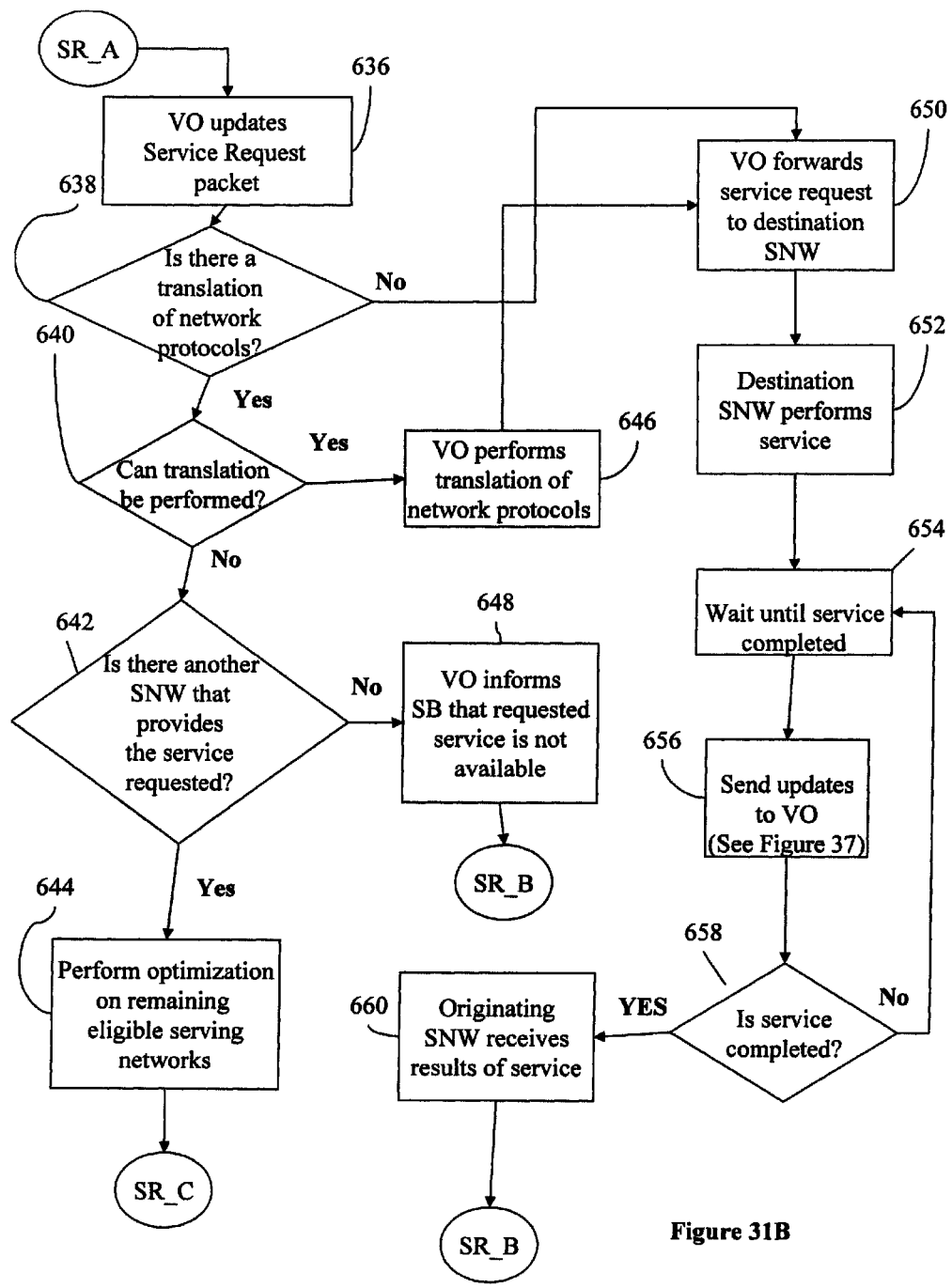

While FIGS. 29A and 29B, illustrated an exemplary method for handling a request for authentication, an exemplary method for handling a general service request is illustrated in the flow diagrams of FIGS. 31A and 31B. Additionally, an exemplary method for selecting a network to provide a service will be described with respect to FIG. 32.

Step 600 starts the service request process when the subscriber makes a request for a service. When the subscriber makes a request for a service, a service request packet as illustrated in Table 21A of FIG. 28A is forwarded to a network element for a serving network. For example, if a subscriber requests text messaging on a cell phone, the cell phone sends a service request packet to a radio network tower of a serving network that the subscriber is visiting. Step 602 forwards the service request packet from the serving network to the virtual operator. The serving network that receives the service request packet is designated as the originating serving network.

Step 604 determines if the subscriber is identified. In one embodiment, the virtual operator identifies the subscriber by comparing the Subscriber ID field of the service request packet in Table 21A of FIG. 28A with the Subscriber Key identifier in Table 16 of FIG. 23. Flow proceeds from step 604 to step 606 if the subscriber ID field in the service request packet does not match the subscriber's Subscriber Key identifier. Step 606 informs the originating serving network that the subscriber is not recognized, and the service request process ends. This situation occurs when the subscriber is using an unauthorized device that cannot be authenticated. If the subscriber ID field in the service request packet matches the subscriber's Subscriber Key identifier, flow proceeds from step 604 to step 608.

Step 608 translates the Subscriber ID of to the Subscriber's Virtual Key identifier. Step 610, identifies the service requested from the service request packet. In one embodiment, the virtual operator identifies the service requested by comparing the Service Type field of the service request packet in Table 21A to the Service Types listed in Table 19C of FIG. 26C. For example, Table 21A of FIG. 28A lists a Service Type of 01, and Table 19C of FIG. 26C indicates Service Type of 01 as the text messaging service.

Step 612 determines the serving networks that provide the service requested. According to one embodiment of the present invention, the virtual operator determines uses Table 6 of FIG. 13 to determine which serving networks provide the requested service. For example, Table 6 of FIG. 13 lists the services each serving network provides. For example, if the text messaging service corresponds to service S2, then the virtual operator determines that serving networks SNW1 or SNW2 can be selected to provide the service.

Step 614 determines if the service requested is available on a serving network. If the service requested is not available on a serving network, flow proceeds from Step 614 to step 616. This situation arises when a serving network that provides a requested service is offline or the service requested is not listed in Table 6 of FIG. 13. Step 616 informs the subscriber that the requested service is not available and flow proceeds from step 616 to step 618. If there is no other service request, the service request process ends at step 618. If there is another service request, flow returns to step 600 and the same process described above for step 600 is repeated.

If the service requested is available on serving network, flow proceeds from step 614 to step 620. If more than one serving network provides the service requested, flow proceeds from step 620 to step 622. For example, as illustrated above, if the text messaging service corresponds to service S2, then the virtual operator knows that serving network SNW1 and SNW2 provide the text messaging service. Step 622 performs optimization techniques to select a serving network to provide the service requested. According to one embodiment of the present invention, the virtual operator performs optimization techniques to determine the serving network that provides the requested service to the subscriber at the least cost to the MVNO. The criteria for performing optimization will be described in more detail when describing the flow diagram illustrated in FIG. 32.

Flow proceeds from step 622 to step 624. Furthermore, flow proceeds from step 620 to step 624 if no more than one serving network provides the requested service. Step 624 determines if the serving network providing the service requested is on the originating serving network. In one embodiment, the virtual operator determines if the serving network providing the service requested is the originating serving network from the Service Center Number of the service request packet in Table 21A of FIG. 28A. For example, Table 28A lists a service center number of GT:101, which the virtual operator verifies from Table 19B of FIG. 26B as corresponding to serving network SNW1. If the serving network corresponding to the Service Center Number of the service request packet matches the selected serving network to provide the service, then the originating serving network is the serving network selected to provide the service to the subscriber. If the serving network corresponding to the Service Center Number of the service request packet does not match the selected serving network, then the originating serving network is not serving network selected to provide the service.

In an alternative embodiment, the virtual operator is configured to handle a scheme where a serving network has more than one network element providing a service. If more than one network element is providing a service, each network element in the serving network has its own Service Center Number. The virtual operator is configured to determine the serving network that the Service Center Number in the service request packet corresponds to. When a network element is selected to provide the service, the virtual determines if the serving network that the selected element network is on matches the serving network indicated in the Service Center Number in the service request packet.

If the originating serving network provides the requested service, flow proceeds from step 624 to step 626. Step 626 returns the service request to the originating serving network. Step 628 performs the service on the originating serving network.

Step 630 waits for the originating serving network to complete the service. While the service is being performed, flow proceeds from step 630 to step 632. Step 632 sends updates to the virtual operator. The content of the updates will be described later in more detail in Table 23 of FIG. 36. Step 634 determines if the service is completed on the originating serving network. If the service on the originating serving network is not completed, flow proceeds from step 634 to step 630, and the process described above for step 630 is repeated. If the service on the originating serving network is completed, flow proceeds from step 634 to step 618, and the process described above for step 618 is repeated.

Returning to step 624, flow proceeds from step 624 to process SR_A of FIG. 31B if the serving network selected to provide the service is not the same as the originating serving network. Step 36 updates the service request packet. According to one embodiment of the present invention, the virtual operator updates the service request packet by translating the Service Center Number of the service request packet in Table 21A to match the Service Center number of the serving network providing the service, as illustrated in Table 21B of FIG. 28B.

Step 638 determines if there is a translation of network protocols. Column 6 of Table 1 in FIG. 6 lists the types of networks for each of the serving networks. For example, if subscriber SB3 requests a service from serving network SNW3, and serving network SNW1 is the network providing the service, Table 1 of FIG. 6 indicates that the network protocol for the originating serving network SNW3, a GSM network, is not the same as the destination serving network SNW1, which is a CDMA network. The destination serving network is the serving network providing the requested service.

Flow proceeds from step 638 to 640 if the network protocol of the originating serving network is not the same as the network protocol for the destination serving network network. Step 640 determines if translation can be performed. In one embodiment, the virtual operator uses Table 11 of FIG. 20 to determine if translation can be performed. For example, Table 11 of FIG. 20 illustrates that translating from CDMA to GSM is not available. Therefore, since translation cannot be performed for the above-mentioned example, flow proceeds from step 640 to step 642.

Step 642 determines if there is another serving network that provides the service requested. For example, if serving networks SNW1, SNW2, and SNW3 provide the service requested, but step 622 selected serving network SNW2 after performing optimization, flow proceeds from step 642 to 644. Step 644 performs optimization on the remaining eligible networks to select another serving network to provide the service. According to one embodiment of the present invention, the virtual operator performs optimization techniques to determine, from the remaining eligible serving networks, the serving network that provides the requested service to the subscriber at the least cost to the MVNO.

Flow proceeds from step 644 to process SR_C of FIG. 31A. Process SR_C starts at step 624 of FIG. 31A where the process previously described for step 624 is repeated. If there is not another serving network that provides the service requested, flow proceeds from step 642 to step 648. Step 648 informs the subscriber that the requested service is not available, and flow proceeds to process SR_B of FIG. 31A. Process SR_B starts at step 618 of FIG. 31A. When process SR_B is entered, the process previously described for step 618 is repeated.

Returning to step 640, flow proceeds to step 646 if translation of the network protocols can be performed. Step 646 performs the translation of the network protocols. In one embodiment, the virtual operator performs the translation using the method described for FIGS. 22A, 22B, and 22C.

Flow proceeds from step 646 to 650. Furthermore, flow proceeds from step 638 to 650 if there is no translation of network protocols. Step 650 forwards the service request to the destination serving network. Step 652 performs the service at the destination serving network.

Step 654 waits for the originating serving network wait to complete the service. While the service is being performed, flow proceeds from step 654 to step 656. Step 656 sends updates to the virtual operator. The content of the updates will be described later in more detail in Table 23 of FIG. 36. Step 658 determines if the service is completed on the originating serving network. If the service on the originating serving network is not completed, flow proceeds from step 658 to step 654, and the process described above for step 656 is repeated. If the service on the originating serving network is completed, flow proceeds from step 658 to step 660. Step 660 provides the results of the service to the originating serving network.

According to one embodiment, the destination serving network forwards the results of the service to the serving network. In another embodiment, the destination serving network forwards the result of the service to the virtual operator, and the virtual operator forwards the result to the originating serving network. In another embodiment, the virtual operator collects the results of the service from the destination serving network after the service is completed and forwards the results to the originating serving network.

Flow then proceeds from step 660 to process SR_B of FIG. 31A. Process SR_B starts at step 618 of FIG. 31A. When process SR_B is entered, the process previously described for step 618 is repeated.

An exemplary method for using optimization techniques selecting a serving network to provide the requested service is next described. In one embodiment, optimization techniques are used to select the serving network that provides the requested service at the least cost to the MVNO. For example, the text messaging service may be provided on serving networks SNW1, SNW2, and SNW3. If using serving network SNW1 for the text messaging service costs the MVNO $2.00, using serving network SNW2 for the service costs the MVNO $1.00, and using serving network SNW3 costs the MVNO $0.75, the virtual operator selects SNW3 to provide the text messaging service.

The cost of using a serving network to provide a service includes, but is not limited to, the contracted price for the service, the rate for interconnecting to the serving network, and the volume of traffic on the serving network. The contracted price for a service is the price that the MNO charges the MVNO for using the service based on the contract between the MNO and MVNO. The interconnect rate is the price that the MNO charges the MVNO for connecting to a serving network. According to one embodiment, the interconnect rate is based on the MVNO's utilization of the MNO's serving network. For example, if the MNO allows the MVNO to use 100 Mb/s and the MVNO is using 25 Mb/s, then the MVNO's utilization of the MNO's serving network is 0.25. Based on the contract between the MNO and the MVNO, the interconnect rate is increased if the utilization is increased. Thus, the cost of using a serving network for a service increases when the MVNO's utilization of the serving network is high.

In one embodiment, the volume of traffic on a serving network is correlated to the serving network's network throughput. The network throughput is a measurement of the rate of data that can be passed through a serving network. If a serving network has a low volume of traffic, then the serving network has a higher network throughput compared to another serving network that has a high volume of traffic. When a serving a network has a low network throughput, the time that the serving network takes to provide the service increases. If the MVNO is charged for each minute the MVNO is connected to an MNO's serving network, connecting to a serving network that has a low network throughput increases the cost of providing the service.

In another embodiment, the utilization of a serving network, rate for connecting to a serving network, and network throughput are based on real-time data. The virtual operator obtains updates from each serving network the virtual operator is using for a service, i.e. from each serving network the virtual operator forwards a service request to. The virtual operator uses the updates to calculate the virtual operator's current utilization of the serving network's resources. When the virtual operator determines the current utilization of the serving network's resources, the virtual operator rates the charge for connecting to the serving network based on the contract between the MNO of the serving network and the MVNO of the serving network. When performing the optimization method, the virtual operator receives updates from the serving networks to determine the serving networks' current network throughput.

Using the contracted price for the service, rate for interconnecting to the serving network, and the volume of traffic on the serving network as parameters for selecting a serving network, the virtual operator uses any desired optimization algorithm for selecting the service. In one embodiment, the virtual operator uses the Least Cost Routing algorithm where the routes to each of the serving networks is assigned a cost using the factors discussed above, and the serving network providing the least cost is selected. An example of the Least Cost Routing algorithm may be found in U.S. Pat. No. 5,870,460 to Litzenberger, the entire contents of which are incorporated by reference.

The parameters used for the optimization algorithm are not limited to the parameters mentioned above. In alternative embodiments, other parameters such as the time of day a service is requested are taken into account.

Figure 32:
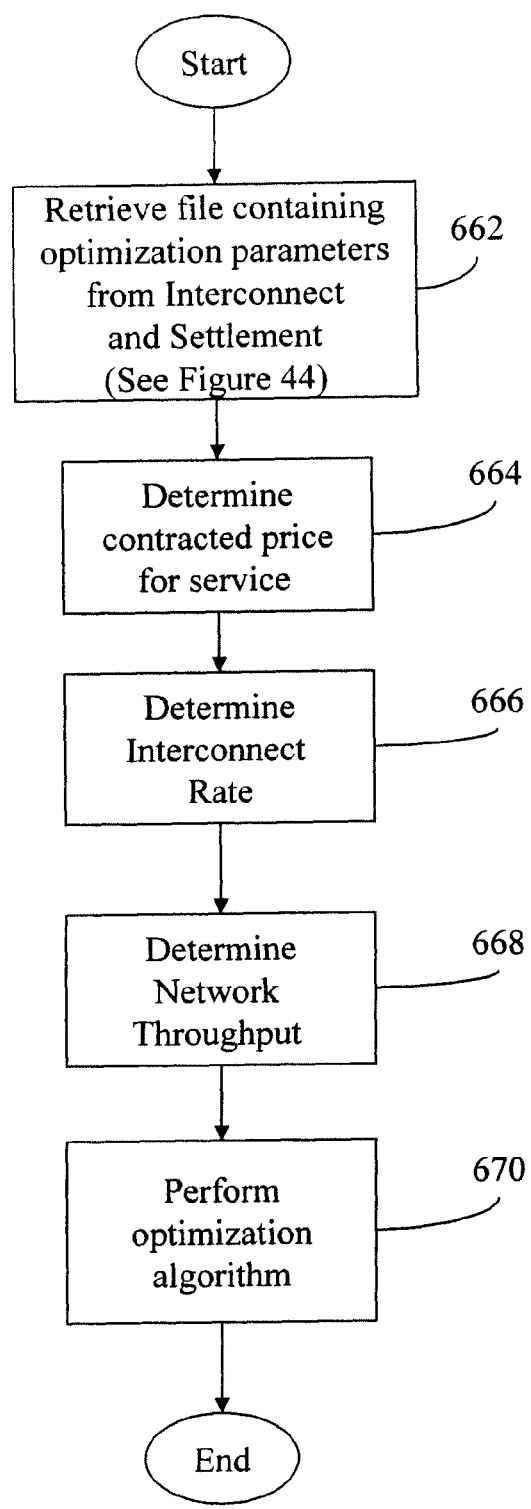
FIG. 32 illustrates an exemplary method for optimizing the selection of a serving network.

The flow diagram in FIG. 32 illustrates an exemplary method of obtaining the above mentioned criteria to perform the optimization algorithm. Step 662 retrieves a file containing optimization parameters from the Interconnect and Settlement layer. According to one embodiment of the present invention, the virtual operator uses an Interconnect Charge Detail Record (IC-CDR) from the interconnecting settlement layer for the optimization parameters. An IC-CDR is illustrated in Table 29 of FIG. 44. The IC-CDR illustrated in Table 29 of FIG. 44 contains the contracted price for the service, the interconnect rate, and the network throughput for each serving network. The method of generating an IC-CDR will be described later in more detail using the flow diagram in FIG. 45.

Step 664 determines the contracted price for the service from the retrieved file. Step 666 determines the interconnect rate from the retrieved file. Step 668 determines the network throughput. In one embodiment, the virtual operator determines the network throughput from the retrieved file. In another embodiment, the virtual operator receives an update from each serving network capable of providing the requested service to determine each of the serving networks' network throughput. After the optimization parameters are determined, flow proceeds to step 670. Step 670 selects a serving network to provide the service requested using any desired optimization algorithm. The optimization process ends after step 670 selects the serving network.

Figure 33:
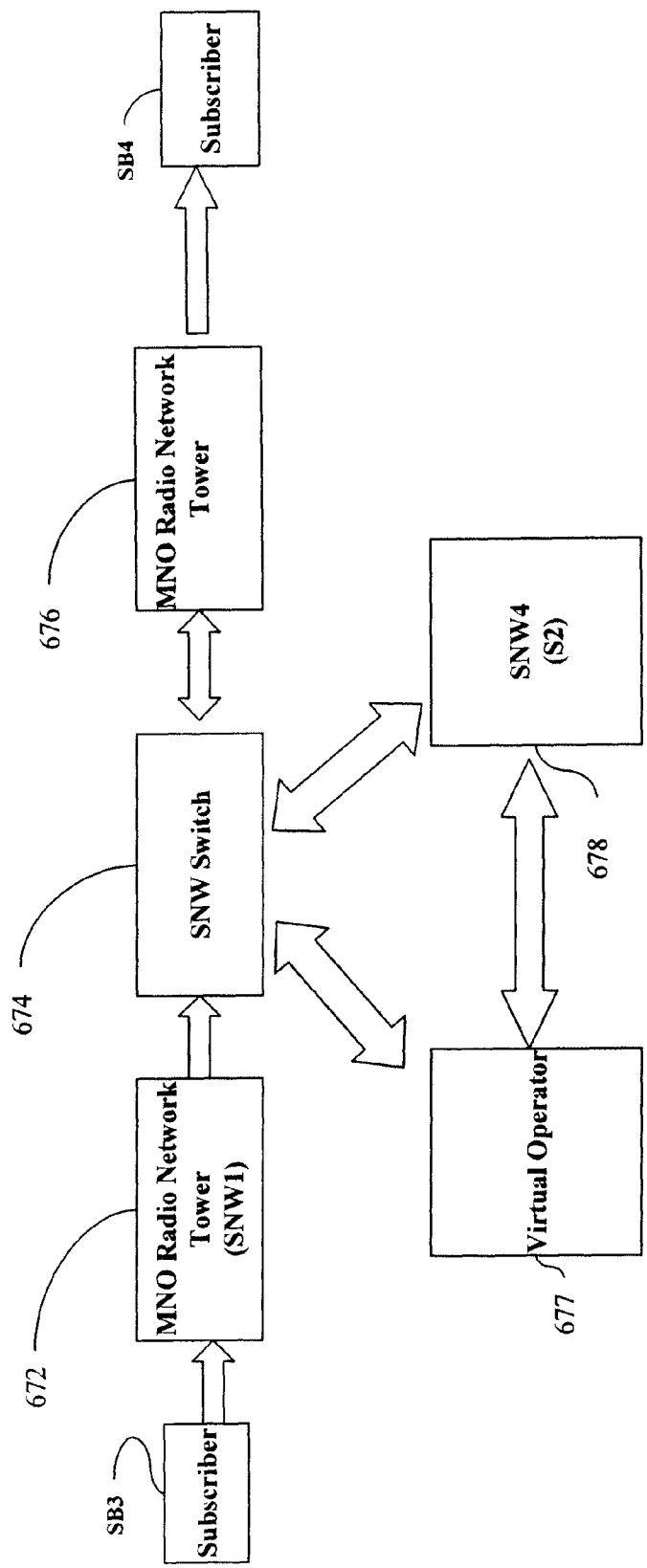
FIG. 33 illustrates an example network configuration for handling a service request.

FIG. 33 illustrates an example of the processing of a subscriber's service request using the exemplary method illustrated in FIGS. 31A and 31B. Subscriber SB3 is visiting a serving network SNW1 and makes a service request for setting up a call to subscriber SB4. Subscriber SB3 sends a service request packet to a MNO radio network tower 652 of serving network SNW1. In one embodiment, the service request packet is the format illustrated in Table 21A of FIG. 28A with the Service Type field of the service request packet indicating that a call setup service is requested. The MNO radio network tower 652 forwards the service request packet to a serving network switch 674 of serving network SNW1. Based on the Subscriber ID in the service request packet illustrated in Table 21A, and the contracts between the MNO and the MVNO, the serving network switch 674 of SNW1 forwards the service request packet to a virtual operator 677 of the MVNO.

In one embodiment, the virtual operator 677 contains the same components and performs the same functions as the virtual operator 100 illustrated in FIG. 4. When the virtual operator 677 receives the service request packet, the virtual operator determines the service requested from the Service Type field of the service request packet. The virtual operator 677 determines which serving networks provide the service requested. The virtual operator then performs optimization techniques if more than one serving network is capable of providing the service to select a serving network. Once the virtual operator selects a serving network to provide the service, the virtual operator updates the service request packet and performs translation of network if the network protocol of the originating serving network is different than the network protocol of the destination serving network.

In the example illustrated in FIG. 33, the virtual operator 677 selects a serving network SNW4 678 to provide the call setup service. The virtual operator forwards the service request packet to serving network SNW4 678. When serving network SNW4 678 receives the service request packet from the virtual operator 677, serving network SNW4 678 performs the service of setting up the call control. After serving network SNW4 678 performs the call setup, the serving network switch 674 of serving network SNW1 completes the call by setting up a connection with a MNO radio network tower 676.

Once the connection with the MNO radio network tower 676 is set up, subscriber SB4 receives the call. In this example, the results of the service performed by the destination serving network were forwarded directly to the originating serving network. In another embodiment, after the destination serving network performs the service, the results of the service are forwarded to the virtual operator 676, and the virtual operator 676 forwards the results of the service to the originating serving network. In an alternative embodiment, the virtual operator 676 collects the results of the service from the destination serving network and forwards the result to the originating serving network.

Figure 34:
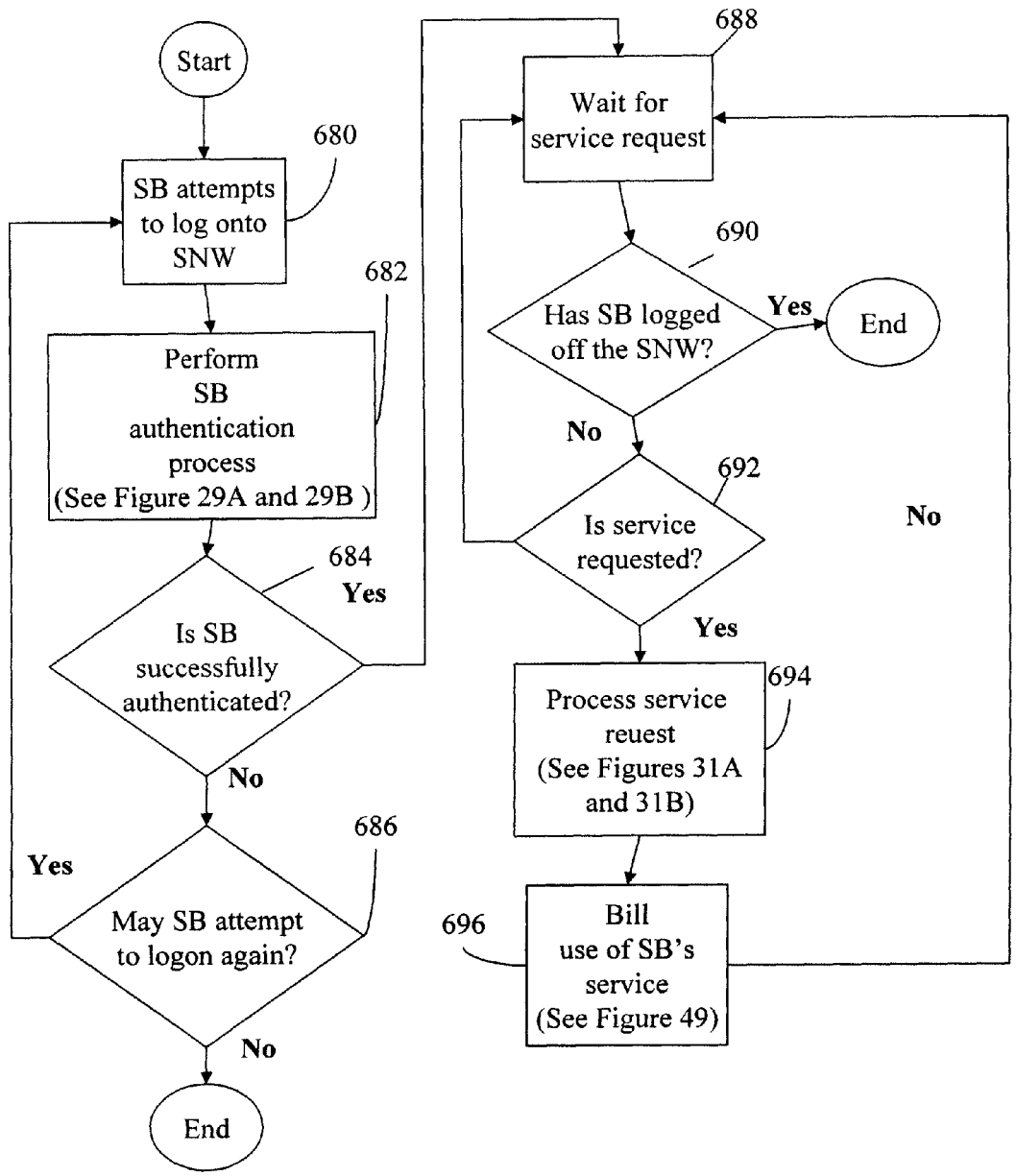
FIG. 34 illustrates an example scenario for subscriber logon/logoff.

FIG. 34 illustrates a flow diagram of the overall process of a subscriber logging on and off a serving network. Step 680 starts the process when the subscriber attempts to log onto a serving network. In one embodiment, the subscriber attempts to log on to a serving network by sending an authentication request to the serving network using a service request packet as illustrated in Table 28 of FIG. 27A. The service request packet contains the subscriber's identifier in the Subscriber ID field of the packet.

Step 682 authenticates the subscriber. According to one embodiment of the present invention, the method illustrated in FIGS. 29A and 29B is used to authenticate the subscriber. If the subscriber is not successfully authenticated, flow proceeds from step 684 to step 686. If the subscriber is not successfully authenticated, flow proceeds from step 684 to step 686. Step 686 determines if the subscriber is allowed to attempt to logon again. If the subscriber is not allowed to attempt to logon again, the logon/logoff process ends at step 686. If the subscriber is allowed to attempt to logon again, flow proceeds from step 686 to step 680, and the process described above for step 680 is repeated.

If the subscriber is successfully authenticated, flow proceeds from step 684 to step 688. Step 688 waits for a service request from the subscriber. Step 690 determines if the subscriber has logged off. If the subscriber has logged off, the logon/logoff process ends at step 690. If the subscriber has not logged of, flow proceeds from step 690 to 692. Step 692 determines if a service is requested. If no service is requested, flow proceeds from step 692 to step 688, and the process described above for step 688 is repeated. If the subscriber makes a service request, flow proceeds from step 692 to 694.

Figure 49:
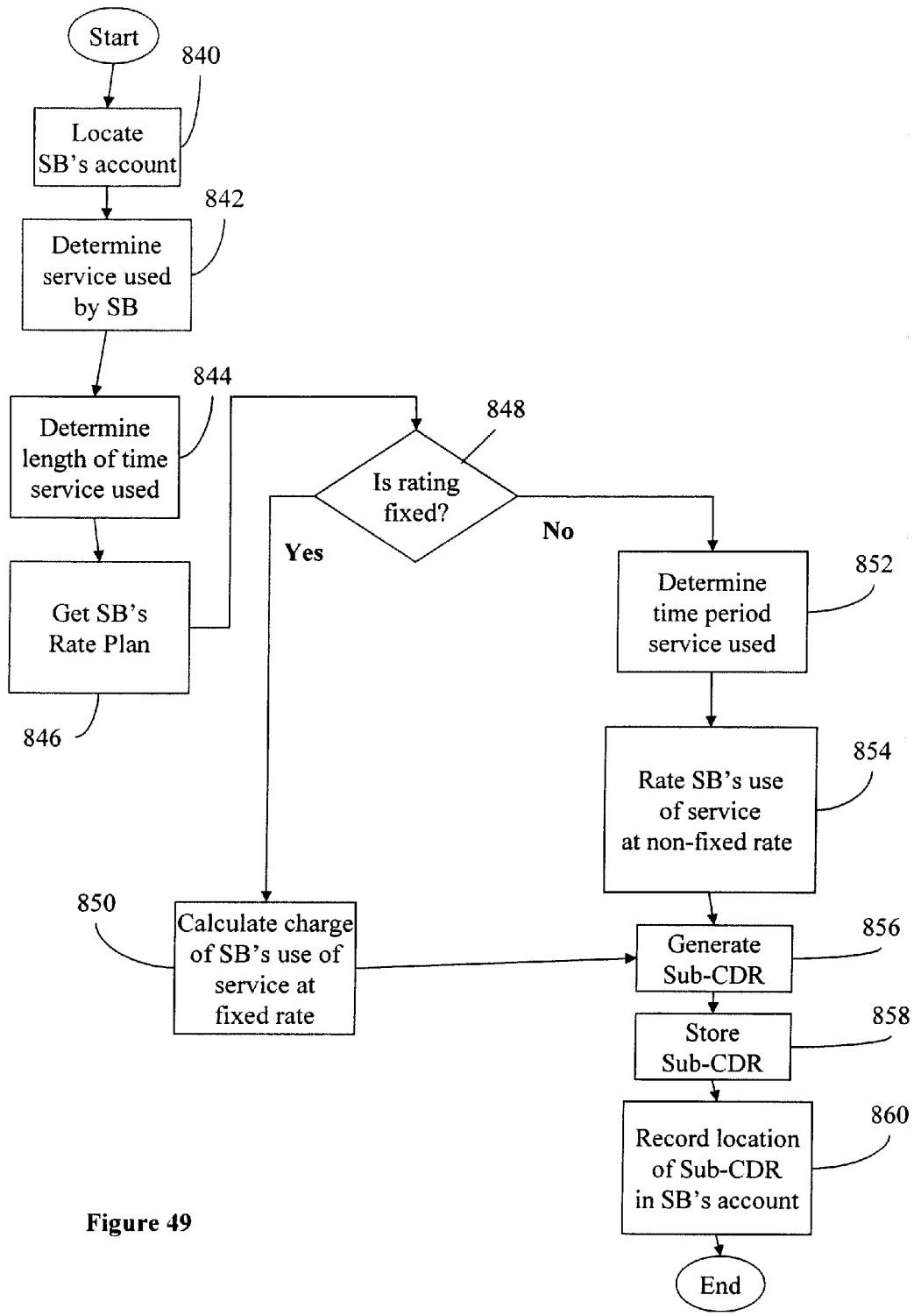
FIG. 49 illustrates an exemplary method for generating a sub-CDR.

Step 694 processes the service request. According to one embodiment of the present invention, the method illustrated in FIGS. 31A and 31B is used to process the service request and deliver the service to the subscriber. Step 696 bills the use of the subscriber's service. In one embodiment, the method illustrated in FIG. 49 is used to bill the subscriber's use of the service. The method illustrated in FIG. 49 will be described later in more detail. Flow proceeds from step 696 to step 688, and the process described above for step 688 is repeated.

Interconnect and Settlement Layer/Rating and Billing Layer

The Rating and Billing Layer 110 is responsible generates the bills for subscribers and providing real-time rates for connecting to a serving network. The interconnect and settlement layer 112 handles the real time control logic between the serving networks and the virtual operator.

According to one embodiment of the present invention, when a service is requested, the serving network providing the service generates a charge detail record (CDR) and forwards the CDR to the virtual operator. CDRs contain information pertaining to the use of at least one of the serving networks services. The CDRs generated from the serving networks are forwarded to the virtual operator in real time. Real time refers to the forwarding of data from a serving network to the virtual operator while the service is being used. In an alternative embodiment, CDRs generated from the serving networks are forwarded to the virtual operator after the service is completed.

Table 22 of FIG. 35 illustrates the example formats of the CDRs generated from the serving networks. The formats include, but are not limited to, the Transferred Account Procedure (TAP) versions 1, 2, and 3; Carrier Inter-Exchange Billing Exchange Record (CIBER); Near Real Time Record Data Exchange (NRTRDE); Returned Accounts Procedure (RAP); and an IP detail record (IPDR). These CDR formats are well known in the art. When the serving network generates a CDR, the serving network uses one of the formats listed in Table 22 for the CDR or any other desired format. The virtual operator is configured to read any desired format of the CDRs the serving networks use.

In an alternative embodiment, a serving network can use more than one CDR format. For example, Table 22 of FIG. 35 illustrates that serving network SNW1 uses the TAP1 format and the TAP2 format for service S1. However, serving network SNW1 uses TAP3 for service S2. Table 22 further illustrates that serving network SNW4 uses the IPDR format for service S3 and CIBER format for service S2.

Table 23 of FIG. 36 illustrates an exemplary embodiment of a CDR that a serving network generates. The CDR contains information such as the Subscriber, the Serving Network, the Service being used, the SNW Element Location, and the Bandwidth Usage. The CDR also contains any other information to support the formats listed in Table 22 of FIG. 35 or any other desired CDR format. The CDR illustrated in Table 23 of FIG. 36 shows that subscriber SB1 requested service S1 from serving network SNW1. While using service S1 on serving network SNW1, subscriber SB1 used 1000 kb/s of bandwidth. The SNW element location indicates the particular network element that the CDR was generated on.

In one embodiment, a serving network is composed of multiple network elements. To determine a subscriber's use of a serving network's resources, CDRs are collected from each network element of the serving network. In an alternative embodiment, a CDR from the virtual operator to the virtual operator indicates the subscriber's usage of resources on the serving network.

Figure 37:
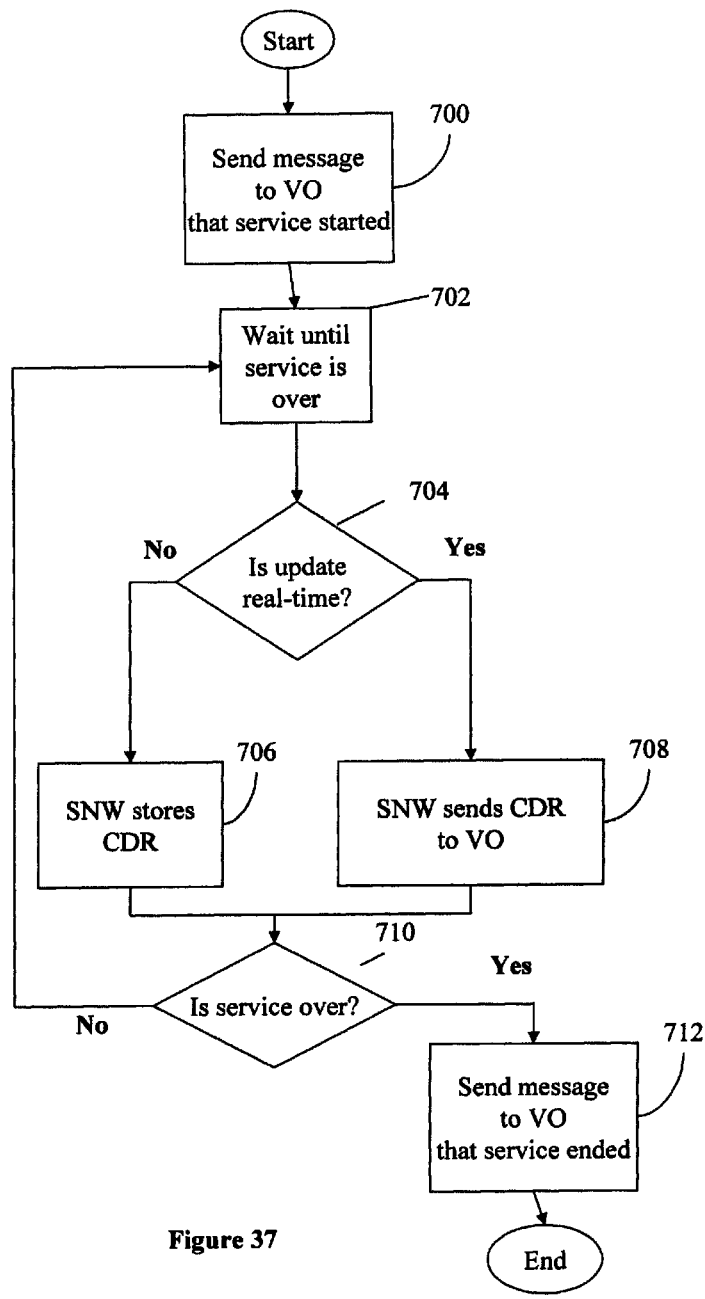
FIG. 37 illustrates an exemplary method for sending CDRs to a virtual operator.

An exemplary method of sending CDR's to the virtual operator is illustrated in the flow diagram of FIG. 37. According to one embodiment of the present invention, the method illustrated in FIG. 37 is initiated each time the virtual operator forwards a service request to a serving network, as previously discussed for step 630 of FIG. 31A and step 656 of FIG. 31B. The method illustrated in FIG. 37 runs in parallel for each service that is simultaneously used on the serving network.

When a service is initiated, Step 700 sends a message to the virtual operator that the service has started. Step 702 waits for the service to complete. Step 704 determines if the serving network's updates to the virtual operator are in real time. If the serving network's updates are in real-time, flow proceeds from step 704 to step 708. Step 708 sends the CDR to the virtual operator while the service is being used. According to one embodiment of the present invention, the CDR contains at least the information contained in Table 23 of FIG. 36. In another embodiment, the serving network sends a CDR for each network element used for the service on the serving network.

If the serving network's updates are not real-time, flow proceeds from step 704 to step 706. Step 706 stores a CDR for the serving network instead of sending the CDR to the network while the service is being used. According to one embodiment of the present invention, the stored CDR contains at least the information contained in Table 23 of FIG. 36. In another embodiment, the serving network stores a CDR for each network element used for the service on the serving network.

Flow proceeds from step 708 to 710. Additionally, flow proceeds from step 706 to 710. Step 710 determines if the service is over. If the service is not over, flow proceeds to step 702, and the same process described above for step 702 is repeated. If the service is over, flow proceeds from step 710 to step 712. Step 712 sends a message to the virtual operator that the service ended.

Figure 42:
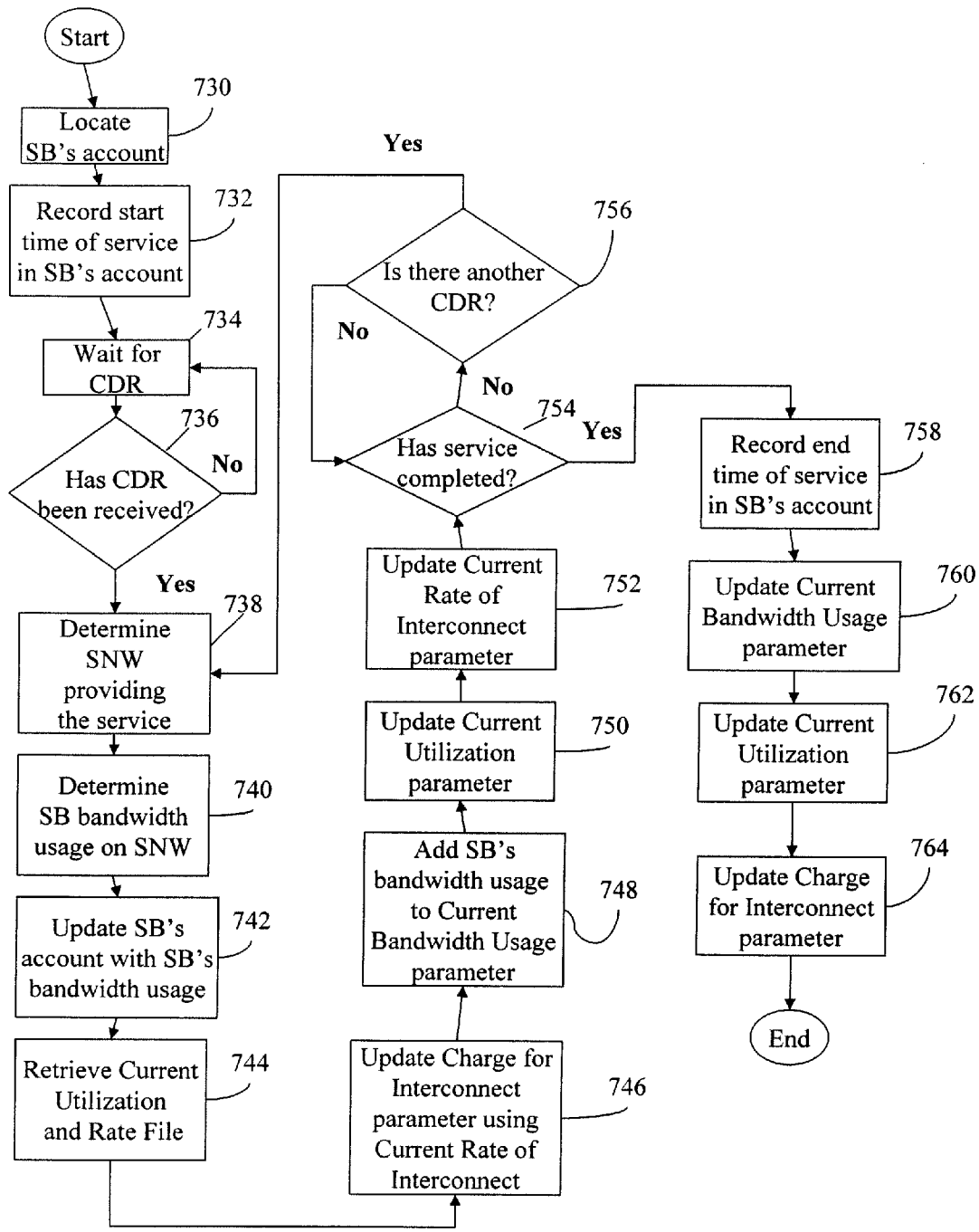
FIG. 42 illustrates an exemplary method for receiving and processing a CDR.

According to one embodiment of the present invention, the virtual operator uses the method illustrated FIG. 42 to process a CDR received from a serving network. FIGS. 38 to 41 illustrates the tables the virtual operator uses and/or modifies for processing a received CDR according to the embodiment of the present invention.

When receiving a CDR, the virtual operator refers to a table indicating the allotted bandwidth for each serving network. Table 24 of FIG. 38 illustrates the bandwidth that each serving network allots to an MVNO. The MVNO contracts for the bandwidth allotment with each MNO of the serving networks. The Bandwidth Allotment in Table 24 is a parameter indicating how much of the MNOs serving network's resources that the MVNO may use. For example, Table 24 illustrates that the MVNO may use up to 100 Mb/s of serving network SNW1's bandwidth. On the other hand, the MVNO may use up to 300 Mb/s of serving network SNW2's bandwidth. The MVNO uses bandwidth on a serving network when the virtual operator selects that serving network to perform a requested service for a subscriber. In one embodiment, the virtual operator stores and retrieves the information in Table 24 from database 116 of FIG. 4.

The virtual operator refers to the MVNO's utilization and rate plan with an MNO when processing a received CDR. The utilization and rate plan indicates the charge for connecting to a serving network based on the MVNO's current utilization of the serving network. Table 25 of FIG. 39 illustrates a rate plan that an MVNO has with an MNO of serving network SNW1. Although only the MVNO's utilization rate plan with the MNO of serving network SNW1 is illustrated, the MVNO has utilization rate plans with the MNOs of each serving network the MVNO uses. The Utilization parameter in Table 25 indicates how much of the allotted bandwidth the MVNO is using on serving network SNW1. For example, if the virtual operator selects serving network SNW1 to provide a service to subscriber SB1 at 20 Mb/s, and the virtual operator selects SNW1 to provide service S1 to subscriber SB2 at the same time at 30 Mb/s, then the MVNO's utilization on serving network SNW1 is 0.5 (i.e. $^{50}/_{100}$). The MVNO contracts with the MNO for different rates depending on the utilization. If the MVNO's utilization of serving network SNW1 is low, such as 0 to 0.25, then the rate for connecting to the serving network is lower than the rate for connecting to the serving network when the MVNO's utilization of serving network SNW1's bandwidth is greater than 0.25. For example, Table 25 illustrates that the rate for connecting to serving network SNW1 when the utilization is 0.5 to 0.75 is higher than the rate for connecting to serving network SNW1 when utilization on the serving network is 0.25 to 0.5. Furthermore, when the utilization exceeds 1, the MVNO pays a penalty, such as a higher rate, for exceeding the Bandwidth Allotment in Table 24 of FIG. 38. In one embodiment, the virtual operator stores and retrieves Table 25 from the database 116 of FIG. 4.

Furthermore, the virtual operator updates a Current Utilization and Rate file when processing a received CDR. The Current Utilization and Rate file indicates how much of a serving network's resources the MVNO's virtual operator is currently using. Table 26 of FIG. 40 illustrates a Current Utilization and Rate file indicating the Current Utilization of the MVNO's Current Bandwidth Usage, Current Utilization, and Current Rate of Interconnect on each serving network. For example, the virtual operator's Current Bandwidth Usage of serving network SNW1 is 10 Mb/s. Since Table 24 of FIG. 38 indicates that the MVNO is allotted 100 Mb/s on serving network SNW1, the Current Utilization is 0.1 (i.e. $^{10}/_{100}$). Table 25 of FIG. 39 indicates that when the utilization of serving network SNW1 is between 0 to 0.25, the rate of interconnect is $0.20/min. Therefore, the Current Rate of Interconnect in Table 26 of FIG. 40 for serving network SNW1 is set at $0.20/min. In one embodiment, the virtual operator stores and retrieves the Current Utilization and Rate file from database 116 of FIG. 4.

Additionally, the virtual operator updates the subscriber's account each time the subscriber uses a service. Table 27 of FIG. 41 illustrates an exemplary embodiment of a subscriber account. In one embodiment, the subscriber account is stored in a hierarchy based on the contracts the MVNO has with each individual. The virtual operator stores and retrieves the subscriber account from the database 116 of FIG. 4. The subscriber account in Table 27 is for subscriber SB1. The subscriber account indicates the services SB1 used, the start time and end time of each service used, the serving network providing the service, the bandwidth used for the service, the charge for interconnecting to the serving network providing the service, the type of accounting, the rate plan the subscriber has with the MVNO, and the location of the Subscriber Charge Detail Record (Sub-CDR). The method of creating a Sub-CDR will be described later in FIG. 49.

Each time a subscriber uses a service, the details of the service used are recorded in the subscriber's account. For example, Table 27 illustrates that subscriber SB1 used service S1 between 1 p.m. and 2 p.m. on serving network SNW1. While using this service, subscriber SB1 used 1000 Kb/s, and the charge for connecting to serving network SNW1 was $10.00. Table 27 further illustrates that subscriber SB1 contracted with the MVNO to use service S1 at a non-fixed rate. The details of the subscriber rate plan with the MVNO will be described later in FIG. 47. The sample subscriber account of Table 27 further indicates where the subscriber's Sub-CDRs may located on the virtual operator. In one embodiment, the subscriber account contains an address for locating the Sub-CDR database 116 of FIG. 4.

An exemplary method for handling a CDR received from a serving network is illustrated in a flow diagram of FIG. 42. According to one embodiment of the present invention, the virtual operator performs this method in the Rating and Billing layer 110 of FIG. 4. The virtual operator initiates the method illustrated in the flow diagram of FIG. 42 each time the virtual operator forwards a service request packet to a serving network. When services are used simultaneously, i.e. two or more services are being used at the same time, the virtual operator initiates and executes the method illustrated in FIG. 42 in parallel for each service being used.

When a service is initiated, i.e. the virtual operator forwards a service request to a serving network, step 730 locates the subscriber's account for the subscriber who sent the service request. Step 732 records the start time of the service in the subscriber's account. In one embodiment, the virtual operator records the start time of the service in the subscriber's account when the service request packet is forwarded to a serving network. In an alternative embodiment, the virtual operator records the start time of service in the subscriber's account when the serving network providing the service sends the message to a virtual operator that the service has started, such as step 700 illustrated in FIG. 37.

Step 734 waits for the CDR and step 736 determines if a CDR has been received. If no CDR has been received, flow proceeds from step 736 to step 734 and the process describer above for step 734 is repeated. If a CDR is received, flow proceeds from step 736 to step 738. Step 738 determines the serving network providing the service. In one embodiment, the virtual operator uses Table 23 of FIG. 36. For example, Table 23 of FIG. 36 illustrates that subscriber SB1 is using serving network SNW1 for service S1. Step 740 determines the subscriber's bandwidth usage. In one embodiment, the virtual operator determines the subscriber's bandwidth usage on the serving network from the CDR. For example, Table 23 of FIG. 36 illustrates that subscriber SB1 is using 100 Kb/s of serving network SNW1.

Step 742 updates the subscriber's account with the subscriber's bandwidth usage. As an example, the virtual operator changes the Bandwidth Usage parameter in Table 27 of FIG. 41 to indicate that the subscriber's current bandwidth usage for service S1 on serving network SNW1. According to one embodiment of the present invention, the Bandwidth Usage parameter in Table 27 of FIG. 41 is used to update the utilization on serving network SNW1. Step 744 retrieves the Current Utilization and Rate file. In one embodiment, the virtual operator retrieves the Current Utilization and Rate file in from database 116 of FIG. 4.

Step 746, updates the Charge for Interconnect parameter in the subscriber's account using the Current Rate of Interconnect in the Current Utilization and Rate file. The Charge for Interconnect in the subscriber's account indicates the current charge the MVNO incurs for connecting to the serving network that is providing the service. For example, Table 27 of FIG. 41 indicates that subscriber SB1 is using service S1 on serving network SNW1. Table 26 of FIG. 40 indicates that the Current Utilization is 0.1, which means that the Current Rate of Interconnect is $0.20/min. In one embodiment, the virtual operator records the time the CDR is received. Since the virtual operator recorded the start time of the service in the subscriber's account, the virtual operator determines how long the virtual operator has been connected to serving network SNW1 by subtracting the recorded start time from the time the CDR was received. Therefore, the virtual operator updates the Charge for Interconnect in the subscriber's account by multiplying the Current Rate of Interconnect parameter from the Current Utilization and Rate file with the time virtual operator has been connected to the serving network. For example, if the Current Rate of Interconnect to serving network SNW1 is $0.20/min, and the virtual operator has been connected to serving network SNW1 for 20 minutes, then $4.00 is added to the Charge for Interconnect parameter in subscriber SB1's account.

Step 748 adds the subscriber's bandwidth usage to the Current Bandwidth Usage parameter in the Current Utilization and Rate file. As an example, Table 23 of FIG. 36 illustrates that subscriber SB1 is using 1000 Kb/s on serving network SNW1. Therefore, the virtual operator adds subscriber SB1's bandwidth usage, 1000 Kb/s, to the Current Bandwidth Usage listed for serving network SNW1 in the Current Utilization and Rate file, which is listed at 10 Mb/s. Therefore, the Current Bandwidth Usage is changed to 1.1 Mb/s Step 750 updates the Current Utilization parameter in the Current Utilization and Rate file. As an example, the Current Bandwidth Usage parameter for serving network SNW1 after step 748 is 1.1 Mb/s. Table 24 of FIG. 38 illustrates that the MVNO is allotted 100 Mb/s on serving network SNW1. Therefore, the virtual operator divides the updated Current Bandwidth Usage, 1.1 Mb/s, by the bandwidth allotted to the MVNO on the particular serving network, 100 Mb/s, to calculate a utilization of 0.1. The Current Utilization parameter in the Current Utilization and Rate file is changed to 0.1.

Step 752 updates the Current Rate of Interconnect parameter in the Current Utilization and Rate file. As an example, after the virtual operator calculates the Current Utilization parameter, the virtual operator refers to the MVNO's utilization and rate plan illustrated in Table 25 of FIG. 39. The utilization and rate plan in Table 25 of FIG. 39 illustrates that then the virtual operator's utilization of serving network SNW1's bandwidth is between 0 and 0.25, the rate for connecting to serving network SNW1 is $0.20. Since Table 26 of FIG. 40 lists the Current Rate of Interconnect parameter as $0.20/min, the virtual operator does not change the parameter. If the Current Utilization parameter were 0.3, the virtual operator would change the Current Rate of Interconnect parameter from $0.20/min to $0.30/min.

Step 754 determines if the service has completed. If the service has not completed, flow proceeds from step 754 to step 756. Step 756 determines if another CDR has been received. If another CDR has been received, flow proceeds from step 756 to step 738, and the same process described above for step 738 is repeated. If another CDR has not been received, flow returns from 756 to step 754. If the service has completed, flow proceeds from step 754 to step 758. In one embodiment, the virtual operator knows when the service has completed when the serving network providing the service sends a message to the virtual operator that the service has ended, such as step 712 of FIG. 37.

Step 758 records the end time of the service in the subscriber's account. Step 760, updates the Current Bandwidth Usage parameter in Current Utilization and Rate file. In one embodiment, the virtual operator updates the Current Bandwidth Usage parameter by subtracting the Bandwidth Usage parameter in the subscriber's account for the service that has completed from the Current Bandwidth Usage parameter. For example, Table 27 of FIG. 41 indicates that Subscriber SB1 was using 1000 Kb/s for service S1 on serving network SNW1. Since subscriber SB1's use of service S1 on serving network SNW1 is completed, the virtual operator is no longer using 1000 Kb/s of serving network SNW1's bandwidth for subscriber SB1. Therefore, 1000 Kb/s is subtracted from the Current Bandwidth Usage parameter in the Current Utilization and Rate file.

Step 762 updates the Current Utilization parameter in the Current Utilization and Rate file. As an example, the virtual operator divides the Current Bandwidth usage parameter with the bandwidth allotment of the serving network providing the service to calculate the new value for the Current Utilization parameter. The virtual operator refers to Table 24 of FIG. 38 to find the bandwidth allotment for each serving network.

Step 764 updates the Charge for Interconnect parameter. As an example, the virtual operator refers to the utilization and rate plan illustrated in Table 25 of FIG. 39 to determine the rate for connecting to the serving network based on the new value calculated for the Current Utilization parameter in the Current Utilization and Rate file. The method for processing a CDR ends at step 764.

According to one embodiment of the present invention, the virtual operator makes the information in the Current Utilization and Rate plan available to other layers in the virtual operator, such as the Services Provisioning layer 106 and Authorization layer 108 in FIG. 4, through an Interconnect Charge Detail Record (IC-CDR).

In one embodiment of the invention, the IC-CDR contains the contracted price for the service. The contracted price for the service is the price an MVNO contracts for with an MNO for using the MNO's serving network for a service. Table 28 of FIG. 43 illustrates the contracted prices for the services an MVNO have with the MNOs of the serving networks. For example, the MVNO contracted a price for service S1 on serving network SNW1 for price PS11. For service S2 on serving network SNW1, the MVNO contracted with the MNO for price PS12. The price of the service, such as PS11, and PS12, is the price that MVNO is charged each time the MVNO selects the particular serving network for providing the service to one of the MVNO's subscribers.

An exemplary embodiment of an IC-CDR is illustrated in Table 29 of FIG. 44. Table 29 of FIG. 44 illustrates that the IC-CDR contains the utilization for each serving network, the current interconnect rate for each serving network, and the current network throughput of each serving network. The current network throughput measures the rate traffic passes through the serving network. Additionally, the IC-CDR contains the services provided by each serving network, and the MVNO's contract price with the MNO for using the service on the serving network.

The IC-CDR contains the parameters necessary for the virtual operator to perform the optimization algorithm when selecting a network to provide a service. Since the parameters used for the optimization algorithm uses information from the IC-CDR, and the IC-CDR contains the information from the Current Utilization and Rate file, the parameters used for optimization are based on real-time information.

Figure 45:
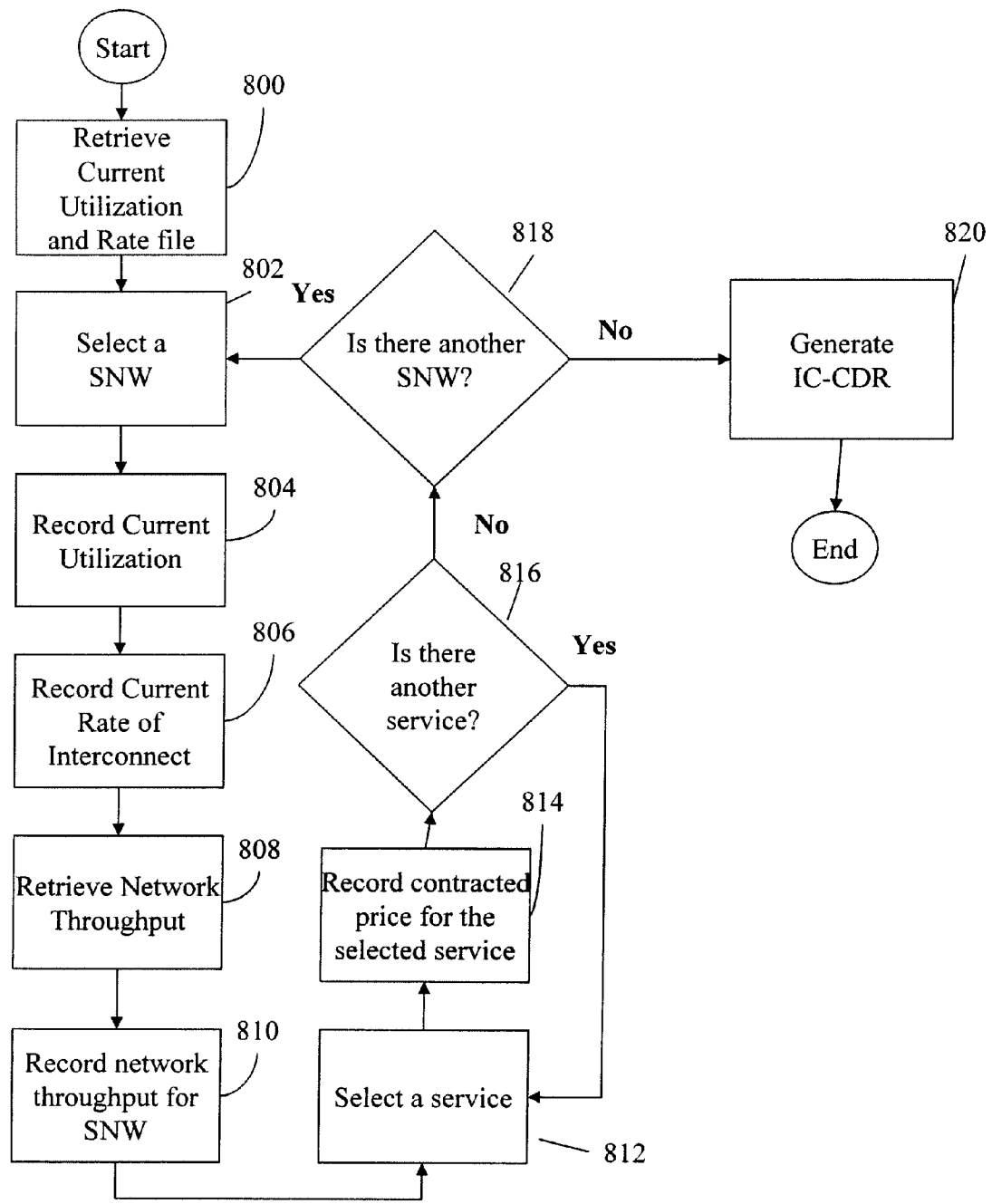
FIG. 45 illustrates an exemplary method for generating an IC-CDR.

An exemplary method for generating an IC-CDR is illustrated in a flow diagram of FIG. 45. According to one embodiment of the present invention, the virtual operator performs this method in the Interconnect and Settlement layer 112 of FIG. 4. The method illustrated in FIG. 45 is initiated each time the Current Utilization and Rate file is updated. In another embodiment, the method illustrated in FIG. 45 is initiated when another layer uses an IC-CDR.

Step 800 starts the IC-CDR generation process by retrieving the Current Utilization and Rate file. In one embodiment, the virtual operator retrieves the file from database 116 of FIG. 4. Step 802 selects a serving network. As an example, Table 29 of FIG. 44 lists serving networks SNW1 to SNW4. The virtual operator selects a serving network, such as serving network SNW1 and generates the parameters in columns 2-6 of Table 29 for serving network SNW1.

Step 804 records the Current Utilization parameter from the Current Utilization and Rate file for the selected serving network. Step 806 records the Current Rate of Interconnect from the Current Utilization and Rate file for the selected serving network. Step 808 retrieves the network throughput for the selected serving network. In one embodiment, the virtual operator contacts the selected serving network each time the method illustrated in FIG. 45 is initiated and receives the network throughput from the serving network. In another embodiment, the virtual operator receives periodic updates from each serving network, where each serving network provides the network throughput. The virtual operator stores the periodic updates in the database 116 of FIG. 4 and retrieves the periodic updates when the method illustrated in FIG. 45 is invoked. Step 810 records the network throughput for the selected serving network.

Flow proceeds to step 812. Step 812 selects a service for the selected serving network. As an example, Table 20 of FIG. 36 illustrates that serving network SNW1 provides services S1 and S2. Step 814 records the contracted price for the selected service. In one embodiment, the virtual operator uses Table 28 of FIG. 43 to find the contracted price for the selected service of the serving network. For example, if the virtual operator selected serving network SNW1 and service S1, the contracted price listed is PS11. The contracted price for the service is represented in the IC-CDR as a dollar amount as illustrated in column 6 of Table 29.

Step 816 determines if there is another service on the selected serving network. If there is another service on the selected serving network, flow returns from step 816 to step 812 and the same process described above for step 812 is repeated. For the example illustrated above, the contracted price for service S1 on serving network SNW1 was recorded. Since serving network SNW1 also provides service S2, the contracted price for service S2 is recorded. If there is not another service on the selected serving network, flow proceeds from step 816 to step 818.

Step 818 determines if there is another serving network for the IC-CDR. If there is another serving network for the IC-CDR, flow proceeds from step 818 to step 802, and the process described above for step 802 is repeated. If there is not another serving network for the IC-CDR, flow proceeds from step 818 to 820. Step 820 generates the IC-CDR and ends the process. In one embodiment, the generated IC-CDR is a text file that is parsed for information when received by other layers. The text file is in any desired format such as the Rich Text format. In another embodiment, the IC-CDR is a data structure. The data structure is in any desired format such as a linked list.

In an another embodiment, the IC-CDR illustrated in Table 29 includes additional parameters such as time sensitive rates for the contracted price for a service. For example, the contracted price for a service may be different based on the time the service is requested. The flow diagram illustrated in FIG. 45 for generating an IC-CDR is modified to incorporate any modifications made to the format of an IC-CDR.

According to one embodiment of the present invention, a bill for the subscriber is generated after the subscriber finishes using a service. The bill is generated using subscriber's rate plan with the MVNO. Table 30 of FIG. 46 illustrates an exemplary embodiment of a rating plan that the subscribers have with the MVNO. Table 30 illustrates each service a subscriber desires and the price for the service. The price for the service is the price that the MVNO charges the subscriber for using the service. For example, Table 30 illustrates that subscriber SB3 desires service S3 and S4. The MVNO charges subscriber SB3 price PS31 for use of service S3, and price PS42 for use of service S4.

Table 31 of FIG. 47 illustrates another embodiment of a rate plan that subscriber SB1 has with the MVNO. Although only the rate plan for subscriber SB1 is illustrated in Table 31, each subscriber has a rate plan with the MVNO. Table 31 illustrates the services the subscriber subscribed for, and a rate for using the service based on the time the service is requested. When the subscriber enters into a contract with the MVNO for use of a service, the subscriber specifies whether a particular service requested is at a fixed rate, or at a time sensitive rate. This information is reflected in the subscriber's account. For example, Table 27 of FIG. 41 illustrates the subscriber SB1 uses services S1 at a non-fixed rate, i.e., a time sensitive rate, and uses service S4 at a fixed rate.

According to one embodiment of the present invention, the subscriber's charge for the service is placed in a Subscriber Charge Detail Record (Sub-CDR). A Sub-CDR is generated each time a subscriber uses a service. An exemplary embodiment of a Sub-CDR is illustrated in Table 32 of FIG. 48. Table 32 of FIG. 48 illustrates that a Sub-CDR includes the service used, the serving network providing the service, and the subscriber's charge for using the service. For example, Table 32 illustrates that subscriber SB1 used service S1 on serving network SNW1 for a charge of $30.00.

Additionally, the Sub-CDR contains the MVNO's contracted price with the MNO for using the service and charge for connecting to the MNO's serving network at the time the service was used. If the contracted price between MVNO and the MNO changes at a later date, the Sub-CDR keeps track of the contracted price charged to the MVNO for using the MNO serving network for the service at the time the subscriber used the service. Table 32 illustrates that the MVNO contracted with the MNO for using the service on serving network SNW1 at $12.00, and the price for interconnecting to serving network SNW1 was $10.00. The Sub-CDR is used to reflect that the MVNO made a profit of $8.00 for using the service (i.e., $30.00−22.00=$8.00).

An exemplary method for generating a Sub-CDR is illustrated in the flow diagram of FIG. 49. According to one embodiment of the present invention, the virtual operator performs the method illustrated in FIG. 49 in the Rating and Billing layer 110 of FIG. 4.

Step 840 starts the billing process by locating the subscriber's account. In one embodiment, the subscriber's account is located in the database 116 of FIG. 4. Step 842 determines the service used by the subscriber from the subscriber's account. Step 844 determines the length of time the subscriber used the service. In one embodiment of the present invention, the virtual operator subtracts the start time of the service from the end time of the service to determine the length of time the subscriber used the service. For example, Table 27 of FIG. 41 illustrates that subscriber SB1 used service S1 from 1:00 p.m. to 2:00 p.m. Therefore, the virtual operator determines that subscriber SB1 used service S1 for 60 minutes.

Step 846 retrieves the subscriber's rate plan. According to one embodiment of the present invention, the virtual operator uses the subscriber rate plan illustrated in Table 31 of FIG. 47. In one embodiment the virtual operator retrieves the rate plan from database 116 of FIG. 4. In an alternative embodiment, the subscriber's rate plan is located in the subscriber's account.

Step 848 determine if the subscriber's use of the service is at a fixed rate. A fixed rate is the rate for using a service independent of the time the service was used. As an example, Table 27 of FIG. 41 illustrates that subscriber SB1's use of service S1 is rated at a non-fixed rate, while the subscriber SB1's use of service S4 is rated at a fixed rate. If the subscriber's use of the service is at a fixed rate, flow proceeds from step 848 to step 850. Step 850 calculates the charge for the subscriber's use of the service at a fixed rate.

If the subscriber's use of the service is at a non-fixed rate, flow proceeds from step 848 to step 852. Step 852 determines the time period the service was used. As an example, Table 27 of FIG. 41 illustrates that subscriber SB1 used service S1 between 1:00 and 2:00 p.m. Step 854 calculates the subscriber's use of the service at the non-fixed rate. In one embodiment, the virtual operator uses Table 31 of FIG. 47 to find the non-fixed rates for the subscriber's use of the service. For example, Table 31 of FIG. 47 illustrates that when subscriber SB1 uses service S1 from 9 a.m. to 9 p.m., a time sensitive rate during this period is $0.75/minute. Since the subscriber SB1 used service S1 between 1:00 p.m. and 2:00 p.m., the charge for using the service is rated at $0.75/minute.

Flow proceeds from step 850 to step 856 and from step 854 to step 856. Step 856 generates a Sub-CDR. In one embodiment, the generated Sub-CDR is a text file that is parsed for information when received by other layers. The text file is in any desired format such as the Rich Text format. In another embodiment, the Sub-CDR is a data structure. The data structure is in any desired format such as a linked list. Step 858 stores the generated Sub-CDR. In one embodiment, the virtual operator stores the Sub-CDR in the database 116 of FIG. 4.

Step 860 records the location of the Sub-CDR. According to one embodiment of the present invention, the virtual operator records the location of the Sub-CDR in the subscriber's account. The subscriber's account indicates where the Sub-CDR is located in the database 116 of FIG. 4. After the location of the Sub-CDR is recorded in the subscriber's account, the virtual operator knows where to locate the Sub-CDR for generating a bill for the subscriber, or generating a profitability analysis report. Generating a profitability analysis report is next described in more detail.

According to one embodiment of the present invention, the virtual operator generates a profitability analysis report. An exemplary embodiment of a profitability analysis report is illustrated in Table 33 of FIG. 50. A profitability analysis report is used by an MVNO to determine the revenue billed for a service on a serving network, the cost of providing the service, and the profit for providing the service to the MVNO's subscribers. For example, Table 33 of FIG. 50 illustrates that the MVNO billed their subscribers $100,000.00 for service S2 on serving network SNW1. The cost of providing service S2 on SNW1 was $125,000. Therefore, the MVNO lost $25,000 for providing service to SNW1. However, Table 33 illustrates that the MVNO billed their subscribers $50,000 for providing serviced S2 on serving network SNW2. The cost to the MVNO for providing service S2 on serving network SNW2 was $20,000.00. Therefore, the MVNO generated $30,000.00 of profit for service S2 on serving network SNW2. After the profitability analysis report is generated, the MVNO has the information to decide whether to discontinue using a service on a serving network.

Figure 51:
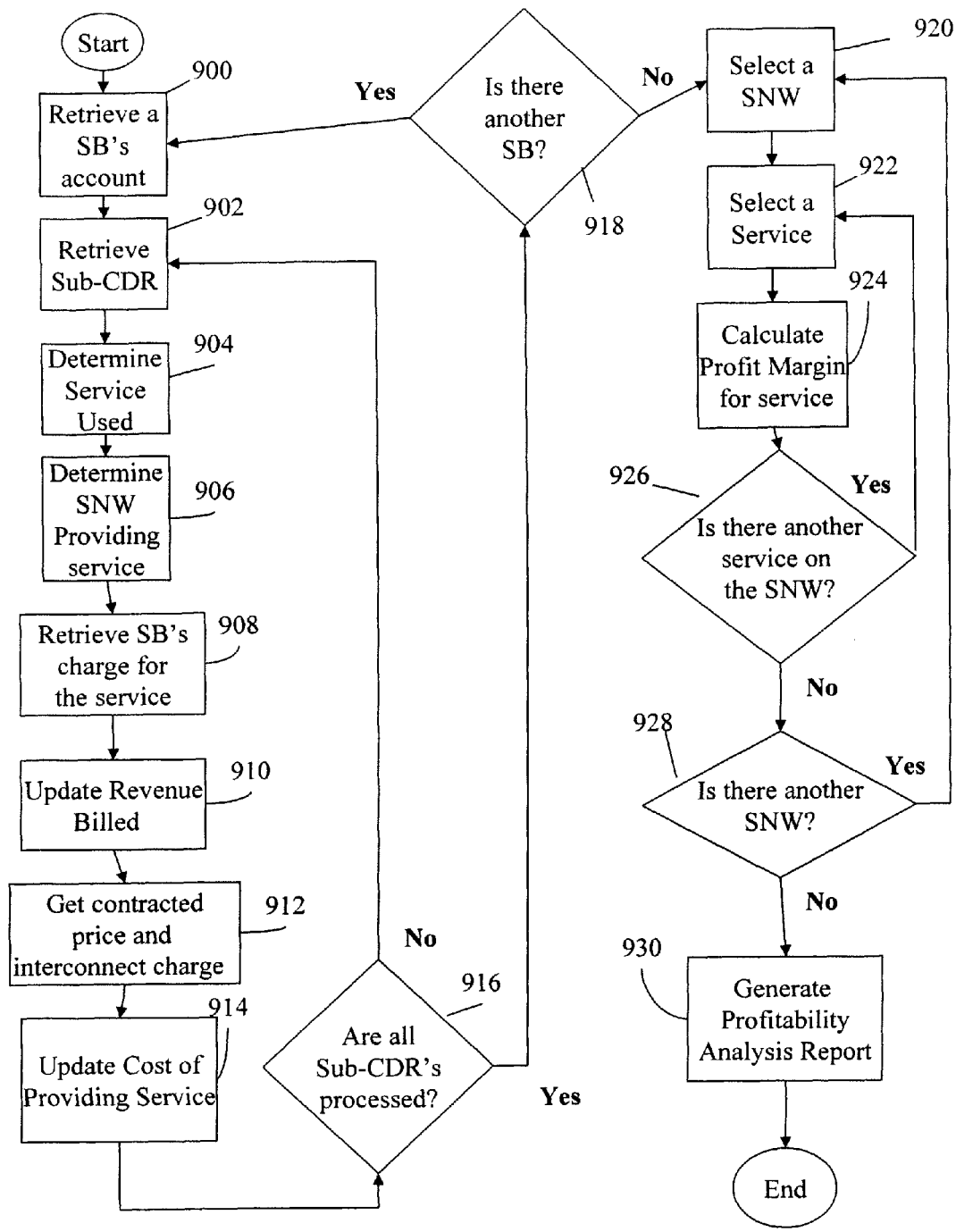
FIG. 51 illustrates an exemplary method for generating a profitability analysis report.

An exemplary method for generating a profitability analysis report is illustrated in the flow diagram of FIG. 51. According to one embodiment of the present invention, the virtual operator performs the method illustrated in FIG. 51 in the Interconnect and Settlement Layer 112 of FIG. 4.

Step 900 starts the process of generating a profitability analysis report by retrieving the subscriber's account. In one embodiment, the virtual operator finds the subscriber's account in database 116 of FIG. 4. Step 902 locates a Sub-CDR for a service the subscriber used. According to one embodiment of the present invention, the subscriber's account indicates the location of a Sub-CDR in the database 116 of FIG. 4 for each service used by the subscriber. For example, Table 27 of FIG. 41 illustrates that subscriber SB1 used service S1 and service S4. The locations of the Sub-CDRs for subscriber SB1's use of service S1 and service S4 are provided.

Step 904 determines the service the subscriber used. As an example, the Sub-CDR illustrated in Table 32 of FIG. 48 illustrates that subscriber SB1 used service S1. Step 906 determines the serving network that provided the service. For example, Table 32 of FIG. 48 illustrates that serving network SNW1 provided service S1 to subscriber SB1. Step 908 retrieves the subscriber's charge for the service. For example, Table 32 of FIG. 48 illustrates that subscriber SB1 was charged $30.00 for using service S1 on serving network SNW1.

Step 910 updates the revenue billed parameter of the profitability analysis report. As an example, Table 33 of FIG. 50 illustrates that the revenue billed to the subscribers is kept track for each service on each serving network. Since Table 32 of FIG. 48, shows that the subscriber was charged $30.00 for using service S1 on serving network SNW1, the revenue billed for service S1 on serving network SNW1 is updated by adding $30.00 to the current amount of the revenue billed.

Step 912 gets the contracted price for providing the service to the subscriber and the interconnect charge. As an example, the Sub-CDR illustrated in Table 32 of FIG. 48 shows that the contracted price for providing service S1 on serving network SNW1 was $12.00, and the charge for connecting to serving network SNW1 was $10.00.

Step 914 updates the cost of providing the service for the corresponding serving network and service. In one embodiment, the cost of providing the service is dependent on the contracted price for the service and the charge for connecting to the serving network. For example, Table 32 of FIG. 48 shows that the MVNO was charged a total of $22.00 (i.e. contracted price of $12.00+interconnect charge of $10.00) for providing service S1 on serving network SNW1. The cost of providing the service for service S1 on serving network SNW1 is updated by adding $22.00 to the current amount.

Step 916 determines if all the Sub-CDRs for the subscriber have been processed. If there is another Sub-CDR for the subscriber, flow proceeds from step 916 to step 902, and the process described above for step 902 is repeated. For example, Table 27 of FIG. 41 illustrates that subscriber SB1 used to services S1 and S4, and therefore, has two Sub-CDRs. Therefore, after Sub-CDR corresponding to the use of service S1 is processed, Sub-CDR for subscriber SB1's use of service S4 is processed.

If there is not another Sub-CDR for the subscriber, flow proceeds from step 916 to step 918. Step 918 determines if there is another subscriber. In one embodiment of the present invention, the method of generating the probability analysis report processes each Sub-CDR for each subscriber of the MVNO. Therefore, if all subscribers' Sub-CDRs have not been processed, flow proceeds from step 918 to step 900, and the same process described above for step 900 is repeated. If all the subscribers' Sub-CDRs have been processed, flow proceeds from step 918 to step 920.

Step 920 selects a serving network. As an example, Table 33 of FIG. 50 shows that profitability analysis is provided for serving networks SNW1 to SNW4. One of the serving networks is selected. Step 922 selects a service on the selected serving network. For example, Table 33 of FIG. 50, shows that serving network SNW1 provides services S1 and S2 serving network SNW provides services S1 and S2. If Step 920 selected serving network SNW1, step 922 selects service S1 or S2.

Step 924 calculates the profit margin for the service. In one embodiment, the profit margin for the selected service on the selected serving network is calculated by subtracting the cost of providing the service from the revenue billed. Step 926 determines if there is another service on the selected serving network. If there is another service on the selected serving network, flow returns step 926 to step 922, and the process described above for step 922 is repeated. If there is not another service on the serving network, flow proceeds from step 926 to step 928.

Step 928 determines if there is another serving network for calculating the profit margin for a service in the profitability analysis report. If there is another serving network, flow returns from step 928 to step 920 and the process described above for step 920 is repeated. However, if there is not another serving network for calculating the profitability margin for the profitability analysis report, flow proceeds from step 928 to step 930.

Step 930 generates the profitability analysis report. According to one embodiment of the present invention, the generated profitability analysis report is stored in the database 116 of FIG. 4. The profitability analysis report is retrieved by the MVNO by printing out the report. In another embodiment, the profitability analysis report is presented to the MVNO through a graphical user interface on a computer terminal.

Figure 52:
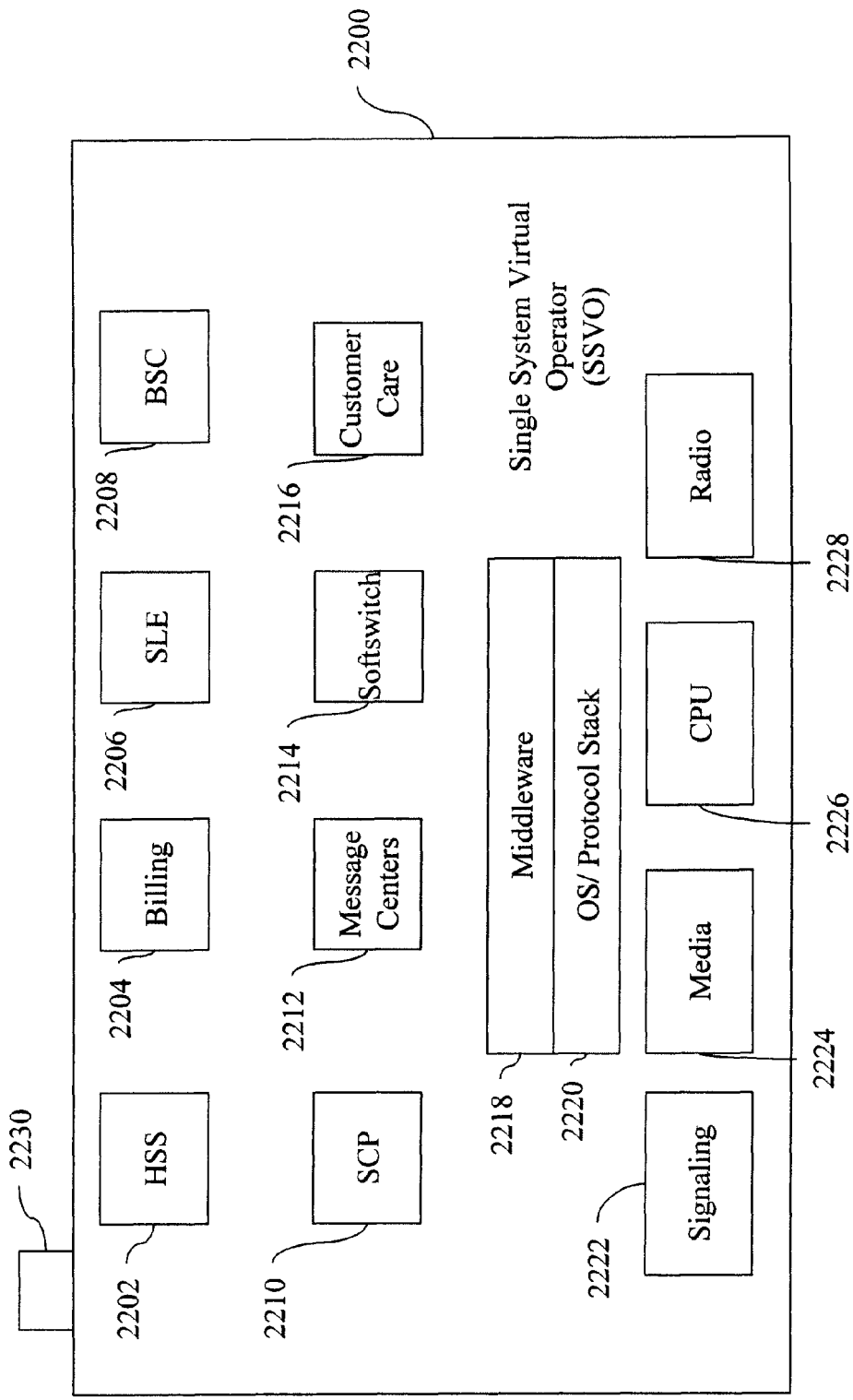
FIG. 52 illustrates a third embodiment of the virtual operator.

A second embodiment for the virtual operator is illustrated in FIG. 52. FIG. 52 illustrates a Single System Virtual Operator (SSVO) 2200. According to one embodiment of the present invention, the SSVO is implemented on a single unit configured to perform the operations of the virtual operator 100 of FIG. 4. For example, the SSVO 2200 is configured to perform the method for subscriber provisioning illustrated in FIGS. 11A and 11B, the method for services provisioning illustrated in FIG. 18, the method for handling an authentication request illustrated in FIGS. 29A and 29B, the method for handling a service request illustrated in FIGS. 31A and 31B, and the method of performing optimization of selection of a serving network illustrated in FIG. 32.

In another embodiment, the SSVO 2200 is configured to perform the method of handling a CDR illustrated in FIG. 42, the method for generating an IC-CDR illustrated in FIG. 45, the method for generating a Sub-CDR illustrated in FIG. 49, and the method for generating a profitability analysis report illustrated in FIG. 51.

The SSVO 2200 includes the following application units: a Home Subscriber Server unit 2202, a Billing unit 2204, a Services Logic Engine (SLE) unit 2206, a Base Station Controller (BSC) unit 2208, the State Control Point unit (SCP) 2210, the Message Center's unit 2212, the Softswitch unit 2214, and the Customer Care unit 2216. In one embodiment, the each of the above mentioned units is implemented on a single computer processing unit. The above mentioned units communicate with each other using any desired interface such as a printed circuit board bus interface.

The HSS unit 2202, in one embodiment, is used to handle authentication requests from the subscribers. For example, when a subscriber makes a request for authentication, and his or her request for authentication is received by the SSVO 2200, the HSS unit 2202 performs the method illustrated in FIGS. 29A and 29B to handle the authentication request. The HSS unit 2202 determines the serving network that performs authentication for the subscriber.

The billing unit 2204, in one embodiment, is configured to generate bills for subscribers. For example, after a subscriber uses a service, the billing unit 2204 performs the method illustrated in the flow diagram of FIG. 35 to generate a Sub-CDR. In one embodiment, the format of the Sub-CDR is the format illustrated in Table 32 of FIG. 48.

The Services Logic Engine (SLE) 2206, in one embodiment, is configured to keep track of the services provided by each serving network, and select a serving network to provide a requested service. For example, the SLE unit 2206 performs the services provisioning method illustrated in FIG. 18 to determine which serving networks provide which services. After the SLE unit 2206 performs services provisioning, the SLE unit 2206 contains a mapping of the services provided by each serving network as illustrated in Table 6 of FIG. 13. In another embodiment, the SLE unit 2206 is configured to handle service requests and select a serving network for providing a service. For example, the SLE unit 2206 processes service requests using the method illustrated in FIGS. 31A and 31B. The SLE unit 2206 performs the optimization techniques illustrated in FIG. 32 to select a serving network to provide the selected service.

The Base Station Controller unit 2208, in one embodiment, is configured to act as the logic unit for the base transceiver stations in a wireless network. The functionalities of the BSC unit 2208 include, but are not limited to handling allocation of radio channels, receiving measurements from mobile phones, and controlling handovers from one base transceiver station to another base transceiver station.

The Service Control Point (SCP) unit 2210, in one embodiment, is configured to provide real time logic for delivering and controlling services. For example, after the SLE unit 2206 selects a serving network to provide a service, the SCP unit 2210 is used to route the service request to the serving network. The SCP unit 2210 knows the network address of each serving network to be able to route the service request to the serving network.

The Message Center's unit 2212, in one embodiment, is configured to deliver SMS messages or MMS messages to the subscribers. As previously discussed, SMS messages contain text messages and MMS messages contain text and multimedia data such as pictures. The message center's unit 2212 stores messages for subscribers, and then delivers the messages to the subscribers when the subscribers are ready to receive them. For example, if subscriber SB1 requests the text messaging service to send the message "hello" to subscriber SB2, the SSVO unit 2220 selects a serving network to provide the text messaging service. However, if subscriber SB2 is not available, the results of the service are stored in the message center 2212 until subscriber SB2 logs onto a serving network.

The Softswitch unit 2214 is configured to perform the routing activities for the SSVO. When SSVO 2200 receives a message from a serving network, the Softswitch unit 2214 maintains a routing table, where the routing table indicates which unit on the SSVO 2200 the message should be routed to. For example, if the Softswitch 2214 receives messages from a serving network indicating the start and end times of a service, the Softswitch 2214 routes the messages to the Customer Care unit 2216 to store the message in the subscriber's account. Additionally, the Softswitch 2214 routes messages from any system on the SSVO 2200 to a serving network. For example, the Softswitch routes a request for a serving network's current throughput from the SSVO 2200 to the serving network.

The Customer Care unit 2216, in one embodiment, is configured to provision subscribers and store administrative details for the subscriber. For example, the Customer Care unit 2216 uses the method illustrated in FIGS. 11A and 11B to provision the subscribers. The Customer Care unit 2216 assigns subscribers a Subscriber Key identifier and updates a subscriber's Virtual Key identifier when necessary. Additionally, the customer care unit 2216 stores and maintains subscriber profile data as illustrated in Table 5 of FIG. 10 and the subscribers' accounts as illustrated in Table 7, FIG. 41.

The physical layer units for connecting the SSVO 2200 to various types of serving networks will next be described. The physical layer unit of the SSVO 2200 includes a Signaling Unit 2222, a Media Unit 2224, and a Radio Unit 2228.

The Signaling Unit 2222 is configured to provide the interface for receiving and transmitting signals to local area networks. For example, the Signaling Unit 2222 is configured to provide connectivity to a Public Switched Telephone Network (PSTN) running the Signaling System No. 7 (SS7) protocol. In another embodiment, the Signaling Unit 2222 is configured to receive and transmit signals to a local area network running the H.323 protocol, for example. The H.323 protocol allows a network to provide audiovisual communication sessions on the packet network. In another embodiment, the Signaling Unit 2222 is configured to receive and transmit signals to a local area network running the Session Initiation Protocol. The Session Initiation Protocol allows an IP network to set up and tear down voice or video calls.

The Media Unit 2224, in one embodiment, is configured to provide the interface for receiving and transmitting audio and video data to and from an IP network. For example, the Media Unit 2224 is configured to interface with an IP network running the Real-time Transport protocol (RTP). The RTP protocol defines a standardized packet format for delivering audio and video over the Internet. The hardware interface of the Media Unit 2224 is configured to comply with the interface specifications for the T1E1 standards.

The Radio Unit 2228, in one embodiment, is configured to interface with wireless networks running any desired protocol. The wireless networks the Radio Unit 2228 receive or transmit data over include but are not limited to a Wideband Co-division Multiple Access network (W-CDMA), a Code Division Multiple Access network (CDMA), a Time Division Multiple Access network (TDMA), and a Frequency Division Multiple Access network (FDMA).

The SSVO 2200 contains a Computer Processing Unit (CPU) 2226. The CPU 2226 is used to provide the logic necessary for managing operations on the SSVO 2200 such as routing signals to and from the Signaling unit 2222, Media unit 2224, and Radio unit 2228.

The SSVO includes a middle layer including the middleware 2218 and OS/Protocol Stack 2220 to provide the interface between the application units and the physical layer units.

The middleware 2218 comprises of the software applications for interfacing the application units with the OS/Protocol Stack 2220. The OS/Protocol Stack 2220 is a multi-layered unit configured to receive messages from the Signaling Unit 2220, the Media Unit 2224, or the Radio Unit 2228 and transmit the messages in a format that is recognized by the other units of the SSVO 2200. Additionally, the OS/Protocol Stack 2220 is configured to transmit messages from the other units of the SSVO 2200 to the Signaling Unit 2220, Media unit 2224, or the Radio unit 2228. For example, if the SSVO 2200 is communicating with a network that is running the Internet Protocol, the OS/Protocol Stack is configured to implement any desired protocol stack for the Internet protocol. Additionally, if the SSVO 2200 is communicating with a network running a GSM Protocol, the OS/Protocol Stack 2220 is simultaneously configured to implement any desired protocol stack for the GSM Network.

The SSVO operator 2200, in one embodiment, includes a connection port 2236 for connecting to another SSVO 2200. The connecting port 2236 is any desired connecting interface such as a Universal Serial Bus (USB) port, an Ethernet port, or serial port.

Figure 53:
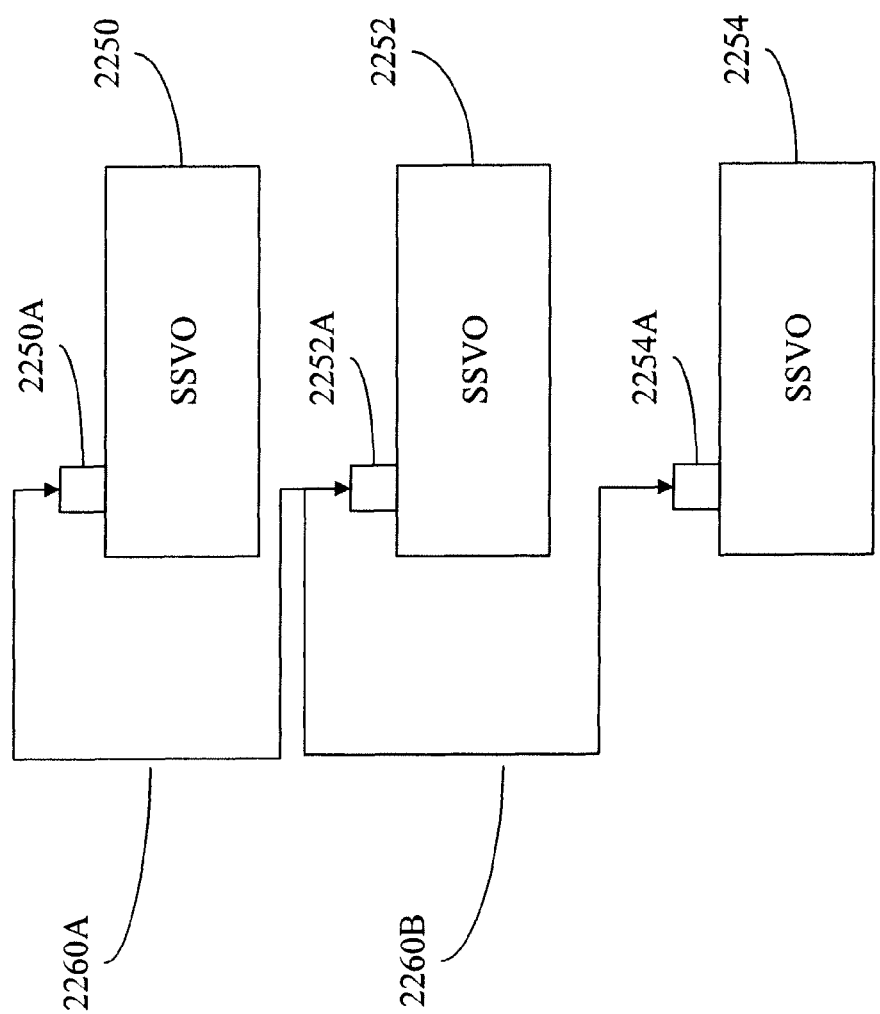
FIG. 53 illustrates multiple virtual multiple operators, corresponding to the third embodiment, connected together.

According to one embodiment of the present invention, multiple SSVOs are connected together to perform the functions of one virtual operator system. FIG. 53 illustrates three Single System Virtual Operators (SSVOs) connected together to form a multiple virtual operator system. SSVO 2250, SSVO 2252, and SSVO 2254 are identical to SSVO 2200 of FIG. 52. Thus, each of the SSVOs illustrated in FIG. 53 perform the same functions of the SSVO 2200 in FIG. 52. The connecting ports of each SSVO in FIG. 53, 2258, 2252A, and 2254A, are identical to the connecting port 2236 illustrated in FIG. 52. The connecting mediums 2260A and 2260B are connecting mediums compatible with the corresponding connecting ports 2250A, 2252A, and 2254A. For example, if connecting ports 2250A, 2252A, and 2254A are USB ports, then connecting mediums 2260A and 2260B are USB cables.

When multiple single system virtual operators are connected together, the single system virtual operators' application units start sharing resources to act as one virtual operator. For example, if SSVO 2250 supports 500,000 subscribers, SSVO 2252 supports 500,000 subscribers, a system comprising of SSVO 2250 connected to SSVO 2252 can support 1M subscribers. Thus, the Customer Care unit of SSVO 2250 starts sharing memory with the Customer Care unit of SSVO 2252.

Similarly, if the SLE unit of SSVO 2250 supports 5,000 services and the SLE unit (of SSVO 2252 supports an additional 5,000 services, a virtual operator system comprising SSVO 2250 connected to SSVO 2252 supports 10,000. This feature is accomplished by the SLE unit of SSVO 2250 sharing its memory with the SLE unit of SSVO 2252. In another embodiment, more than two SSVOs 2200 of FIG. 52 may be connected together as illustrated in FIG. 53.

According to one embodiment of the present invention, a translation table is used to allow two or more SSVOs connected together to share memory. An exemplary embodiment of a translation is illustrated in Table 34 of FIG. 54. Table 34 of FIG. 54 illustrates the subscribers and services provisioned to a multiple virtual operator system comprising SSVO1, SSVO2, and SSVO3. As an example, SSVO1, SSVO2, and SSVO3 correspond to SSVO 2250, SSVO 2252, and SSVO 2254, respectively, of FIG. 53. Table 34 of FIG. 54 illustrates that SSVO1 contains subscriber data for subscribers SB1 and SB2 and processes service requests for services S1 and S2. SSVO2 contains subscriber data for subscribers SB3 and SB4 and processes service requests for services S3 and S4. SSVO3 contains subscriber data for subscribers SB5 and SB6 and processes service requests for services S5 and S6. Subscriber data includes the subscribers' Subscriber Key identifiers, Virtual Key identifiers, subscriber accounts as illustrated in Table 27 of FIG. 41, and Sub-CDRs as illustrated in Table 32 of FIG. 48.

In one embodiment of the present invention, Table 34 of FIG. 54 is updated during subscriber and services provisioning. For example, the multiple virtual operator system comprising SSVO1, SSVO2, and SSVO3 performs the method illustrated in FIGS. 11A and 11B to provision subscribers SB11 to SB6. After the subscriber provisioning method illustrated in FIGS. 11A and 11B are performed, Table 34 of FIG. 54 is updated to indicate which subscribers are provisioned to their respective SSVOs. As an example, Table 34 of FIG. 54 illustrates that subscribers SB1 and SB2 are provisioned on SSVO1. If the memory of the Customer Care unit of SSVO1 is full after subscriber SB1 and SB2 are provisioned, the remaining subscribers, subscribers SB3 to SB6 are provisioned on another SSVO having available memory.

Similarly, the multiple virtual operator system comprising SSVO1, SSVO2, and SSVO3 performs the method illustrated in FIG. 18 to provision services S1 to S6. After the services provisioning method illustrated in FIG. 18 is performed, Table 34 of FIG. 54 is updated to indicate which services are provisioned to their respective SSVOs. As an example, Table 34 of FIG. 54 illustrates that services S1 and S2 are provisioned on SSVO1. If the memory of the SLE unit is full after services S1 and S2 are provisioned, the remaining services S3 to S6 are provisioned on another SSVO having available memory.

According to one embodiment of the present invention, the multiple virtual operator system comprising SSVO1, SSVO2, and SSVO3 refers to Table 34 of FIG. 54 when handling service requests such as authentication and text messaging. For example, if subscriber SB1 makes a request for authentication, the multiple virtual operator system receives the request for authentication. In one embodiment, the multiple virtual operator receives an authentication request packet as illustrated in Table 20A of FIG. 27A. Using Table 34 of FIG. 54, the multiple virtual operator system determines that subscriber SB1's subscriber data is located on SSVO1. Therefore, the multiple virtual operator system forwards subscriber SB1's authentication request to SSVO1, and SSVO1 performs the authentication method illustrated in FIGS. 29A and 29B to determine which serving network performs authentication for subscriber SB1 and translate the authentication request packet if necessary.

Similarly, if any of subscribers SB1 to SB6 make a request for the text messaging, a service request packet is forwarded to the multiple virtual operator system. In one embodiment, the multiple virtual operator system receives a service request packet in the format illustrated in Table 21A of FIG. 28A. The multiple virtual operator system uses Table 34 of FIG. 54 to determine which SSVO processes the text messaging service request. For example, if the text messaging service corresponds to service S3, the multiple virtual operator system determines the SSVO2 processes service requests for text messaging. The text messaging service request is forwarded to SSVO2, and SSVO2 performs the service request methods illustrated in FIGS. 31A and 31B and the optimization method illustrated in FIG. 32 to select a serving network to provide the text messaging service.

According to another embodiment of the present invention, the multiple virtual operator system comprising SSVO1, SSVO2, and SSVO3 uses Table 34 of FIG. 54 when processing CDRs received from the serving networks. As an example, the multiple virtual operator system receives a CDR from a serving network. In one embodiment, the format of the received CDR is the format illustrated in Table 23 of FIG. 36. From Table 23 of FIG. 36, the multiple virtual operator system determines which subscriber the CDR is for. For example, the multiple virtual operator system determines from Table 23 of FIG. 36 that the CDR is for subscriber SB1's use of service S1. Using Table 34 of FIG. 54, the multiple virtual operator system determines that subscriber SB1's subscriber data, such as the subscriber's account is located on SSVO1. The multiple virtual operator system forwards the CDR to SSVO1, and SSVO1 performs the CDR handling method illustrated in FIG. 42. After SSVO1 performs the CDR handling method, subscriber SB1's account is updated to indicate subscriber SB1's use of service S1. After subscriber SB1's use of service S1 is completed, SSVO1 uses the Sub-CDR generation method illustrated in FIG. 49 to generate a Sub-CDR for SB1's use of service S1.

Figure 55:
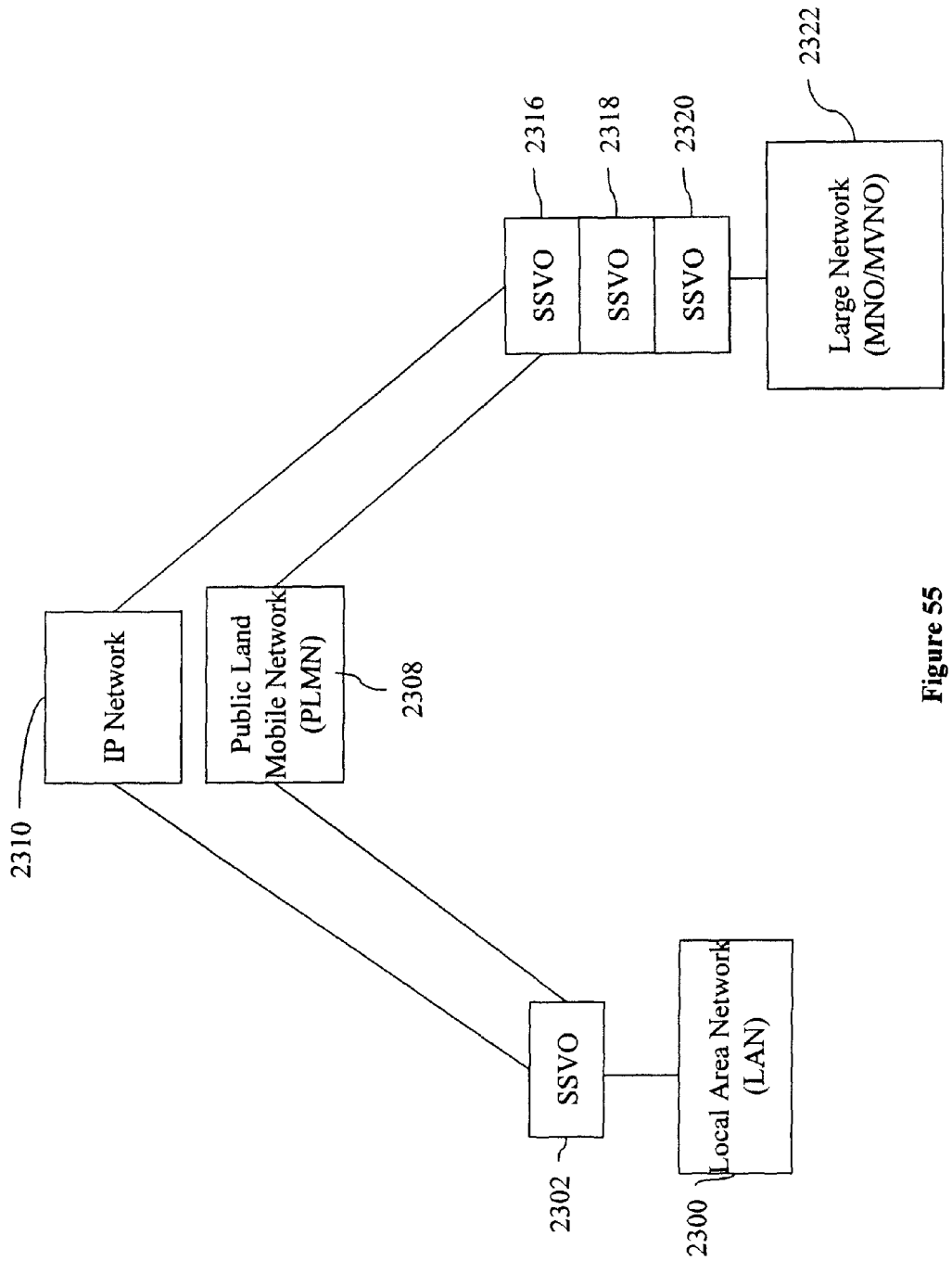
FIG. 55 illustrates an example network deployment of the third embodiment of the virtual operator.

Allowing one or more SSVOs to be connected together for sharing resources allows the operators of large networks, such as MVNOs and MNOs, to use multiple SSVOs for the large network. FIG. 55 illustrates an example network deployment of single system virtual operators between a local area network 2300 in a large network 2322. As an example, the operator of a local area network only has 1000 subscribers. Thus, the local area network 2300 uses one SSVO 2302. However, an MVNO has more than 1 million subscribers. Thus, an MVNO uses three SSVOs 2316, 2318, and 2320 to support their subscribers on large network 2322. Each of the single system virtual operators 2316, 2318, and 2320 is connected to each other as shown in FIG. 53 to form one virtual operator system. Thus, the single system virtual operators 2316, 2318, and 2320 may share resources with each other.

Example scenarios on the local area network 2300 in large network 2322 is next described. If a subscriber of local area network 2300 request a service, local area network 2300 instructs SSVO 2302 to process the service request to determine which network is capable of providing the service. For example, if a subscriber on local area network 2300 requests a service that IP network 2310 provides, SSVO 2302 forwards that service request to IP network 2310, or IP network 2310 performs the service requested and return the results to SSVO 2302.

If a subscriber of the MVNO of the large network 2322 request a service, the MVNO of the large network 2322 forwards the service request to the multiple virtual operator system comprising of SSVOs 2316, 2318, and 2320 to process the service request. Using a translation table such as Table 34 of FIG. 54, the multiple virtual operator system determines whether SSVO 2316, 2318, or 2320 processes the service request. For example, if the translation table indicates that SSVO 2320 processes the service request, the service request is forwarded to SSVO 2320, and SSVO 2320 selects a serving network to provide the requested service. If SSVO 2320 selects IP network 2310 to provide the requested service, the multiple virtual operator system forwards the service request to IP network 2310 and returns the results to the subscriber.

VoIP Application

The virtual operator 100 of FIG. 4 can be used to handle voice over IP calls, and provide interoperability between a call on an IP network, and a call on a GSM network. In a conventional Voice over IP (VOIP) system, VoIP services allow subscribers to make phone calls over a network running the IP protocol. As illustrated in Table 11 of FIG. 20, translation between a network running the GSM protocol to a destination network running the IP protocol is possible. Thus, the virtual operator provides subscribers of an MVNO with the capability of placing a call on a GSM network to a subscriber who is located on an IP network.

The determinations, calculations, and steps of the present invention may be conveniently implemented using a conventional general purpose digital computer programmed according to the teachings of the present invention, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical disks, CD-ROMs, CDs, DVDs, and magneto-optical disks, ROMs, RAMs, EPROMs, EEPROMs, flash memory, magnetic or optical cards, or any type of media which is suitable for storing electronic instructions. The present invention further includes a computer program product which is a storage medium including encoded data output by the present invention stored on any of the above described media suitable for storing electronic instructions or data.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of providing telecommunications services comprising:
   a communication device having an assigned subscriber key identifier,
   wherein the method comprises:
   receiving, from a first serving network, a first service request packet containing said subscriber key identifier of a subscriber requesting a service;
   determining, by referring to a first database, whether the first serving network or an other serving network is to provide the requested service to the subscriber based on the subscriber key identifier in the received first service request packet;
   if it is determined that the first serving network is not to provide the requested service, then retrieving, from a second database, a predetermined virtual identifier that has been previously allocated to the subscriber key identifier and creating a second service request packet from the first service request packet by substituting the virtual identifier for the subscriber key identifier and forwarding the second service request packet to the other serving network for the other serving network to process by referring to a third database; and
   determining at the other serving network, by referring to the third database, whether the subscriber is permitted the requested service based on the virtual identifier in the second service request packet.

2. The method according to claim 1 further comprising: translating a format of the second service request packet from a first network protocol corresponding to the first serving network to a second network protocol corresponding to the other serving network.

3. The method according to claim 2, wherein the first and second network protocols are protocols used on a network consisting of the group: Global Systems Mobile (GSM), Code Division Multiple Access (CDMA), and IP.

4. The method according to claim 1 further comprising: selecting the first database from a plurality of databases, the selected first database including data indicating whether the subscriber is authorized to access the requested service.

5. A method comprising:
   a communication device having an assigned subscriber key identifier,
   wherein the method comprises:
   receiving, from a first serving network, a first authentication request packet including a subscriber key identifier of a subscriber requesting to be authenticated;
   determining, by referring to a first database, whether the first serving network or an other serving network is to authenticate the subscriber based on the subscriber key identifier in the received first authentication request packet;
   if it is determined that the first serving network is to authenticate the subscriber then indicating to the first serving network that the first serving network is to authenticate the subscriber; and
   if it is determined that the other serving network is to authenticate the subscriber then retrieving, from a second database, a predetermined virtual identifier that has been previously allocated to the subscriber key identifier and creating a second authentication request packet from the first authentication request packet by substituting the virtual identifier for the subscriber key identifier and forwarding the second authentication request packet to the other serving network for the other serving network to process.

6. The method according to claim 5 further comprising: translating a format of the second authentication request packet from a first network protocol corresponding to the first serving network to a second network protocol corresponding to the other serving network.

7. The method according to claim 6, wherein the first and second network protocols are protocols used on a network consisting of the group: Global Systems Mobile (GSM), Code Division Multiple Access (CDMA), and IP.

8. The method according to claim 5 further comprising: selecting the first database from a plurality of databases, the selected first database including data indicating which serving network is to authenticate the subscriber.

9. An apparatus comprising:
   means for receiving, from a first serving network, a first service request packet containing a subscriber identifier of a subscriber requesting a service;
   means for determining, by referring to a first database, whether the first serving network or an other serving network is to provide the requested service to the subscriber based on the subscriber identifier in the received first service request packet;
   means for retrieving, from a second database, a predetermined virtual identifier that has been previously allocated to the subscriber identifier and creating a second service request packet from the first service request packet by substituting the virtual identifier for the subscriber identifier and forwarding the second service request packet to the other serving network for the other serving network to process if it is determined that the first serving network is not to provide the requested service; and
   means for determining at the other serving network, by referring to a third database, whether the subscriber is permitted the requested service based on the virtual identifier in the second service request packet.

10. The apparatus according to claim 9 further comprising: means for translating a format of the second service request packet from a first network protocol corresponding to the first serving network to a second network protocol corresponding to the other serving network.

11. The apparatus according to claim 10, wherein the first and second network protocols are protocols used on a network consisting of the group: Global Systems Mobile (GSM), Code Division Multiple Access (CDMA), and IP.

12. The apparatus according to claim 9 further comprising: means for selecting the first database from a plurality of databases, the selected first database including data indicating whether the subscriber is authorized to access the requested service.

13. An apparatus comprising:
means for receiving, from a first serving network, a first authentication request packet including a subscriber identifier of a subscriber requesting to be authenticated;
means for determining, by referring to a first database, whether the first serving network or an other serving network is to authenticate the subscriber based on the subscriber identifier in the received first authentication request packet;
means for indicating to the first serving network that the first serving network is to authenticate the subscriber if it is determined that the first serving network is to authenticate the subscriber; and
means for retrieving, from a second database, a predetermined virtual identifier that has been previously allocated to the subscriber identifier and creating a second authentication request packet from the first authentication request packet by substituting the virtual identifier for the subscriber identifier and forwarding the second authentication request packet to the other serving network for the other serving network to process.

14. The apparatus according to claim 13 further comprising: means for translating a format of the second authentication request packet from a first network protocol corresponding to the first serving network to a second network protocol corresponding to the other serving network.

15. The apparatus according to claim 13, wherein the first and second network protocols are protocols used on a network consisting of the group: Global Systems Mobile (GSM), Code Division Multiple Access (CDMA), and IP.

16. The apparatus according to claim 13 further comprising: means for selecting the first database from a plurality of databases, the selected first database including data indicating which serving network is to authenticate the subscriber.

17. An apparatus comprising:
a device configured to receive, from a first serving network, a first service request packet containing a subscriber identifier of a subscriber requesting a service;
a device configured to determine, by referring to a first database, whether the first serving network or an other serving network is to provide the requested service to the subscriber based on the subscriber identifier in the received first service request packet;
a device configured to retrieve, from a second database, a predetermined virtual identifier that has been previously allocated to the subscriber identifier and create a second service request packet from the first service request packet by substituting the virtual identifier for the subscriber identifier and forwarding the second service request packet to the other serving network for the other serving network to process if it is determined that the first serving network is not to provide the requested service; and
a device configured to determine at the other serving network, by referring to a third database, whether the subscriber is permitted the requested service based on the virtual identifier in the second service request packet.

18. The apparatus according to claim 17 further comprising: a device configured to translate a format of the second service request packet from a first network protocol corresponding to the first serving network to a second network protocol corresponding to the other serving network.

19. The apparatus according to claim 18, wherein the first and second network protocols are protocols used on a network consisting of the group: Global Systems Mobile (GSM), Code Division Multiple Access (CDMA), and IP.

20. The apparatus according to claim 17 further comprising: a device configured to select the first database from a plurality of databases, the selected first database including data indicating whether the subscriber is to access the requested service.

21. An apparatus comprising:
a device configured to receive, from a first serving network, a first authentication request packet including a subscriber identifier of a subscriber requesting to be authenticated;
a device configured to determine, by referring to a first database, whether the first serving network is to authenticate the subscriber based on the subscriber identifier in the received first authentication request packet; a device configured to indicate to the first serving network that the first serving network is to authenticate the subscriber if it is determined that the first serving network is to authenticate the subscriber; and
a device configured to retrieve, from a second database, a predetermined virtual identifier that has been previously allocated to the subscriber identifier and create a second authentication request packet from the first authentication request packet by substituting the virtual identifier for the subscriber identifier and forward the second authentication request packet to the other serving network for the other serving network to process.

22. The apparatus according to claim 21 further comprising: a device configured to translate a format of the second authentication request packet from a first network protocol corresponding to the first serving network to a second network protocol corresponding to the other serving network.

23. The apparatus according to claim 21, wherein the first and second network protocols are protocols used on a network consisting of the group: Global Systems Mobile (GSM), Code Division Multiple Access (CDMA), and IP.

24. The apparatus according to claim 21 further comprising: a device configured to select the first database from a plurality of databases, the selected first database including data indicating which serving network is to authenticate the subscriber.

25. A method comprising:
a user device having an assigned subscriber identifier;
a correlation database adapted to store a predetermined virtual identifier corresponding to said assigned subscriber identifier,
wherein the method comprises:
receiving, from a first serving network, a first service request packet containing a network request and a subscriber identifier corresponding to a subscriber;
determining, by referring to a first database, whether the first serving network or an other serving network is to process the received first service request packet based on the subscriber identifier;
if it is determined that the first serving network is not to process the first service request packet, then retrieving, from a second database, a predetermined virtual identifier that has been previously allocated to the subscriber identifier and creating a second service request packet from the first service request packet by substituting the virtual identifier for the subscriber identifier and forwarding the second service request packet to the other serving network for the other serving network to process; and determining at the other serving network, by referring to a third database, whether the subscriber is permitted the requested service based on the virtual identifier in the second service request packet.

26. The method of claim 25, wherein the network request comprises one of:

a service request; and an authentication request.

* * * * *